US012022521B2

(12) United States Patent
Taherzadeh Boroujeni et al.

(10) Patent No.: US 12,022,521 B2
(45) Date of Patent: Jun. 25, 2024

(54) RANDOM ACCESS RESPONSE MESSAGE REPETITION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US); Wooseok Nam, San Diego, CA (US); Junyi Li, Fairless Hills, PA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 17/401,228

(22) Filed: Aug. 12, 2021

(65) Prior Publication Data

US 2022/0053566 A1 Feb. 17, 2022

Related U.S. Application Data

(60) Provisional application No. 63/066,139, filed on Aug. 14, 2020, provisional application No. 63/065,409, (Continued)

(51) Int. Cl.
*H04W 74/08* (2024.01)
*H04W 72/12* (2023.01)
(Continued)

(52) U.S. Cl.
CPC ... *H04W 74/0833* (2013.01); *H04W 72/1273* (2013.01); *H04W 74/006* (2013.01); *H04W 74/008* (2013.01)

(58) Field of Classification Search
CPC ........... H04W 72/1273; H04W 74/006; H04W 74/008; H04W 74/0833
See application file for complete search history.

(56) References Cited

U.S. PATENT DOCUMENTS 10,638,507 B2 * 4/2020 Aiba ..................... H04W 72/21
11,470,654 B2 * 10/2022 Deogun ................ H04W 24/08
(Continued)

FOREIGN PATENT DOCUMENTS

EP         3050362 A1    8/2016
WO    WO-2015116732 A1   8/2015

OTHER PUBLICATIONS

International Search Report and Written Opinion—PCT/US2021/045903—ISA/EPO—dated Nov. 26, 2021.
(Continued)

*Primary Examiner* — Liton Miah
(74) *Attorney, Agent, or Firm* — Loza & Loza, LLP

(57) ABSTRACT

Aspects relate to random access procedures. A base station may transmit a random access response message to a user equipment (UE) on a downlink control channel at a first monitoring occasion and transmit at least one repetition of the random access message at at least one offset from the first monitoring occasion. The base station may also transmit an indication of the offset(s) to the UE. Upon receiving the indication of the offset(s), the UE may monitor for the random access response message on the downlink control channel at the first monitoring occasion and at the monitoring occasion(s) for the repetition(s). A UE may identify a first radio network temporary identifier (RNTI) used to affect a physical downlink control channel (PDCCH) sent within a random access response (RAR) window and determine based on the first RNTI that the PDCCH is one of a plurality of PDCCH repetitions.

30 Claims, 24 Drawing Sheets

Related U.S. Application Data filed on Aug. 13, 2020, provisional application No. 63/065,396, filed on Aug. 13, 2020.

(51) Int. Cl.
  *H04W 72/1273* (2023.01)
  *H04W 74/00* (2009.01)
  *H04W 74/0833* (2024.01)

(56) References Cited

U.S. PATENT DOCUMENTS

| | | | | |
|---|---|---|---|---|
| 11,683,846 | B2* | 6/2023 | Jeon | H04L 1/1642 |
| | | | | 370/329 |
| 2016/0234700 | A1* | 8/2016 | Wong | H04W 72/0446 |
| 2018/0368181 | A1* | 12/2018 | Lee | H04W 74/0833 |
| 2019/0182807 | A1 | 6/2019 | Panteleev et al. | |
| 2020/0077432 | A1* | 3/2020 | Xiong | H04L 1/1861 |
| 2020/0107373 | A1* | 4/2020 | Roy | H04L 5/0048 |
| 2020/0351955 | A1* | 11/2020 | Jeon | H04W 80/02 |

OTHER PUBLICATIONS

Qualcomm Incorporated: "Considerations on PDCCH Repetition", 3GPP TSG-RAN WG1 #92 Bis, 3GPP Draft, R1-1804819 Considerations on PDCCH Repetition, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 7, 2018 (Apr. 7, 2018), XP051414174, Retrieved from the Internet: URL: http://www.3gpp.org/ftp/tsg%5Fran/WG1%5FRL1/TSGR1%5F92b/Docs/ [retrieved on Apr. 7, 2018] section 3, 5 Pages, the whole document.

* cited by examiner

RANDOM ACCESS RESPONSE MESSAGE REPETITION

CROSS-REFERENCE TO RELATED APPLICATIONS

The present application for patent claims priority to and the benefit of U.S. Provisional Application No. 63/065,396, titled "MESSAGE 2 (MSG2) PHYSICAL DOWNLINK CONTROL CHANNEL (PDCCH) REPETITION VIA ALTERNATIVE CONTROL RESOURCE SET (CORE-SET)" filed Aug. 13, 2020, U.S. Provisional Application No. 63/065,409, titled "RANDOM ACCESS RESPONSE MESSAGE REPETITION" filed Aug. 13, 2020, and U.S. Provisional Application No. 63/066,139, titled "ALTERNATIVE RNTI FOR PDCCH REPETITION IN RANDOM ACCESS RESPONSE WINDOW" filed Aug. 14, 2020, each of which is assigned to the assignee hereof and hereby expressly incorporated by reference herein as if fully set forth below in its entirety and for all applicable purposes.

TECHNICAL FIELD

The technology discussed below relates generally to wireless communication and, more particularly, to repetition of a random access response message.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) for different UEs operating within a cell of the base station. A UE may initiate a random access procedure to initially gain access to a cell. If the random access procedure is successful, the UE may connect to the cell for subsequent scheduling by the base station.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method for wireless communication at a user equipment is disclosed. The method may include receiving a random access time offset value from a base station, receiving a first random access response physical downlink control channel (PDCCH) message from the base station during a monitoring occasion, and receiving a second random access response PDCCH message from the base station at a first time that is offset from the monitoring occasion by the random access time offset value.

In some examples, a user equipment may include a transceiver, a memory, and a processor coupled to the transceiver and the memory. The processor and the memory may be configured to receive a random access time offset value from a base station via the transceiver, receive a first random access response physical downlink control channel (PDCCH) message from the base station via the transceiver during a monitoring occasion, and receive a second random access response PDCCH message from the base station via the transceiver at a first time that is offset from the monitoring occasion by the random access time offset value.

In some examples, a user equipment may include means for receiving a random access time offset value from a base station, means for receiving a first random access response physical downlink control channel (PDCCH) message from the base station during a monitoring occasion, and means for receiving a second random access response PDCCH message from the base station at a first time that is offset from the monitoring occasion by the random access time offset value.

In some examples, an article of manufacture for use by a user equipment includes a non-transitory computer-readable medium having stored therein instructions executable by one or more processors of the user equipment to receive a random access time offset value from a base station, receive a first random access response physical downlink control channel (PDCCH) message from the base station during a monitoring occasion, and receive a second random access response PDCCH message from the base station at a first time that is offset from the monitoring occasion by the random access time offset value.

In some examples, a method for wireless communication at a user equipment is disclosed. The method may include receiving a first random access response physical downlink control channel (PDCCH) message that is based on a first random access-radio network temporary identifier (RA-RNTI), and receiving a second random access response PDCCH message that is based on a second RA-RNTI that is different from the first RA-RNTI. In some aspects, the second random access response PDCCH message may include a repetition of the first random access response PDCCH message.

In some examples, a user equipment may include a transceiver, a memory, and a processor coupled to the transceiver and the memory. The processor and the memory may be configured to receive via the transceiver a first random access response physical downlink control channel (PDCCH) message that is based on a first random access-radio network temporary identifier (RA-RNTI), and receive via the transceiver a second random access response PDCCH message that is based on a second RA-RNTI that is different from the first RA-RNTI. In some aspects, the second random access response PDCCH message may include a repetition of the first random access response PDCCH message.

In some examples, a user equipment may include means for receiving a first random access response physical downlink control channel (PDCCH) message that is based on a first random access-radio network temporary identifier (RA-RNTI), and means for receiving a second random access response PDCCH message that is based on a second RA-RNTI that is different from the first RA-RNTI. In some aspects, the second random access response PDCCH message may include a repetition of the first random access response PDCCH message.

In some examples, an article of manufacture for use by a user equipment includes a non-transitory computer-readable medium having stored therein instructions executable by one or more processors of the user equipment to receive a first random access response physical downlink control channel (PDCCH) message that is based on a first random access-radio network temporary identifier (RA-RNTI), and receive a second random access response PDCCH message that is based on a second RA-RNTI that is different from the first RA-RNTI. In some aspects, the second random access response PDCCH message may include a repetition of the first random access response PDCCH message.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
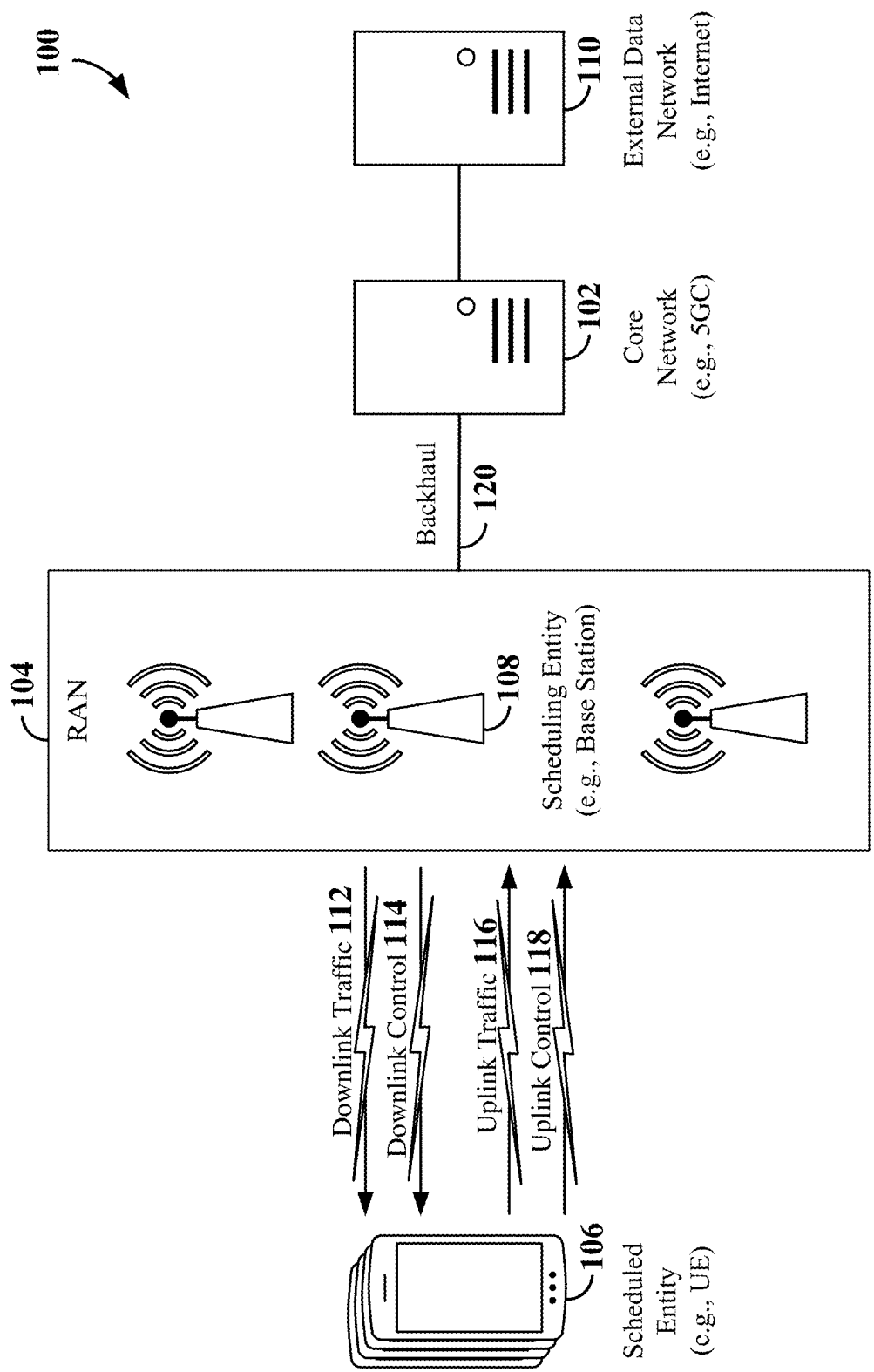
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

Various aspects of the disclosure relate to random access procedures. A user equipment (UE) may initiate a connection with a base station by entering into a random access channel (RACH) procedure with the base station. A set of messages is exchanged between the UE and the base station during the RACH procedure. The messages include a Msg1, which is a random access preamble message sent from the UE to the base station. A Msg2 follows. The Msg2 is a random access response (RAR) from the base station to the UE. The UE follows with a Msg3, which is a radio resource control (RRC) connection request. Finally, contention resolution is handled with a Msg4. There are additional exchanges, which are described later in this disclosure. The Msg2 involves the UE receiving and decoding a control signal, referred to as a Msg2(PDCCH) message. The Msg2 (PDCCH) is sent from the base station to the UE over the physical downlink control channel (PDCCH). The control signaling carried by the Msg2(PDCCH) provides the UE with information on where to find additional RAR data that the UE may use to successfully establish an RRC connection with the base station.

In some examples, a base station may transmit a random access response message (e.g., a control channel portion of a Msg2 for a random access procedure) to a UE on a downlink control channel at a first monitoring occasion and at least one repetition of the random access response message at at least one offset from the first monitoring occasion. For example, the base station may transmit a repetition of the random access response message at a time that is one or more symbols prior to the first monitoring occasion. As another example, the base station may transmit a repetition of the random access response message at a time that is one or more symbols later that the first monitoring occasion.

In some examples, the base station may transmit an indication of the at least one offset to a UE. For example, the base station may broadcast remaining minimum system information (RMSI) that includes an indication of a offset between a monitoring occasion for a random access response message (e.g., a control channel portion of a Msg2) and an added monitoring occasion for a repetition of the random access response message.

Upon receiving an indication of an offset between monitoring occasions, a UE may monitor for a random access response message (e.g., monitor for multiple instances of the same control channel portion of a Msg2) on the downlink control channel at the first monitoring occasion and at at least one added monitoring occasion for at least one repetition of the random access response message. The UE may then soft combine these instances of the random access response message to recover the random access response message.

In some examples, the random access response message may indicate a scheduled transmission for additional random access information (e.g., a data channel portion of a Msg2) on a downlink data channel. In this case, the UE may determine timing of the schedule downlink data channel based on a defined time offset and the time of the first monitoring occasion.

The disclosure relates in some aspects to using multiple radio network temporary identifiers (RNTIs) for random access response message repetition. For example, a base station may transmit a random access response message (e.g., a control channel portion of a Msg2 for a random access procedure) to a UE using a first radio network temporary identifier (RNTI) and at least one repetition of the random access response message using a second RNTI that is different from the first RNTI. In some examples, the base station may transmit each repetition of the random access response message using the second RNTI. In some examples, the base station may transmit at least one repetition of the random access response message using the first RNTI.

The disclosure relates in some aspects to processing physical downlink control channel (PDCCH) repetitions at a UE. In some examples, a UE may identify a first RNTI used to affect a physical downlink control channel (PDCCH) sent within a random access response (RAR) window. The UE may then determine, based on the first RNTI, that the PDCCH is one of a plurality of PDCCH repetitions, and process at least one of the PDCCH repetitions or a physical downlink shared channel (PDSCH) scheduled by the PDCCH accordingly.

The disclosure relates in some aspects to Message 2 (Msg2) physical downlink control channel (PDCCH) repetition via an alternative control resource set (CORESET). A base station may obtain control information related to a random access (RA) procedure associated with a UE and transmit the control information to the UE on a physical downlink control channel (PDCCH) of an RA message in a first set of resources in a first slot and in at least one repetition in a second set of resources in a second slot. A UE may receive the PDCCH of the RA message in the first set of resources in the first slot and at least one repetition of the PDCCH in the second set of resources in the second slot. The respective payloads of the PDCCH and repetition are combined to obtain a combined PDCCH payload. Control information related to an RA procedure may thus be obtained from the combined PDCCH payload. In the UE and the base station, the second set of resources is frequency-offset from the first set of resources.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink control information 118 and/or the downlink control information 114 and/or the downlink traffic 112 and/or the uplink traffic 116 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
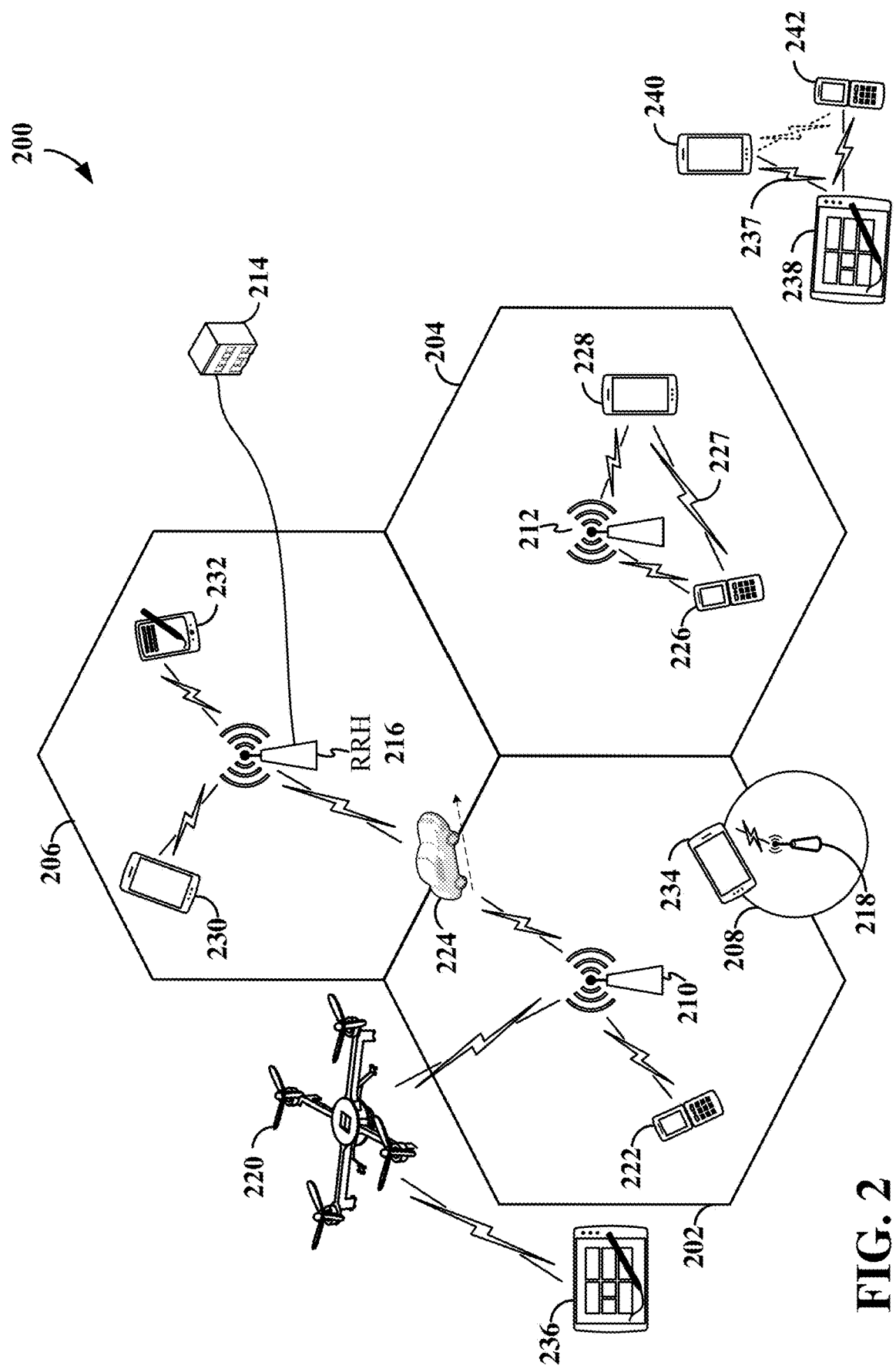
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and the UAV 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with a mobile base station, such as the UAV 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
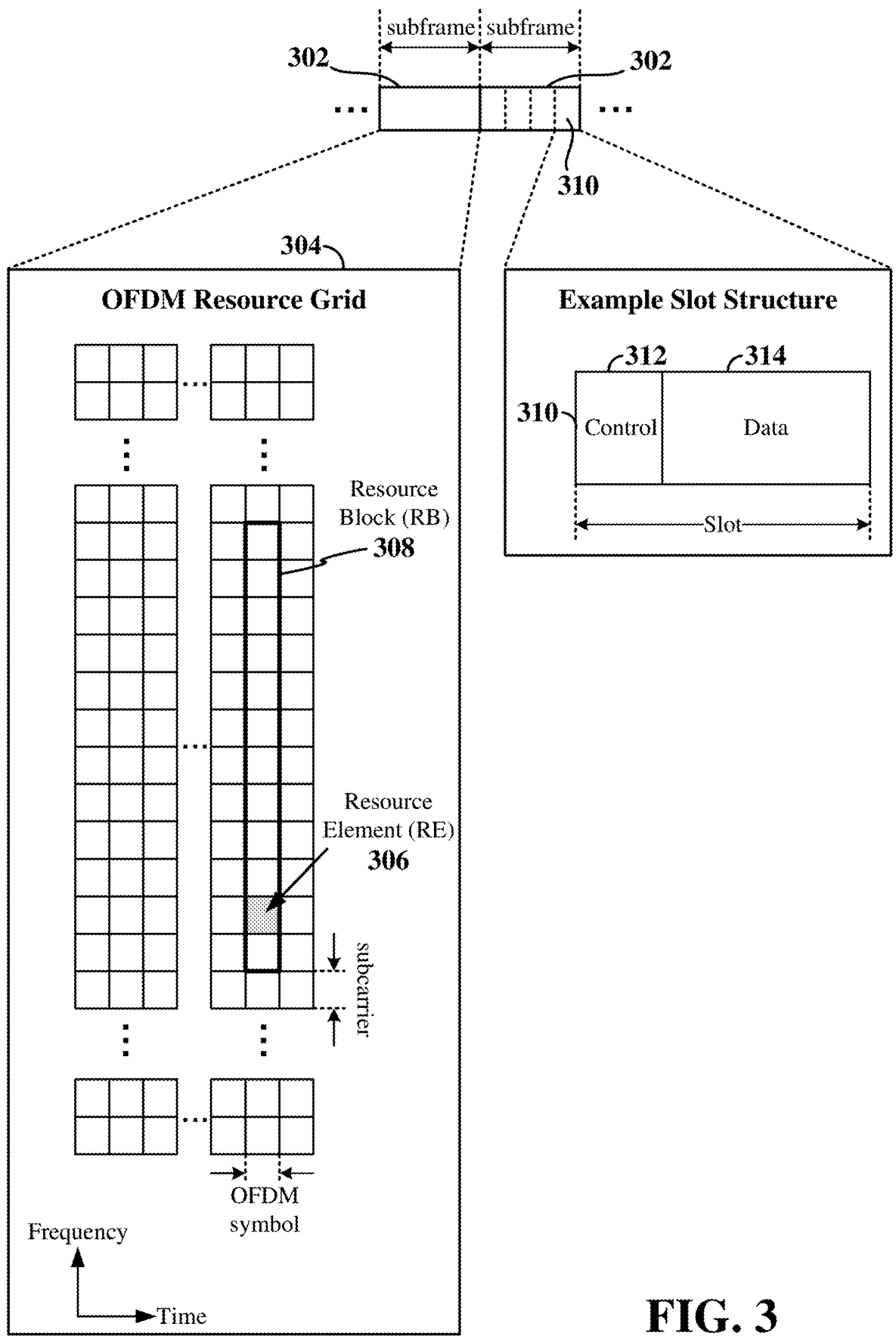
FIG. 3 is a schematic illustration of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4A:
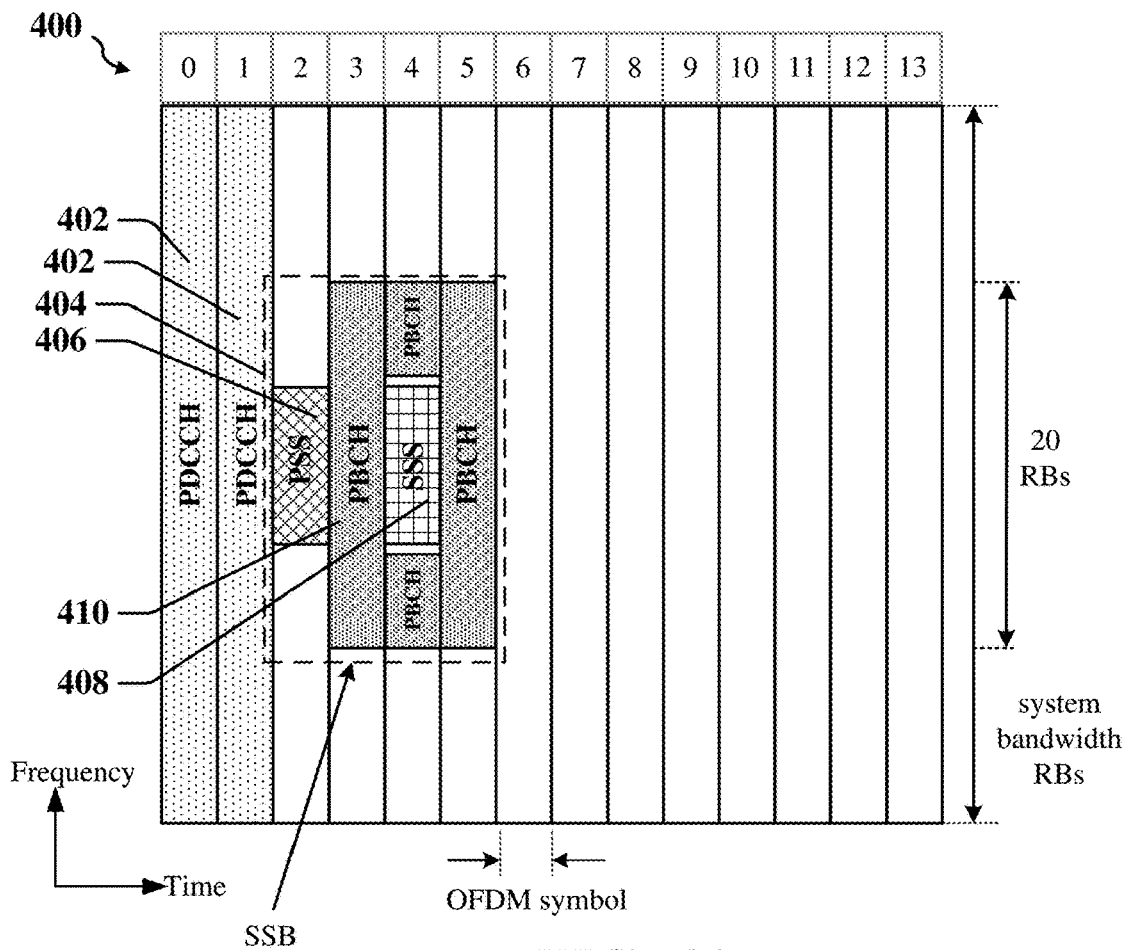
FIG. 4A is a diagram illustrating an example of a frame structure of synchronization signals for use in a wireless communication network according to some aspects.

FIG. 4A illustrates an example 400 of various downlink channels within a subframe of a frame including channels used for initial access and synchronization. As shown in FIG. 4A, a physical downlink control channel (PDCCH) 402 is transmitted in at least two symbols (e.g., symbol 0 and symbol 1) and may carry DCI within one or more control channel elements (CCEs), with each control channel element (CCE) including nine RE groups (REGs), and each RE group (REG) including four consecutive REs in an OFDM symbol. Additionally, FIG. 4A illustrates an exemplary synchronization signal block (SSB) 404 that may be periodically transmitted by a base station or gNB. The SSB 404 carries synchronization signals PSS 406 and SSS 408 and broadcast channels (PBCH) 410. In this example, the SSB 404 contains one PSS symbol (shown in symbol 2), one SSS symbol (shown in symbol 4) and two PBCH symbols (shown in symbols 3 and 5). The PSS and SSS combination may help to identify about 1008 physical cell identities. A UE uses the PSS to determine subframe/symbol timing and a physical layer identity. The SSS is used by a UE to determine a physical layer cell identity group number and radio frame timing. Based on the physical layer identity and the physical layer cell identity group number, the UE can determine a physical cell identifier (PCI). Also, based on the PCI, the UE can determine the locations of the aforementioned DM-RS. The physical broadcast channel (PBCH), which carries a master information block (MIB), is logically grouped with the PSS and SSS to form the synchronization signal; i.e., SSB 404. The MIB provides a number of RBs in the system bandwidth and a system frame number (SFN).

Figure 4B:
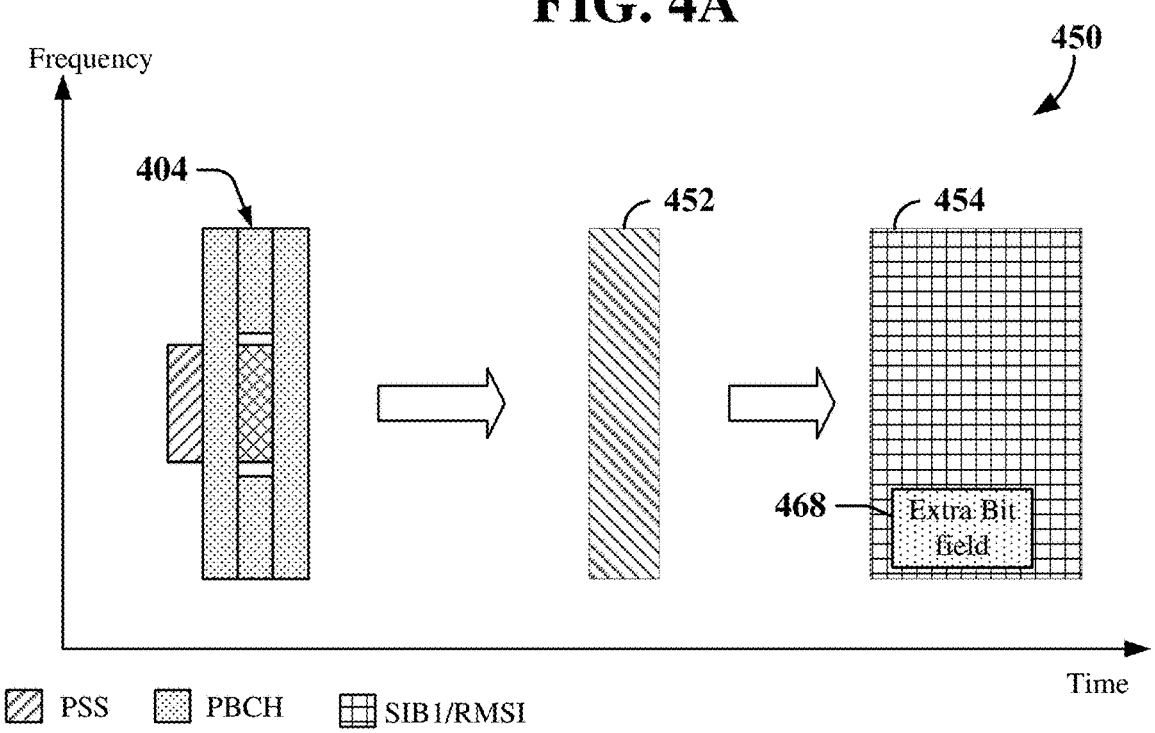
FIG. 4B is a diagram illustrating an example of a portion of a frame or subframe structure with various channels and associated messages for use in a wireless communication network according to some aspects.

The physical downlink shared channel (PDSCH) carries user data, broadcast system information not transmitted through the PBCH such as system information blocks (SIBs), and paging messages. As an example, FIG. 4B is a diagram illustrating broadcast information 450 related to initial cell access according to some examples. The broadcast information 450 may be transmitted by a RAN node (e.g., a base station, such as an eNB or gNB) on resources (e.g., time-frequency resources) allocated for the transmission of the broadcast information 450 in a cell. The broadcast information 450 includes SSB 404 illustrated in FIG. 4A. It is noted that the PBCH in SSB 404 includes the MIB carrying various system information (SI) including, for example, a cell barred indication, the subcarrier spacing, the system frame number, and scheduling information for a CORESET0 452. For example, the PBCH in SSB 404 may include scheduling information indicating time-frequency resources allocated for the CORESET0 452. In some examples, the CORESET0 452 may be transmitted within the first four symbols (e.g., within a control region) of a slot. In addition, the CORESET0 452 carries a PDCCH with DCI that contains scheduling information for scheduling the SIB1 454. The SIB1 454 is carried within a physical downlink shared channel (PDSCH) within a data region of a slot. In addition, the SIB1 454 contains the RMSI including, for example, a set of radio resource parameters providing network identification and configuration. For example, the set of radio resource parameters may include a bandwidth (e.g., number of BWPs) on which a UE may communicate with a base station.

FIG. 4B also illustrates that the RMSI in SIB1 message 454 may also include an extra bit field 468. The time/frequency location of this bit field 468 is merely exemplary to show that this bit field 468 utilizes some of the time and frequency resources of the SIB1 message 454.

A brief discuss of an initial access procedure for a UE using the above information follows. As discussed above, a BS may transmit synchronization signals (e.g., including PSS and SSS) in the network to enable UEs to synchronize with the BS, as well as SI (e.g., including a MIB, RMSI, and OSI) to facilitate initial network access. The BS may transmit the PSS, the SSS, and/or the MIB via SSBs over the PBCH and may broadcast the RMSI and/or the OSI over the PDSCH.

A UE attempting to access a RAN may perform an initial cell search by detecting a PSS from a BS (e.g., the PSS of a cell of the BS) of a RAN. The PSS may enable the UE to synchronize to period timing of the BS and may indicate a physical layer identity value assigned to the cell. The UE may also receive an SSS from the BS that enables the UE to synchronize on the radio frame level with the cell. The SSS may also provide a cell identity value, which the UE may combine with the physical layer identity value to identify the cell.

After receiving the PSS and SSS, the UE may receive the SI from the BS. The system information may take the form of the MIB and SIBs discussed above. The system information includes essential or critical information for a UE to access the network such as downlink (DL) channel configuration information, uplink (UL) channel configuration information, access class information, and cell barring information, as well as other less critical information. The MIB may include SI for initial network access and scheduling information for RMSI and/or OSI. After decoding the MIB, the UE may receive the RMSI and/or the OSI.

The SI includes information that enables a UE to determine how to conduct an initial access to a RAN (e.g., the RAN 200 of FIG. 2). In some examples, SIB2 includes random access configuration information (e.g., a RACH configuration) that indicates the resources that the UE is to use to communicate with the RAN during initial access. The random access configuration information may indicate, for example, the resources allocated by the RAN for a RACH procedure. For example, the RACH configuration may indicate the resources allocated by the network for the UE to transmit a physical random access channel (PRACH) preamble and to receive a random access response. In some examples, the RACH configuration identifies monitoring occasions (MOs) that specify a set of symbols (e.g., in a PRACH slot) that are scheduled by a base station for the RACH procedure. The RACH configuration may also indicate the size of a random access response window during which the UE is to monitor for a response to a PRACH preamble. The RACH configuration may further specify that the random access response window starts a certain number of sub-frames after the end of the PRACH preamble in some examples. After obtaining the MIB, the RMSI and/or the OSI, the UE may thus perform a random access procedure for initial access to the RAN.

Figure 5:
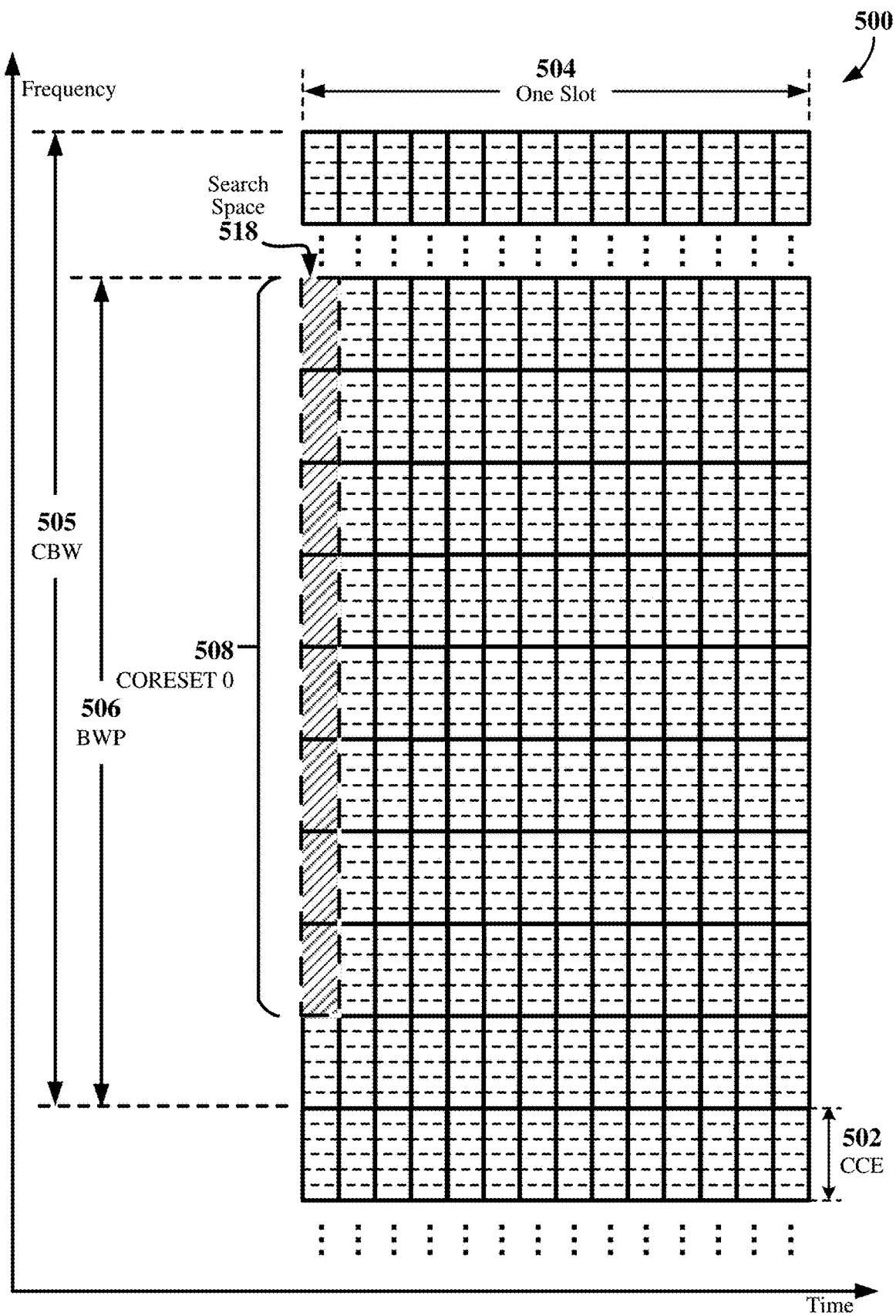
FIG. 5 is another schematic illustration of an organization of wireless resources in an air interface utilizing OFDM according to some aspects.

FIG. 5 is another schematic illustration of an organization of wireless resources in an air interface utilizing OFDM according to some aspects of the disclosure. In FIG. 5, time is in the horizontal direction with units of OFDM symbols and frequency is in the vertical direction with units of CCEs. For example, the vertical dimension of each major solid line rectangle represents one CCE 502. Each CCE 502 includes 6 resource element groups (REGs). Each REG may correspond to one physical resource block (PRB), including 12 resource elements (REs) in the frequency domain and one OFDM symbol in the time domain. The 6 REGs of each CCE 502 are respectively represented by a minor dashed line rectangle. One slot 504 in the time domain is represented. The time-frequency resources of FIG. 5 are depicted in a downlink resource grid 500.

FIG. 5 depicts one bandwidth part (BWP) 506 within a carrier bandwidth (CBW) 505. According to some aspects, the BWP 506 is a contiguous set of physical resource blocks (PRBs) on a given carrier. In FIG. 5, the contiguous set of PRBs are represented by a contiguous set of CCEs 502. In the example of FIG. 5, the BWP 506 corresponds to a set of 54 PRBs, which represent 648 subcarriers (i.e., 12 REs/REG×6 REGs/CCE×9 CCE). A scheduling entity (e.g., a base station) can define common CCEs and scheduled entity-specific (e.g., UE-specific) CCEs.

In FIG. 5, for example, CORESET 0 508 includes 48 REGs in one set of eight CCEs (where each CCE may be similar to CCE 502). The eight CCEs may be grouped as a first DCI.

One search space is identified in the downlink resource grid 500. The search space 518 may include all of CORESET 0 508. The search space is depicted as dashed line rectangles.

A search space may include a number of PDCCH candidates. There may be a mapping between a CORESET and a search space. For example, a CORESET may include a plurality of search spaces. In general, the UE may attempt to blind decode a PDCCH candidate in each search space; even if a base station did not schedule a PDCCH in any given search space. A CORESET may be associated with a common search space, a UE-specific search space, or a combination of both.

The following relationships between CORESETs, BWPs, and search spaces are made with reference to NR; however, the following is exemplary and non-limiting and other relationships between CORESETs, BWPs, and search spaces (or their equivalents, for example in other radio technologies) are within the scope of the disclosure. In general, there may be up to three CORESETs per BWP, including both common and UE-specific CORESETs. There may be up to four BWPs per serving cell, with one of the BWPs active at a given time. Accordingly, a maximum number of CORESETs per serving cell may be twelve (e.g., 3 CORESETs per BWP×4 BWPs per serving cell). The resource elements of a CORESET may be mapped to one or more CCEs. One or more CCEs from one CORESET may be aggregated to form the resources used by one PDCCH. Blind decoding of PDCCH candidates may be based on search spaces. A maximum number of search spaces per BWP may be ten. Multiple search spaces may use the time-frequency resources of one CORESET.

According to one example, a base station may compute a cyclic redundancy check (CRC) of a payload of a DCI carried by a PDCCH. The CRC may be scrambled using an identifier of a UE. An example of such an identifier may be a radio network temporary identifier (RNTI), such as a random access-radio network temporary identifier (RA-RNTI). Upon receipt of a DCI, the UE may descramble the CRC using the RNTI and compute a CRC on the payload of the DCI using the same procedure as used by the base station. The UE may then compare the CRCs. If the CRCs are equal, the DCI was meant for the scheduled entity. If the payload was corrupted or the CRC was scrambled using another scheduled entity's identification, then the CRCs would not match, and the scheduled entity may disregard the DCI.

Figure 6:
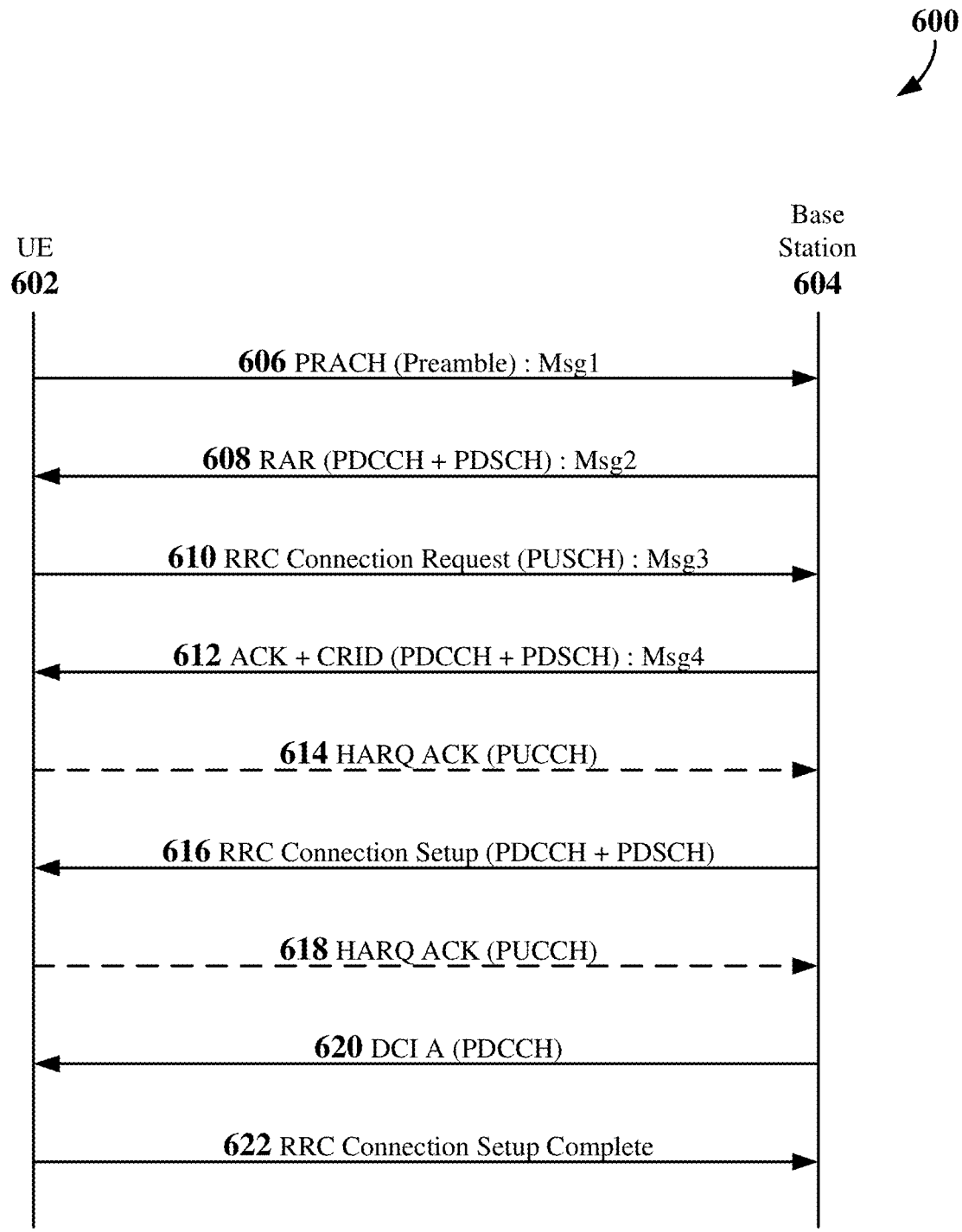
FIG. 6 is a signaling diagram illustrating a random access channel (RACH) procedure that may take place during initial access of a UE according to some aspects.

FIG. 6 is a signaling diagram illustrating a random access channel (RACH) procedure 600 that may take place during initial access of a UE 602 according to some aspects of the disclosure. The call flow diagram depicts messages exchanged between the UE 602 and a base station 604 (e.g., a gNB, an eNB). The RACH procedure for initial access may be upon power up of the UE 602 or upon initial access from an RRC_Idle state. A RACH procedure may also be triggered, for example, upon RRC connection re-establishment, handover, DL or UL data arrival during RRC_CONNECTED when UL synchronization status is "non-synchronized," transition from RRC_INACTIVE, to establish time alignment at secondary cell (SCell) addition, upon a request for other system information (SI), or upon beam failure recovery.

To begin the RACH procedure 600, the UE 602 transmits a first message including a physical random access channel (PRACH) preamble 606 to the base station 604. The transmission of the PRACH preamble may be referred to as Msg1. The UE 602 may transmit the PRACH preamble with an RNTI calculated by the UE 602. The RNTI may be an RA-RNTI, for example.

At 608, the base station 604 responds with a second message including a random access response (RAR) (also referred to as a RACH Response). The second message may be referred to as Msg2 and may include both a PDCCH, which may be referred to herein as Msg2(PDCCH), and a PDSCH carrying the RAR, referred to herein as Msg2 (PDSCH). The Msg2(PDCCH) may be used to transmit downlink control information (DCI) indicating the downlink shared channel (e.g., PDSCH) resource allocation (e.g., the set of resource blocks containing the downlink shared channel), transport format and information related to the downlink shared channel hybrid automatic repeat request (HARQ).

To form a PDCCH payload, the DCI undergoes channel coding: addition of a CRC attachment and RNTI masking followed by polar coding and rate matching according to PDCCH format capacity. The coded DCI bits (i.e. the PDCCH payload) are then mapped to control channel elements (CCEs) (such as the CCE 502 of FIG. 5) according to the PDCCH format.

At the receiver, the UE 602 is required to perform blind decoding of the PDCCH payload as the UE 602 is not aware of the detailed control channel structure, including the number of control channels and the number of CCEs to which each control channel is mapped. Multiple PDCCHs may be transmitted in a single subframe. Not all of the PDCCHs may be relevant to a particular UE. The UE 602 discovers the PDCCH that is specific to the UE by monitoring a set of PDCCH candidates (a set of consecutive CCEs on which a PDCCH could be mapped) in every subframe. The UE 602 may use its radio network temporary identifier (RNTI) to try to decode the PDCCH candidates. As described above, the RNTI may be used to demask a PDCCH candidate's CRC. The UE 602 may determine that a PDCCH candidate carries the UE's control information (DCI) if no CRC error is detected.

The PDCCH may carry, for example, scheduling assignments and other control information in the form of DCI messages. A PDCCH is transmitted on one CCE or an aggregation of several consecutive CCEs. As described above, a CCE may correspond to six Resource Element Groups (REGs).

The UE 602 may try to detect the DCI of the Msg2 (PDCCH) that is intended for the UE 602 using the RNTI the UE 602 transmitted to the base station 604 in the Msg1. The DCI of the Msg2(PDCCH) may be scrambled or masked with the RNTI of the UE 602 (e.g., a RA-RNTI). The UE 602 may determine that the DCI of the Msg2(PDCCH) is intended for the UE 602 by demasking a CRC of the DCI using the RNTI and comparing the demasked CRC with a CRC calculated by the UE 602. If the CRCs are equal, the DCI is intended for the UE 602 (e.g., the UE 602 validated the demasked CRC). If the CRCs are not equal, the UE 602 may determine that the CRC was masked using a RNTI associated with another UE.

The UE 602 may attempt to detect the DCI of the Msg2(PDCCH) transmission (masked with the RNTI) within monitoring occasions of a period of time referred to as a RAR-Window. The RAR-Window may be configured by a rar-WindowLength information element (IE) in the SIB1 (RMSI) message.

According to some aspects, the UE 602 may attempt to detect the DCI of the Msg2(PDCCH) in a Type 1 PDCCH common search space, such as the search space 518 of FIG. 5. A search space may include multiple PDCCH candidates. The Type 1 PDCCH common search space is a subset of NR PDCCH search space that is dedicated to the transmission of the PDCCH with a CRC scrambled by RA-RNTI, TC-RNTI, or C-RNTI on a primary cell. The UE 602 may monitor this search space during the entire RACH procedure 600. The UE 602 may search this space to find the DCI of the Msg2(PDCCH) and may use the information of Msg2 (PDCCH) DCI to locate and decode Msg2(PDSCH).

The Type 1 PDCCH common search space may be explicitly configured by ra-ControlResourceSet in PDCCH-ConfigCommon. The RRC message or IE that may carry the PDCCH-ConfigCommon can include SIB1, BWP-DownlinkCommon, and BWP-DownlinkDedicated. If the configuration for the Type 1 PDCCH common search space is not explicitly configured in an RRC message (ra-ControlResourceSet and ra-SearchSpace), the UE 602 may search for the configuration in Type 0 PDCCH common search space. The Type 0 PDCCH common search space is a subset of NR PDCCH search space that is dedicated to transmitting the PDCCH for system information (SI) message (SIB) decoding.

The DCI format for scheduling the RAR PDSCH may be, for example, DCI format 1_0 with CRC scrambled by RA_RNTI. This DCI format may be used to schedule the RAR Msg2 in the RACH procedure. This DCI format carries a frequency domain resource assignment, a time domain resource assignment, a virtual resource block (VRB) to physical resource block (PRB) mapping, the modulation and coding scheme, and transport block (TB) scaling.

The DCI of the Msg2(PDCCH) carries resource block (RB) resource information that allows the UE to locate the Msg2(PDSCH). Once the Msg2(PDCCH) is decoded, the UE 602 can find the downlink transport block (carrying the Msg2(PDSCH)) transmitted over the PDSCH. The UE 602 may then decode the Msg2(PDSCH), which carries the RAR. After decoding the Msg2(PDSCH) and the RAR data carried therein, the UE 602 may check that a random access preamble identifier (RAPID) field in the RAR data matches a RAPID assigned to the UE 602. The RAPID field identifies the transmitted random access preamble (also referred to herein as the PRACH preamble).

According to some aspects, the PDCCH and PDSCH transmissions may be carried using a subcarrier spacing (SCS) and cyclic prefix (CP) indicated in the SIB1 (i.e., in the RMSI). The PDCCH and PDSCH may use the same SCS and CP.

At 610, the UE 602 may transmit an RRC connection request, referred to as a Msg3(PUSCH). At 612, the base station 604 may transmit an ACK and contention resolution identifier (CRID) to the UE 602 in the Msg4(PDCCH) and Msg4(PDSCH) messages. Thereafter, at 614, the UE 602 may respond with a HARQ ACK, which may be carried over PUCCH. Next, at 616, the base station 604 may transmit an RRC connection setup message over the PDCCH and PDSCH channels. At 618, the UE 602 may again transmit a HARQ ACK over the PUCCH. Thereafter, at 620, the base station 604 may transmit a DCI A over the PDCCH. The base station 604 may send the DCI A via the PDCCH. The DCI A may carry the UL grant for the PUSCH that will carry an RRC connection setup complete message. At 622, the UE 602 may respond by sending the RRC connection setup complete message via the granted PUSCH.

Figure 7:
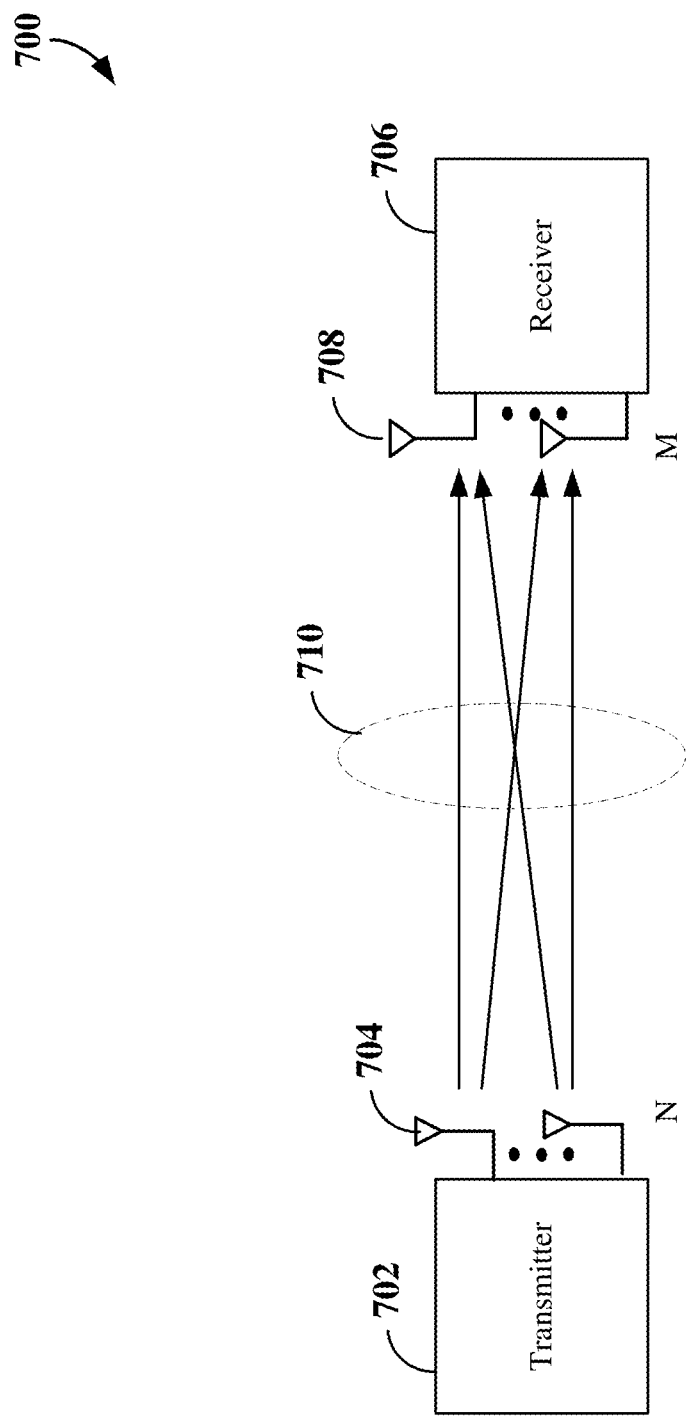
FIG. 7 is a block diagram illustrating an example of a wireless communication system supporting beamforming and/or multiple-input multiple-output (MIMO) communication according to some aspects.

A scheduling entity (e.g., a base station) and/or scheduled entity (e.g., a UE) may be configured for beamforming and/or multiple-input multiple-output (MIMO) technology. FIG. 7 illustrates an example of a wireless communication system 700 supporting beamforming and/or MIMO. In a MIMO system, a transmitter 702 includes multiple transmit antennas 704 (e.g., N transmit antennas) and a receiver 706 includes multiple receive antennas 708 (e.g., M receive antennas). Thus, there are N×M signal paths 710 from the transmit antennas 704 to the receive antennas 708. Each of the transmitter 702 and the receiver 706 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the wireless communication system 700 (MIMO system) is limited by the number of transmit or receive antennas 704 or 708, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 7, a rank-2 spatial multiplexing transmission on a 2×2 MIMO antenna configuration will transmit one data stream from each transmit antenna 704. Each data stream reaches each receive antenna 708 along a different signal path 710. The receiver 706 may then reconstruct the data streams using the received signals from each receive antenna 708.

Beamforming is a signal processing technique that may be used at the transmitter 702 or receiver 706 to shape or steer an antenna beam (e.g., a transmit beam or receive beam) along a spatial path between the transmitter 702 and the receiver 706. Beamforming may be achieved by combining the signals communicated via antennas 704 or 708 (e.g., antenna elements of an antenna array module) such that some of the signals experience constructive interference while others experience destructive interference. To create the desired constructive/destructive interference, the transmitter 702 or receiver 706 may apply amplitude and/or phase offsets to signals transmitted or received from each of the antennas 704 or 708 associated with the transmitter 702 or receiver 706.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub-6 GHz systems.

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station. In some examples, to select one or more downlink transmit beams and one or more downlink receive beams for communication with a UE, the base station may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a beam measurement report to the base station indicating the RSRP of each of the measured downlink transmit beams. The base station may then select one or more serving downlink beams (e.g., downlink transmit beams and downlink receive beams) for communication with the UE based on the beam measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RS s) during an uplink or downlink beam sweep. For example, the base station may determine the uplink beams either by uplink beam management via a SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of a SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Figure 8:
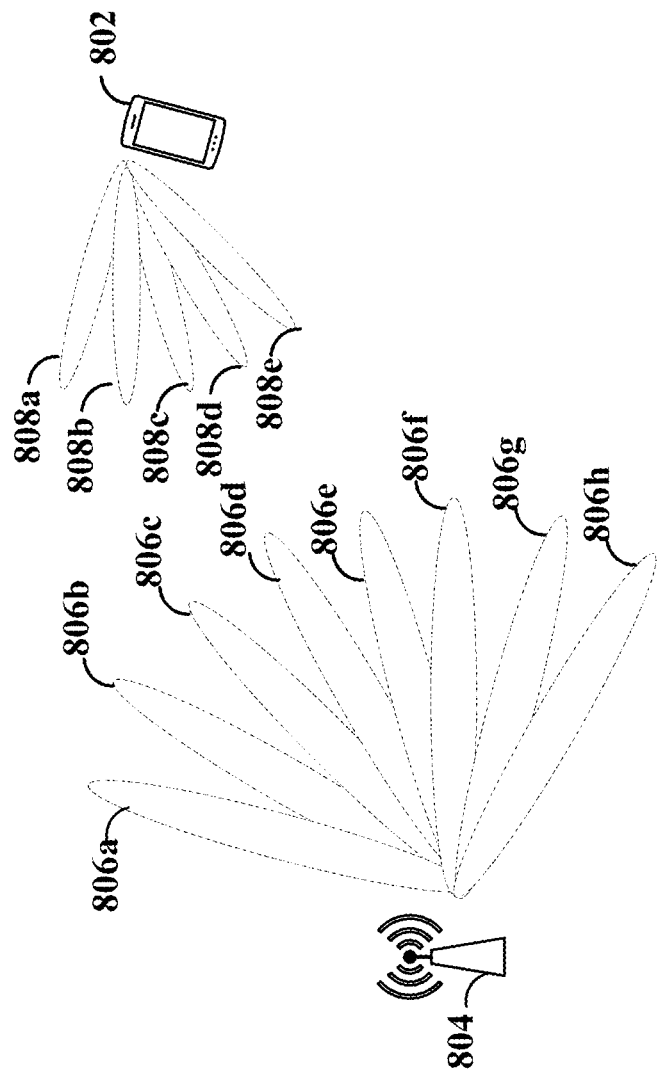
FIG. 8 is a diagram illustrating an example of communication between a radio access network (RAN) node and a wireless communication device using beamforming according to some aspects.

FIG. 8 is a diagram illustrating communication between a base station 804 and a UE 802 using beamformed signals according to some aspects. In some examples, the base station 804 may correspond to any of the base stations or scheduling entities shown in any of FIG. 1, 2, 6, 7, 12, or 19.

In some examples, the UE 802 may correspond to any of the UEs or scheduled entities shown in any of FIG. 1, 2, 6, 7, or 12.

In the example shown in FIG. 8, the base station 804 is configured to generate a plurality of beams 806a-806h, each associated with a different beam direction. In addition, the UE 802 is configured to generate a plurality of beams 808a-808e, each associated with a different beam direction. The base station 804 and UE 802 may select one or more beams 806a-806h on the base station 804 and one or more beams 808a-808e on the UE 802 for communication of uplink and downlink signals therebetween using a downlink beam management scheme and/or an uplink beam management scheme.

In an example of a downlink beam management scheme for selection of downlink beams, the base station 804 may be configured to sweep or transmit on each of a plurality of downlink transmit beams 806a-806h during one or more synchronization slots. For example, the base station 804 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 806a-806h transmitted during a same symbol may not be adjacent to one another. In some examples, the base station 804 may transmit more or less beams distributed in all directions (e.g., 360 degrees).

In addition, the UE 802 is configured to receive the downlink beam reference signals on a plurality of downlink receive beams 808a-808e. In some examples, the UE 802 searches for and identifies each of the downlink transmit beams 806a-806h based on the beam reference signals. The UE 802 then performs beam measurements (e.g., RSRP, SINR, RSRQ, etc.) on the beam reference signals on each of the downlink receive beams 808a-808e to determine the respective beam quality of each of the downlink transmit beams 806a-806h as measured on each of the downlink receive beams 808a-808e.

The UE 802 can generate and transmit a beam measurement report, including the respective beam index and beam measurement of each downlink transmit beam 806a-806h on each downlink receive beam 808a-808e to the base station 804. The base station 804 may then select one or more downlink transmit beams on which to transmit unicast downlink control information and/or user data traffic to the UE 802. In some examples, the selected downlink transmit beam(s) have the highest gain from the beam measurement report. In some examples, the UE 802 can further identify the downlink transmit beams selected by the base station from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The base station 804 or the UE 802 may further select a corresponding downlink receive beam on the UE 802 for each selected serving downlink transmit beam to form a respective downlink beam pair link (BPL) for each selected serving downlink transmit beam. For example, the UE 802 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In a communication system, such as a 5G NR system operating in FR2, that employs beamforming (e.g., as described in FIGS. 7 and 8), a RACH procedure (e.g., as described in FIG. 6) may be based on beamformed signaling. For example, a UE's transmission of a PRACH preamble and reception of an RAR may involve selecting the beams to be used for the RACH procedure (e.g., as described in FIG. 8).

In some scenarios, due to the relatively high path loss associated with millimeter-wave frequencies (e.g., FR2), a UE might not be able to reliably decode RAR PDCCH messages (e.g., a Msg2 PDCCH) sent by a base station. Consequently, the transmissions of such messages (e.g., Msg2 PDCCHs) may result in bottlenecks in 5G NR coverage (e.g., in FR2).

The PDCCH is utilized several times during the RACH procedure as described above. Improvements in PDCCH coverage may therefore be beneficial to an overall operation of a wireless communication network, such those employing 5G NR for wireless exchanges between a UE 602 and a base station 604. Opportunities to improve PDCCH coverage will come more frequently as wireless network systems continue to expand toward operation at ever higher frequencies. One way to improve PDCCH coverage, in all bands including FR2, may be to use PDCCH repetition on aggregated monitoring occasions. Although PDCCH repetition may be used for all messages carried over the PDCCH (e.g., Msg2 (PDCCH), Msg4(PDCCH), RRC Connection Setup (PDCCH), and DCI A (PDCCH)), this disclosure exemplifies PDCCH repetition in the context the repetition of PDCCH candidates comprising the Msg2(PDCCH).

A Msg2 PDCCH transmission could be repeated to enable a UE to successfully decode the Msg2 PDCCH transmission. However, a monitoring occasion (e.g., as shown in FIG. 8) may be too short to support UE-specific repetition of the Msg2 PDCCH transmission. To address this issue, a Msg2 PDCCH repetitions could be transmitted across multiple monitoring occasions. However, this approach involves increased overhead associated with signaling additional UE-specific parameters, such as the number of repetitions and the start time of the repetition. Moreover, relatively scarce signaling resources would need to be reallocated for carrying these parameters.

Another repetition approach involves repeating the Msg2 PDCCH on aggregated monitoring occasions. At the UE, at the aggregated slots for the Msg2 PDCCH repetitions, the corresponding Msg2 PDCCH candidates with the same aggregation and location (and/or index) are paired together. The UE then performs a soft combination of the Msg2 PDCCH candidates, followed by decoding and CRC checking.

In this approach, the portion or portions of the RAR window where Msg2 PDCCH repetition is performed, slots may be grouped to groups of consecutive k slots (where k may depend on the associated portion of the RAR window) and the CORESET locations in each group of aggregated slots may form one monitoring occasion. In some examples, the RAR window may be partitioned into two or multiple parts with increasing aggregation of slots for Msg2 PDCCH combining. In some examples, the RAR window may be appended with an additional segment or additional segments and the Msg2 PDCCH repetition with soft combination may be applied to that combination. In some examples, the first segment of the RAR window may include Msg2 PDCCH information for legacy UEs and the first segment of the RAR window may include Msg2 PDCCH information (with repetition) for non-legacy UEs.

Figure 9:
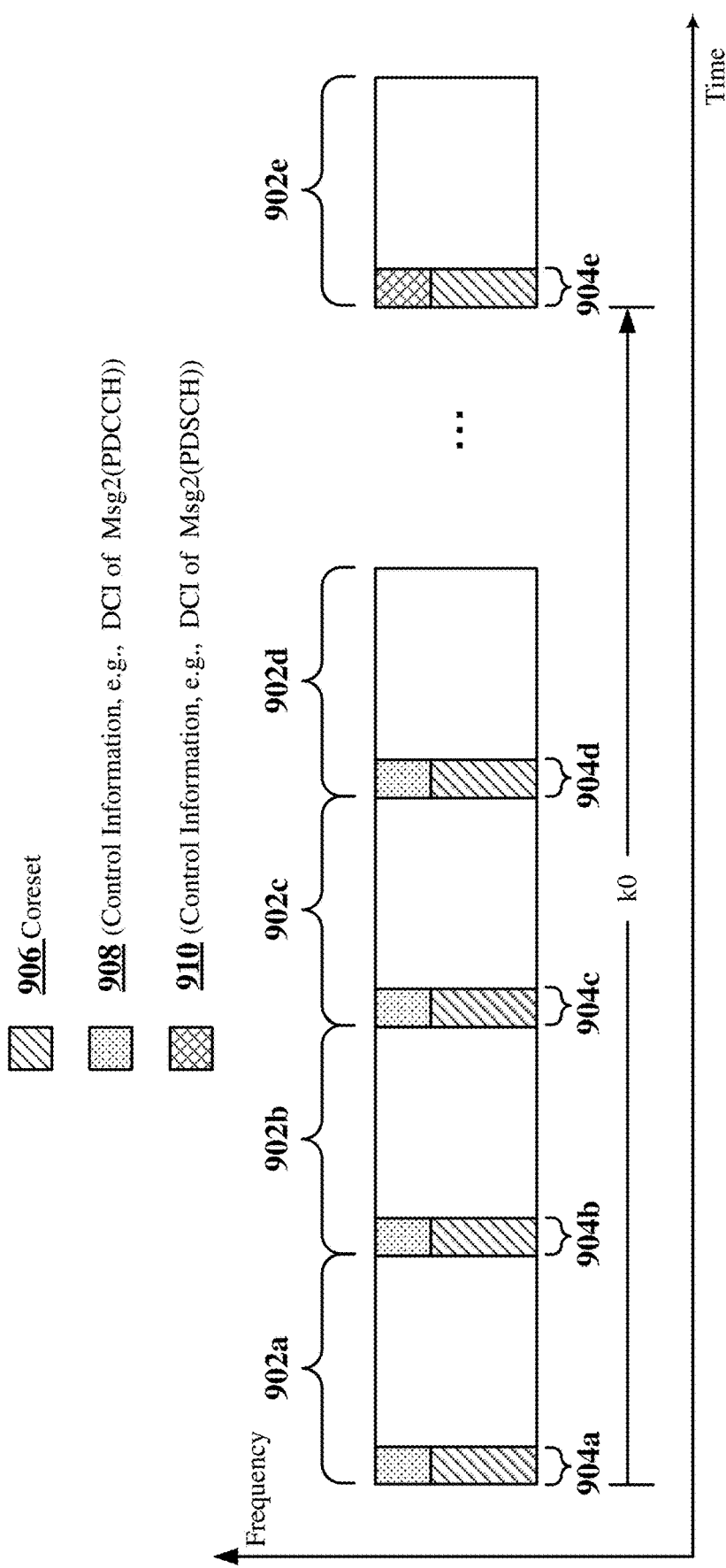
FIG. 9 is another schematic illustration of an organization of wireless resources in an air interface utilizing OFDM according to some aspects.

FIG. 9 is another schematic illustration of an organization of wireless resources in an air interface utilizing OFDM according to some aspects of the disclosure. FIG. 9 depicts a plurality of slots 902a, 902b, 902c, 902d, 902e and a corresponding plurality of PDCCH monitoring occasions 904a, 904b, 904c, 904d, 904e. Each of the slots 902a, 902b, 902c, 902d, 904e is depicted with a respective CORESET 906a, 906b, 906c, 906d, 906e. The use of one CORESET per slot is exemplary and non-limiting; a slot may include one or more CORESETS. Each respective CORESET 906a, 906b, 906c, 906d, 906e may include one or more PDCCH candidates.

In the example of FIG. 9, respective PDCCH candidates include respective Msg2(PDCCHs). A first Msg2(PDCCH) 908a in a first slot 902a may be referred to as a first, original, or regular Msg2(PDCCH) (referred to hereinafter as regular Msg2(PDCCH) 908a). The second Msg2(PDCCH) 908b in the second slot 902b, the third Msg2(PDCCH) 908c in the third slot 902c, and the fourth Msg2(PDCCH) 908d in the fourth slot 902d are repetitions of the regular Msg2 (PDCCH) 908a. Being repetitions, they each carry the same information, including a timing offset, k0, used by a UE to determine a location of the Msg2(PDSCH) 910. The timing offset, k0, may be given in terms of the number of slots after the PDCCH carrying the Msg2(PDCCH) DCI 908a that includes k0. Also depicted in FIG. 9 is an nth slot 902e with a CORESET 904e which includes the Msg2(PDSCH) 910 therein.

The example of FIG. 9 illustrates how a base station may transmit a number of repetitions of the control information 908 in a number of consecutive slots. Use of PDCCH repetition during a random access procedure may improve a UE's ability to establish a connection (e.g., an RRC connection) with a base station.

As depicted, a control resource set (CORESET) 906 may exist within each slot 902. A repetition of control information 908 may be included within each CORESET 906. A base station may transmit all repetitions of control information 908 associated with a single RAR such that the UE may receive all repetitions of the control information 908 in a plurality of monitoring occasions 904. The base station may provide each repetition of the control information 908 at the same location in each consecutive slot. In one example, each repetition of the control information 908 may include the same number of CCEs. The UE may link all repetitions of control information having the same number of CCEs together, for combination. Additionally, or alternatively, each repetition of the control information 908 may be associated with a same index that the UE may use to link (e.g., combine) associated repetitions of the control information 908 together for combination. In some cases, one or more repetitions of the control information 908 may be in different locations in each of the plurality of slots 902.

According to some aspects, a UE configured to implement PDCCH repetition may be preconfigured, or may be configured by signaling, to know a location of PDCCH candidates that may have the same aggregation and location and/or index. The UE may then soft combine the coded bits of the aggregated PDCCH candidates, before checking the CRCs and decoding the soft combined coded bits of the aggregated PDCCH candidates. In soft combination, the UE combines the symbols of PDCCH candidates with each other prior to decoding the combined signals. Soft combining may improve an effective signal-to-interference-plus-noise ratio (SINR). For example, a combination of four copies of signals at four PDCCH candidate locations may improve the SINR by about 6 dB.

An issue arises for legacy UEs that are not configured to implement PDCCH repetition. The issue may relate to the timing information, k0, carried by the DCI of the Msg2 (PDCCH) 908. This timing information, k0, permits the UE to locate a corresponding Msg2(PDSCH) 910. The Msg2 (PDSCH) 910 includes a DCI that carries RAR data used by the UE in the RACH procedure.

A UE configured to use PDCCH repetition may recognize that the timing offset, k0, repeated in each Msg2(PDCCH) DCI 908a, 908b, 908c, 908d is expressed relative to a location of the regular Msg2(PDCCH) 908a. However, a legacy UE, which is not configured to implement PDCCH repetition, may not decode Msg2(PDCCH) 908a. For example, the legacy UE may decode Msg2(PDCCH) 908c and incorrectly interpret the timing offset, k0, included in the decoded Msg2(PDCCH) 908c as being made relative to the location of the Msg2(PDCCH) 908c. In this circumstance, the legacy UE would not find the Msg2(PDSCH) 910 (because of the incorrect timing association between Msg2 (PDCCH) 908c and the Msg2(PDSCH) 910).

To address this timing issue, PDCCH repetition could be applied only in response to a new type of PRACH transmission (e.g., a PRACH repetition associated with a specific subset of preambles). A legacy UE would be unable to use the new type of PRACH transmission and therefore would be unaffected. However, this solution could only be applied in environments where non-legacy UEs know to use, and have access to, the specific alternative new type of PRACH transmission.

Another previous solution involved segmenting the RAR window into two segments. The first segment may be used by legacy UEs and the second segment may be used for UEs implementing PDCCH repetition. However, segmenting the RAR window reduces the length (duration) of the RAR window for the legacy UEs. Reducing the length of the RAR window may reduce a legacy UE's chance of Msg2 (PDCCH) reception.

Another previous solution involved taking no action. In other words, no provision would be made for a legacy UE to operate in an environment that implements PDCCH repetition. In this case, if the legacy UE unknowingly detects a repeated PDCCH and incorrectly interprets the k0 timing, the legacy UE will attempt to detect a Msg2(PDSCH) 910 in the wrong location. This will result in a loss of PDSCH detection for the legacy UE. While this worsens the performance of the legacy UE, it does not cause a catastrophic failure of the legacy UE or of the base station serving the legacy UE. However, in this case, a portion of the control resources used by the legacy UE is wasted. Also, in this case, the legacy UE would waste power, which would be unnecessarily consumed while the legacy UE attempted to decode an Msg2(PDSCH) in a place where the Msg2(PDCCH) does not exist. Additionally, using the example of FIG. 9, it may be recognized that when the legacy UE operates in the environment that implements PDCCH repetition, the PDCCH monitoring opportunities for the legacy UE are reduced. For example, while a new UE may take advantage of all four PDCCH monitoring occasions 904a, 904b, 904c, and 904d, only one monitoring occasion, 904a, would be useable by the legacy UE.

The methods and apparatus described herein and explored in greater detail in connection with FIG. 8, may implement PDCCH repetition process(es) that may resolve issues with legacy UEs, enhance PDCCH coverage, and improve PDCCH repetition, aggregation, and decoding processes.

Figure 10:
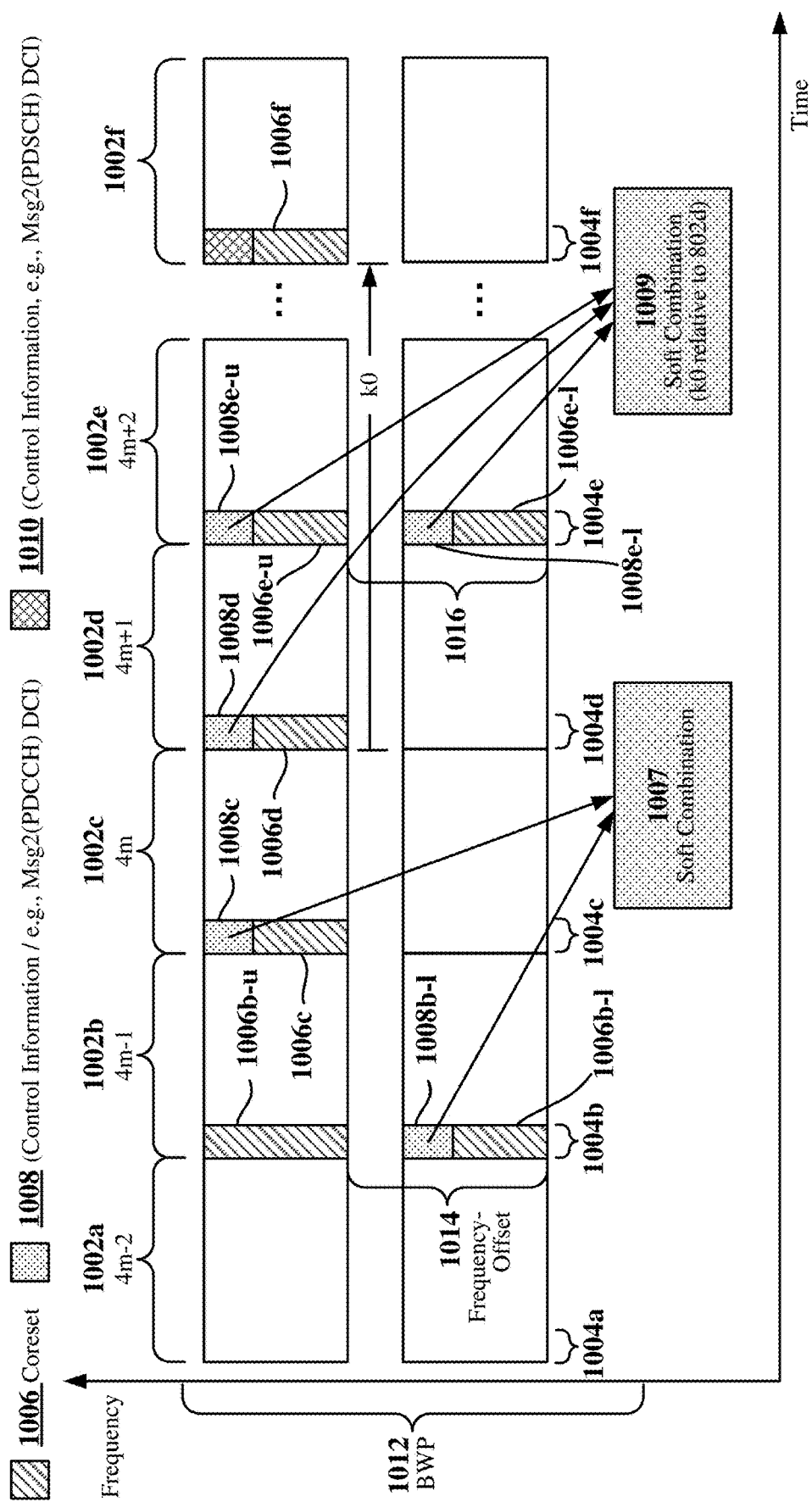
FIG. 10 is another schematic illustration of an organization of wireless resources in an air interface utilizing OFDM according to some aspects.

FIG. 10 is another schematic illustration of an organization of wireless resources in an air interface utilizing OFDM according to some aspects of the disclosure. FIG. 10 depicts a plurality of slots 1002a, 1002b, 1002c, 1002d, 1002e, 1002f and a corresponding plurality of PDCCH monitoring occasions 1004a, 1004b, 1004c, 1004d, 1004e, 1004f. Each of the plurality of slots 1002a, 1002b, 1002c, 1002d, 1002e, 1002f is depicted with one or more CORESETS. Within the BWP 1012, an upper layer of a first plurality of CORESETs, 1006b-u, 1006c, 1006d, 1006e-u, 1006f are depicted as occupying a same first set of subchannels; however, each of these CORESETS are spaced apart from one another in the time domain. Also within the BWP 1012, there is depicted a CORESET 1006b-lower (1006b-1), which occurs at the same time as CORESET 1006b-upper (1006b-u); however, it has a frequency-offset 1014 with respect to CORESET 1006b-u. Also within the BWP 1012, there is depicted a CORESET 1006e-lower (1006e-1), which occurs at the same time as CORESET 1006e-upper (1006e-u); however, it has a frequency-offset 1016 with respect to CORESET 1006e-u. The frequency-offsets 1014, 1016 are exemplary and non-limiting. For example, the amount of the frequency-offsets 1014, 1016 need not be identical in magnitude or direction. Moreover, while the CORESETs 1006b-1 and 1006e-1 are depicted as occupying the same OFDM symbols as their upper counterparts (1006b-u and 1006e-u), in other examples, CORESETs 1006b-1 and 1006e-1 may occupy different OFDM symbols within the control region of slots 1002b and 1002e. As used herein, the CORESETS 1006b-1 and 1006e-1 may be referred to as alternative CORESETS 1006b-1, 1006e-1.

While frequency-offset pairs of CORESETs 1006b-u and 1006b-1 (and CORESETS 1006e-u and 1006e-1) are depicted as being two separate CORESETS, each pair could be replaced with a single CORESET. Accordingly, a slot may hold one or more CORESETs, which may be time-offset, frequency-offset, or both with respect to one another. One or more search spaces may be established within any one CORESET. One or more PDCCH candidates may be established within any one CORESET.

According to aspects described herein, legacy Msg2 (PDCCH) detection and blind decoding may occur at any regular Msg2 PDCCH, such as Msg2(PDCCH) 1008c, 1008d, 1008e-u. Additionally, Msg2(PDCCH) repetitions may be transmitted on the alternative CORESETs 1006b-1, 1006e-1. The repetitions may be configured using, for example, frequency hopping, pre-configuration of predetermined frequency offset, or dynamic or semi-static application of frequency offsets.

According to such aspects, PDCCH repetition may be performed over one monitoring occasion with a regular CORESET and one or multiple monitoring occasions with alternative CORESETs. For example, with reference to FIG. 10, PDCCH repetition with regular CORESET 1006c at slot 1002c (slot 4m) and alternative CORESET 1006b-1 at slot 1002b (slot 4m−1) may be realized. According to such an example, the PDCCH candidates at monitoring occasions 1004b and 1004c could be soft combined 1007 prior to decoding and descrambling the combination.

By way of another example, PDCCH repetition with regular CORESET 1006d at slot 1002d (slot 4m+1), alternative CORESET 1006e-1 at slot 1002e (slot 4m+2), and repetition CORESET 1006*e-u* at slot 1002*e* (slot 4m+2) may be realized. According to such an example, the PDCCH candidates at monitoring occasions 1004*d* and 1004*e* could be soft combined 1009 prior to decoding and descrambling the combination.

As illustrated in FIG. 10, k0 may be interpreted based on the slot corresponding to the monitoring occasion with the regular CORESET (among the multiple monitoring occasions that are used for PDCCH repetition and combining at the receiver of the UE). In the example of FIG. 10, k0 may be interpreted based on the slot 1002*d* (slot 4m+1) corresponding to the monitoring occasion 1004*d* with regular CORESET 1006*d*.

According to some aspects, the parameters of the alternative CORESET (e.g., frequency-offset) may be indicated by RMSI. The frequency-offset may be indicated in terms of number of RBs or as a multiple of six RBs, for example.

According to some aspects, the alternative CORESET may have a different structure, e.g., a different number of OFDM symbols.

The frequency-offset parameter 1014, 1016 may be a function of at least one of: a location, in the frequency domain, of a bandwidth part (BWP) encompassing the CORESET(s) used, a frequency span of the BWP, a subcarrier spacing of subcarriers within the BWP, or a sum of bandwidths of the first set of resources and the at least the second set of resources, for example.

The disclosure relates in some aspects to PDCCH repetition (e.g., Msg2 PDCCH repetition) using additional (e.g., alternative) monitoring occasions. For example, a base station may transmit one or more copies of the Msg2 PDCCH on a single added monitoring occasion (e.g., an additional alternative monitoring occasion) or on multiple added monitoring occasions (e.g., additional alternative monitoring occasions). The Msg2 PDCCH transmission may thus be performed over one regular monitoring occasion and one or multiple additional (e.g., alternative) monitoring occasions. The UE may then perform a soft combination of these repetition Msg2 PDCCH candidates, followed by decoding and CRC checking. In some aspects, this Msg2 PDCCH repetition scheme may provide coverage enhancement for Msg2 PDCCH (e.g., extending the coverage for a Msg2 PDCCH transmission).

Figure 11:
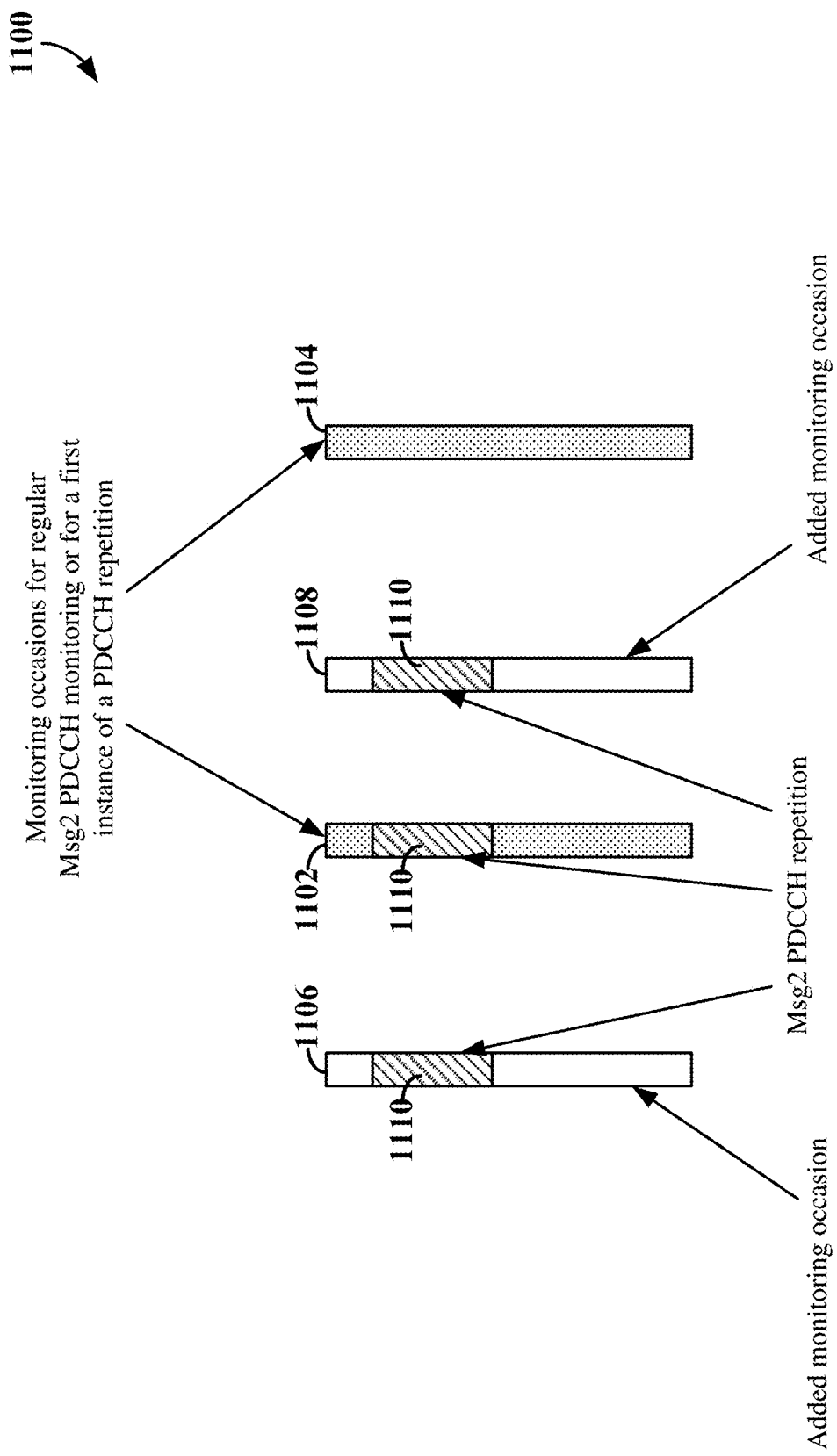
FIG. 11 is a diagram illustrating an example of random access message repetitions offset from a RACH monitoring occasion according to some aspects.

The diagram 1100 of FIG. 11 illustrates an example of Msg2 PDCCH repetition using additional monitoring occasions. The monitoring occasions 1102 and 1104 are regular monitoring occasions (e.g., the monitoring occasions 904*a*-904*e* of FIG. 9). Thus, the monitoring occasions 1102 and 1104 may be used for regular (non-repetition) Msg2 PSCCH monitoring or for monitoring a first instance of a Msg2 PDCCH.

The monitoring occasions 1106 and 1108 are additional monitoring occasions. In some aspects, the monitoring occasions 1106 and 1108 may be used for monitoring Msg2 PDCCH repetitions (e.g., a second Msg2 PDCCH and a third Msg2 PDCCH, which may be referred to as a second instance and a third instance of a Msg2 PDCCH, respectively). In some examples, the Msg2 PDCCH repetitions may be copies of the original Msg2 PDCCH. For example, the Msg2 PDCCH candidates 1110 in the CORESETs of the monitoring occasions 1102, 1106, and 1108 may include the same information (e.g., the same Msg2 DCI).

An additional monitoring occasion may be in the same slot as the corresponding regular monitoring occasion or in a different slot. In some examples, the monitoring occasion 1106 (an additional monitoring occasion) may be in a slot that immediate precedes the slot of the monitoring occasion 1102 (a regular monitoring occasion). In some examples, there may be at least one intervening slot between the slot of the monitoring occasion 1106 and the slot of the monitoring occasion 1102. In some examples, the monitoring occasion 1108 (an additional monitoring occasion) may be in the same slot as the monitoring occasion 1102. In some examples, there may be at least one intervening slot between the slot of the monitoring occasion 1108 and the slot of the monitoring occasion 1102.

A base station may send an offset parameter to a UE to indicate the time offset between the regular monitoring occasion and an additional monitoring occasion. The time offset may be a positive value or a negative value. The base station may transmit the time offset parameter for the added copies of the Msg2 PDCCH in the RMSI (e.g., in the bit field 468 of FIG. 4) or in some other manner. In some examples, the time offset may indicate the number of symbols between monitoring occasions. In some examples, a base station may send multiple offset parameters to a UE to indicate different time offsets between the regular monitoring occasion and different additional monitoring occasions.

The parameter k0 may be interpreted based on the slot corresponding to the regular monitoring occasion (among the multiple monitoring occasions that are used for Msg2 PDCCH repetition and combining at receiver). That is, k0 is not interpreted from an additional monitoring occasion in some examples. Consequently, since a legacy UE that is monitoring the monitoring occasions should only detect the regular monitoring occasion, the legacy UE should interpret the timing of the Msg2 PDSCH correctly.

An additional monitoring occasion may be used for different Msg2 PDCCH repetition possibilities (e.g., Msg2 PDCCH repetition starting from different regular monitoring occasions). For example, an additional monitoring occasion may be used for Msg2 PDCCH repetition together with each of two regular monitoring occasions (e.g., in the slot of the Msg2 PDCCH repetition or in the next slot). Thus, in FIG. 11, the monitoring occasion 1106 (an additional monitoring occasion) may also be combined with a regular monitoring occasion (not shown) that precedes the monitoring occasion 1108 (e.g., the monitoring occasion 1108 may be in the blind detection window for the preceding regular monitoring occasion). As another example, the monitoring occasion 1108 (an additional monitoring occasion) may also be combined with the monitoring occasion 1104 (a regular monitoring occasion).

A decision (e.g., by a base station) of whether to use Msg2 PDCCH repetition may depend on one or more of the frequency range being used, the subcarrier spacing (SCS) being used, or the number of OFDM symbols of the corresponding CORESET. For example, Msg2 PDCCH repetition might only be used in higher frequency scenarios (e.g., FR2) in some examples (e.g., where the higher path loss necessitates the use of redundancy for random access signaling). Similarly, Msg2 PDCCH repetition might only be used in higher SCS scenarios in some examples (e.g., since higher SCSs may be used at higher operating frequencies). As another example, if a CORESET includes additional symbols, the redundancy provided by Msg2 PDCCH repetition might not be needed. Moreover, if a CORESET includes additional symbols, there might not be sufficient space for additional monitoring occasions.

A decision (e.g., by a base station) of whether to use Msg2 PDCCH repetition may depend on whether PDCCH coverage at a UE is acceptable. If PDCCH coverage at a UE is acceptable (e.g., as indicated by the UE indicating that it has successfully received a PDCCH), the base station may elect to not use Msg2 PDCCH repetition. Conversely, if PDCCH coverage at a UE is not acceptable (e.g., as indicated by the UE indicating that it did not successfully receive a PDCCH), the base station may elect to use Msg2 PDCCH repetition.

Figure 12:
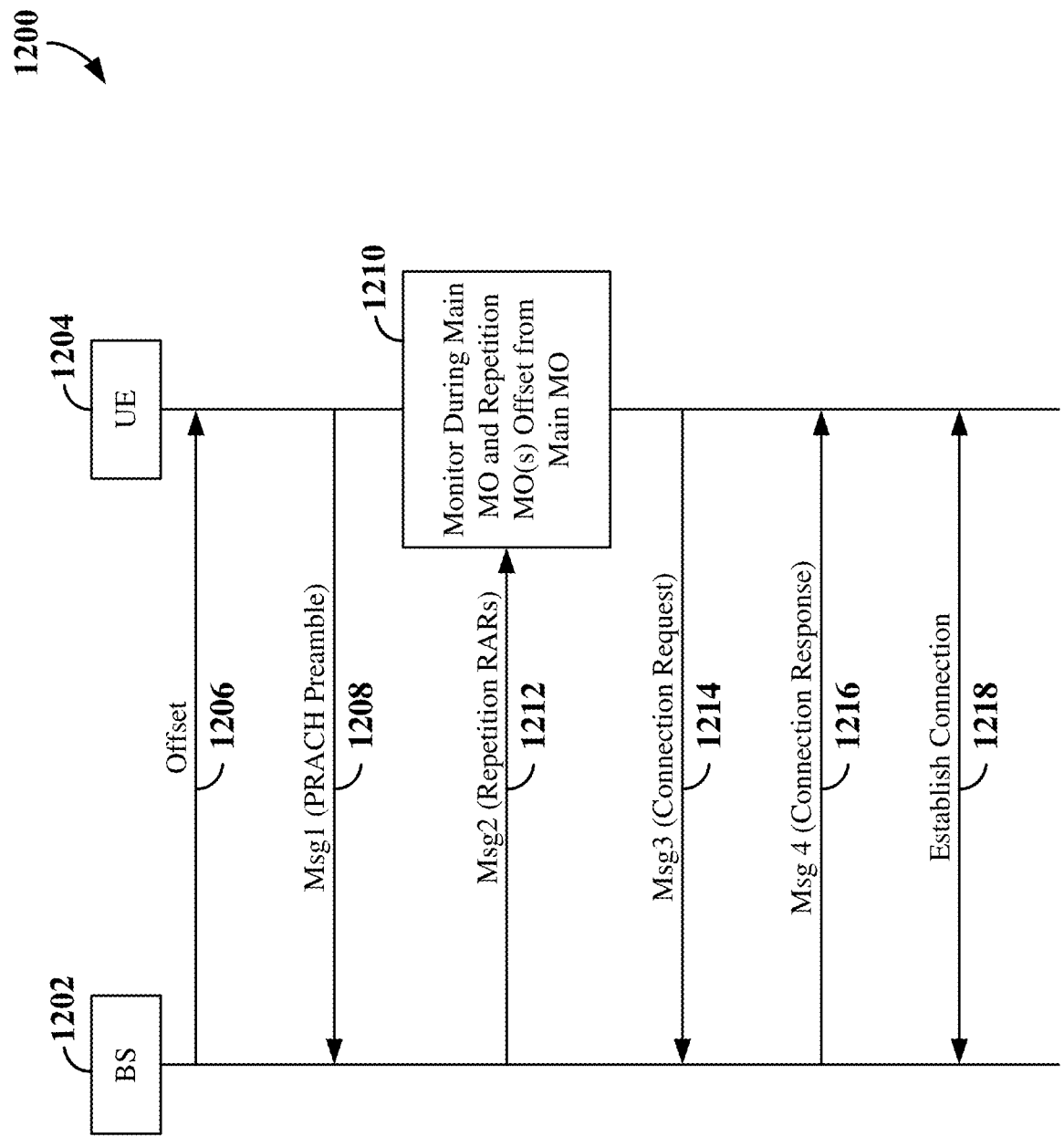
FIG. 12 is a signaling diagram of a first example of RACH signaling according to some aspects.

FIG. 12 is a signaling diagram 1200 illustrating an example of signaling for a contention-based RACH procedure using Msg2 PDCCH repetition in a wireless communication system including a base station (BS) 1202 and a UE 1204. In some examples, the base station 1202 may correspond to any of the base stations or scheduling entities shown in any of FIG. 1, 2, 6, 7, 8, 13 or 19. In some examples, the UE 1204 may correspond to any of the UEs or scheduled entities shown in any of FIG. 1, 2, 6, 7, 8, 13, or 14.

At 1206 of FIG. 12, the BS 1202 transmits an indication of at least one time offset (which may be referred to as a RACH Offset herein) to the UE 1204. In some examples, the RACH Offset may indicate the number of symbols between a first monitoring occasion and an added second monitoring occasion that will include a repetition of the RAR PUCCH information transmitted by the BS 1202 in the first monitoring occasion.

In some examples, the BS 1202 transmits an indication of at least one RACH Offset via RMSI (e.g., the RMSI transmitted by the BS 1202 includes the indication). The BS 1202 may transmit the indication in other ways in other examples.

In some examples, the indication may specify multiple RACH offsets. For example, a first RACH offset may indicate the number of symbols between a first monitoring occasion and an added second monitoring occasion that will include a repetition of the RAR PUCCH information transmitted by the BS 1202 in the first monitoring occasion. In addition, a second RACH offset may indicate the number of symbols between the first monitoring occasion and an added third monitoring occasion that will include a repetition of the RAR PUCCH information transmitted by the BS 1202 in the first monitoring occasion. Other quantities of RACH offsets may be used in other examples.

At 1208, the UE 1204 transmit a Msg1 (PRACH preamble) to the BS 1202. The UE 1204 may transmit the PRACH preamble on resources specified by a RACH configuration included in SIB2.

At 1210, the UE 1204 monitors PRACH resources for repetitions of the PDCCH portion of Msg2 (e.g., by monitoring a resource specified by the RACH configuration included in SIB2). For example, the UE 1204 may attempt to decode a DCI in a PDCCH at a first monitoring occasion. In addition, the UE 1204 may attempt to decode a DCI in a PDCCH at a second monitoring occasion that is offset in time from the first monitoring occasion by a RACH offset signaled at 1206. In some examples, the UE 1204 may attempt to decode a DCI in a PDCCH at a third monitoring occasion that is offset in time from the first monitoring occasion by a RACH offset signaled at 1206. Other quantities of repetition RAR PDCCH messages may be used in other examples.

At 1212, the BS 1202 transmits repetitions of the PDCCH portion of Msg2. For example, the BS 1202 may transmit a first DCI on the PDCCH at a first monitoring occasion. In addition, the BS 1202 may transmit a second DCI at an added second monitoring occasion that is offset in time from the first monitoring occasion by a RACH offset signaled at 1206. In some examples, the BS 1202 may transmit a third DCI at an added third monitoring occasion that is offset in time from the first monitoring occasion by a RACH offset signaled at 1206. Other quantities of repetition RAR PDCCH messages may be used in other examples. Here, each DCI may be identical (at least one some aspects) and schedules the same PDSCH that will include the RAR data.

At 1214, upon receiving and processing all of the RAR information, the UE 1204 transmits a Msg3 (connection request message). At 1216, the BS 1202 transmits a Msg 4 (contention resolution message). At 1218, the BS 1202 and the UE 1204 establish a connection and enter an active operational phase where data may be exchanged. For example, the BS 1202 may schedule the UE 1204 for UL communication and/or DL communication as discussed herein.

The disclosure relates in some aspects to processing physical downlink control channel PDCCH repetitions (e.g., Msg2 PDCCH repetitions) in a random access channel response window based on at least one radio network temporary identifier (RNTI). In some examples, such an RNTI may be a random access-RNTI (RA-RNTI).

Figure 13:
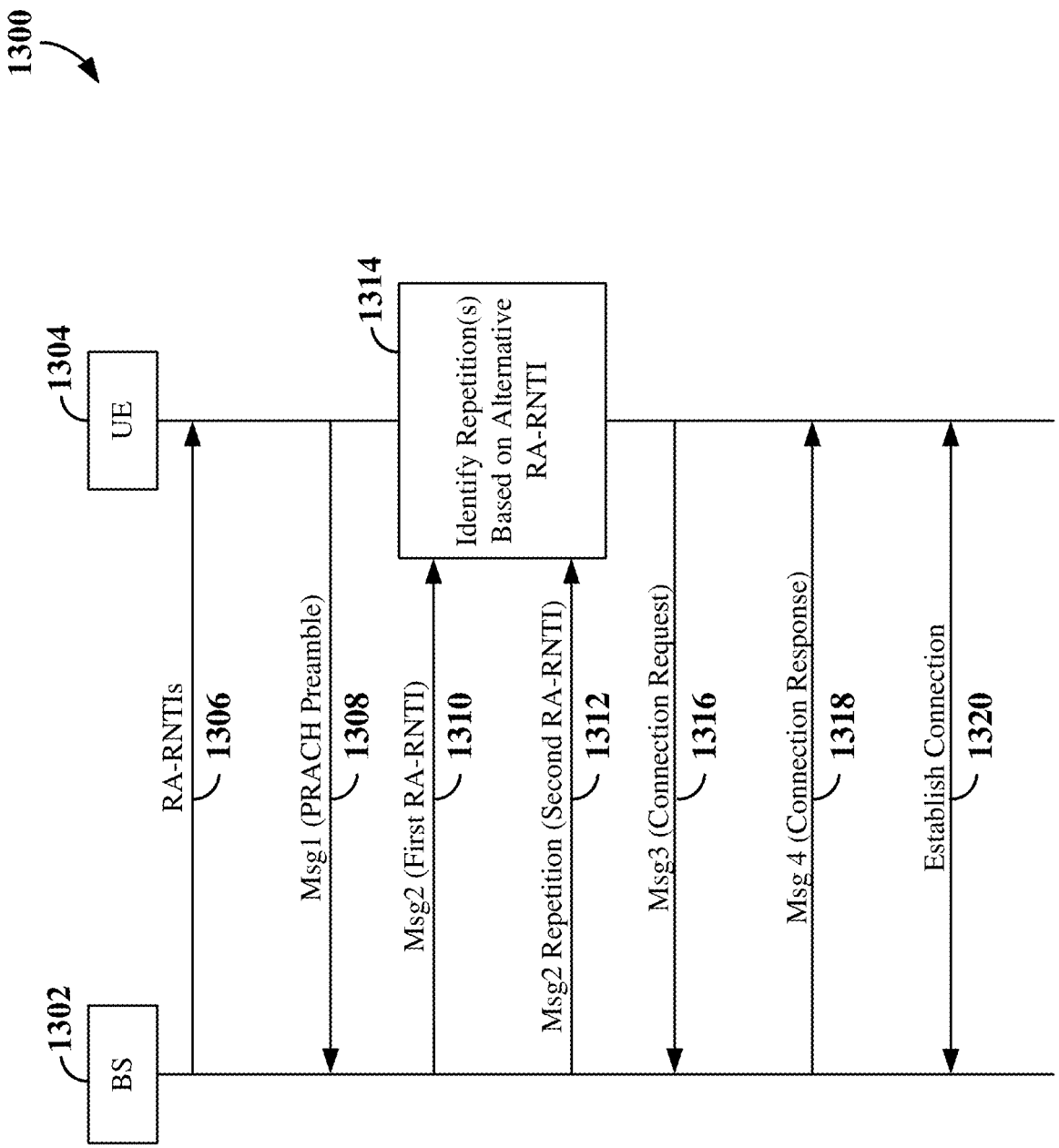
FIG. 13 is a signaling diagram of a second example of RACH signaling according to some aspects.

FIG. 13 is a signaling diagram 1300 illustrating an example of signaling for a contention-based RACH procedure using multiple RA-RNTIs for Msg2 PDCCH repetition in a wireless communication system including a base station (BS) 1302 and a UE 1304. In some examples, the base station 1302 may correspond to any of the base stations or scheduling entities shown in any of FIG. 1, 2, 6, 7, 8, 12, or 19. In some examples, the UE 1304 may correspond to any of the UEs or scheduled entities shown in any of FIG. 1, 2, 6, 7, 8, 12, or 14.

At 1306 of FIG. 13, the BS 1302 transmits an indication of the RA-RNTIs that the BS 1302 uses for random access procedures to the UE 1304. The RA-RNTIs may include a first RA-RNTI that is used for regular Msg2 PDCCH transmissions (and optionally for Msg2 PDCCH repetitions). In addition, The RA-RNTIs may include a second RA-RNTI that is used for some or all of the Msg2 PDCCH repetitions.

In some examples, the BS 1302 transmits an RNTI table that includes the RA-RNTIs to the UE 1304. The BS 1302 may transmit the RA-RNTIs in other ways in other examples.

At 1308, the UE 1304 transmit a Msg1 (PRACH preamble) to the BS 1302. The UE 1304 may transmit the PRACH preamble on resources specified by a RACH configuration included in SIB2.

At 1310 and 1312, the BS 1302 transmits repetitions of the PDCCH portion of Msg2. For example, at 1310, the BS 1302 may transmit a first DCI on the PDCCH using a first RA-RNTI. In addition, at 1312, the BS 1302 may transmit a second DCI (a repetition) on the PDCCH using a second RA-RNTI. In some examples, the BS 1302 may transmit a third DCI (a repetition) on the PDCCH using the second RA-RNTI at 1312. Other quantities of repetition RAR PDCCH messages may be used in other examples. Here, each DCI may be identical (at least one some aspects) and schedules the same PDSCH that will include the RAR data.

At 1314, the UE 1304 monitors PRACH resources for repetitions of the PDCCH portion of Msg2 (e.g., by monitoring a resource specified by the RACH configuration included in SIB2). For example, the UE 1304 may use the first RA-RNTI to attempt to decode a DCI in a PDCCH at a first monitoring occasion. In addition, the UE 1304 may use the second RA-RNTI to attempt to decode a DCI in a PDCCH at a second monitoring occasion. In some examples, the UE 1304 may use the first RA-RNTI to attempt to decode a DCI in a PDCCH at a third monitoring occasion. Other quantities of repetition RAR PDCCH messages may be used in other examples.

At 1316, upon receiving and processing all of the RAR information, the UE 1304 transmits a Msg3 (connection request message). At 1318, the BS 1302 transmits a Msg 4 (contention resolution message). At 1320, the BS 1302 and the UE 1304 establish a connection and enter an active operational phase where data may be exchanged. For example, the BS 1302 may schedule the UE 1304 for UL communication and/or DL communication as discussed herein.

In some examples, a gNB may scramble a CRC for a PDCCH (e.g., a Msg2 PDCCH) with an alternative RA-RNTI to identify the PDCCH as a repetition and/or the gNB may use the RA-RNTI to affect a PDCCH hashing function for the PDCCH. The gNB may send a PDSCH at a location (slot) in time after a reference Msg 2 PDCCH repetition (indicated by a k0 value).

In such cases, the UE may identify a PDCCH as a repetition after unscrambling the CRC received with the PDCCH and compare the unscrambled CRC with a UE calculated CRC and/or the UE may apply the RA-RNTI to affect a PDCCH hash function when evaluating PDCCH candidates.

A UE may combine all copies of PDCCH associated with the same alternative RNTI (hence, having the same CRC) on a virtual monitoring occasion (which consists of multiple regular monitoring occasions) together and then perform decoding. After decoding, the CRC may be checked (e.g., as part of blind detection of PDCCH by the UE) to determine whether the PDCCH is successfully received.

For example, knowing the PDCCH is a repetition, the UE may perform soft combining with other PDCCH repetitions and/or the UE may interpret a k0 value (differently) based on the PDCCH being associated with an alternative RA-RNTI, to determine a location (in time) of a PDSCH scheduled by the PDCCH. For example, if the UE detects a PDCCH is a repetition, the UE may realize that a k0 value in a DCI conveyed by that PDCCH should be applied relative to another PDCCH (e.g., an initial/first PDCCH repetition) to determine a starting location (in time) of a PDSCH scheduled by the DCI. On the other hand, if the UE detected that the PDCCH was not a repetition, the UE may apply the k0 value in a DCI conveyed by the PDCCH determined not to be a repetition to determine a starting location of a PDSCH scheduled by a DCI conveyed in that PDCCH.

As noted above, in cases of PDCCH repetition (e.g., Msg2 PDCCH repetitions sent in multiple monitoring occasions within an RAR window), an alternative RNTI (RA-RNTI) may be used for the PDCCH repetitions. The alternative RA-RNTI may affect both the hashing function and also CRC or only the CRC.

According to certain aspects, the alternative RA-RNTI may be used for all copies of the Msg2 PDCCH repetitions. In other cases, Msg2 PDCCH repetition may use one copy with a regular RA-RNTI and additional copies may use the alternative RA-RNTI. In such cases, the k0 value may be interpreted according to the slot associated with the PDCCH copy with the regular RA-RNTI.

According to certain aspects, the alternative RA-RNTI may be calculated from the regular RA-RNTI. For example, the alternative RA-RNTI may be calculated from the regular RA-RNTI, based on a rule defined in a standard specification and/or a parameter configured by a gNB (e.g., via RMSI).

According to certain aspects, Msg2 PDCCH repetition (associated with the alternative RA-RNTI) may be done on the same monitoring occasions and the same control resources as regular Msg2 PDCCH transmission. For example, multiple regular monitoring occasions of Msg2 PDCCH may be aggregated and used as a single virtual monitoring occasion. In such cases, PDCCH may be repeated on corresponding PDCCH candidates (e.g., PDCCH candidates with the same index) on the aggregated monitoring occasions.

According to certain aspects, Msg2 PDCCH repetition (associated with the alternative RA-RNTI) may be done only in a portion (or segment) of an RAR window. In the other portions (or segments) of the RAR window, regular Msg2 PDCCH monitoring may be used (accommodating legacy UEs).

According to certain aspects, Msg2 PDCCH repetition (associated with the alternative RA-RNTI) may be used depending on the format or transmission method of PRACH sent by the UE (e.g., PRACH transmitted with or without repetition). In such cases, Msg2 PDCCH repetition (associated with the alternative RA-RNTI) and the alternative PRACH (format or method of transmission) may be used depending on some parameters related to SSB reception. For example, such parameters may include a threshold on SSB-based reference signal received power-RSRP (and if SSB RSRP is below such a threshold, the UE may use the alternative PRACH to trigger Msg2 PDCCH with repetition).

As described herein, aspects of the present disclosure provide techniques for Msg2 PDCCH repetition that may make more efficient use of control resources for legacy UEs, while also avoiding extra power consumption for legacy UEs due to decoding the wrong PDSCH.

Figure 14:
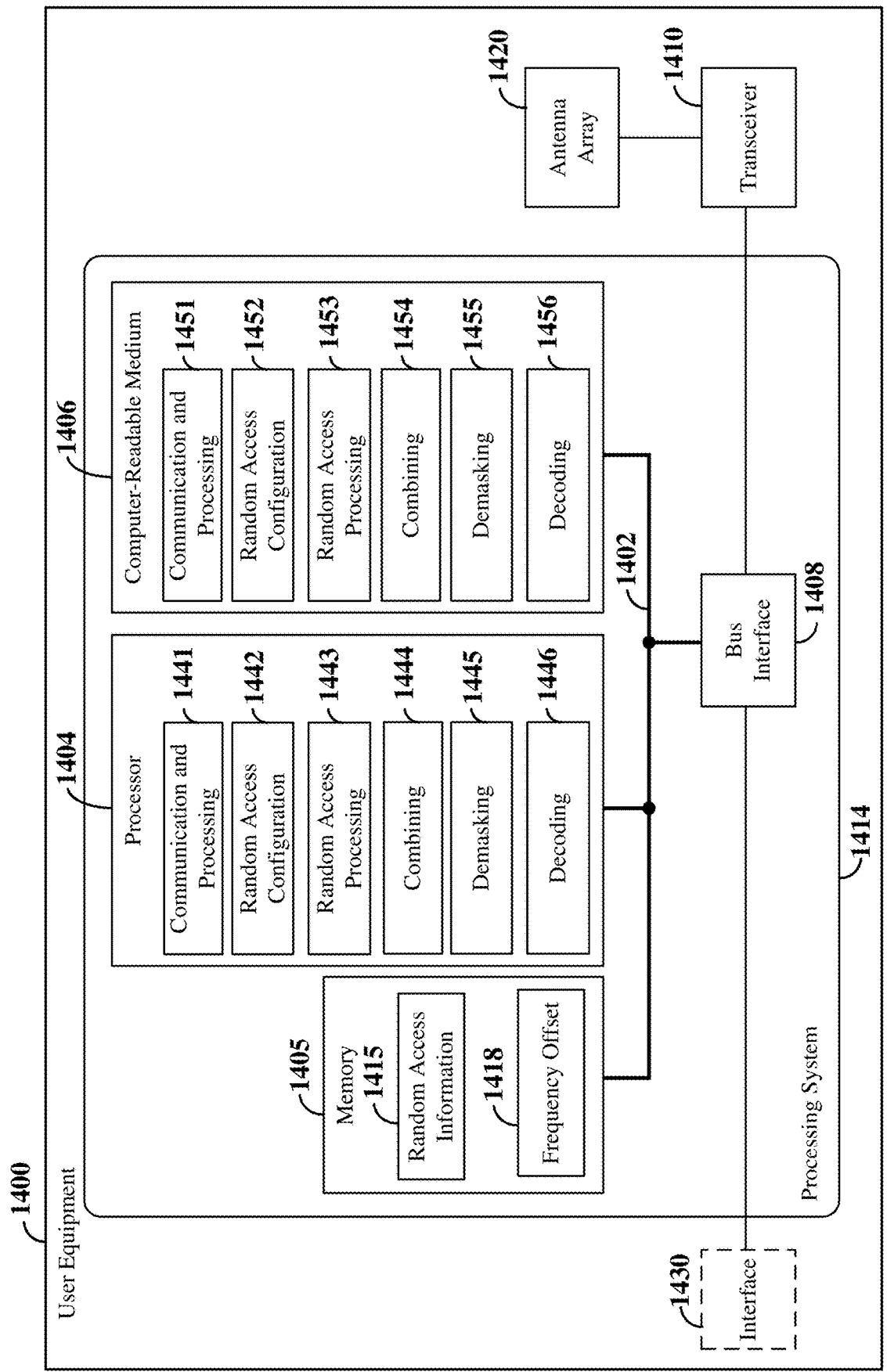
FIG. 14 is a block diagram illustrating an example of a hardware implementation for a user equipment employing a processing system according to some aspects.

FIG. 14 is a block diagram illustrating an example of a hardware implementation for a UE 1400 employing a processing system 1414. For example, the UE 1400 may be a configured to wirelessly communicate with a base station, as discussed in any one or more of FIGS. 1-13. In some implementations, the UE 1400 may correspond to any of the UEs or scheduled entities shown in any of FIG. 1, 2, 6, 7, 8, 12, or 13.

In accordance with various aspects of the disclosure, an element, or any portion of an element, or any combination of elements may be implemented with the processing system 1414. The processing system 1414 may include one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1400 may be configured to perform any one or more of the functions described herein. That is, the processor 1404, as utilized in a UE 1400, may be used to implement any one or more of the processes and procedures described herein.

The processor 1404 may in some instances be implemented via a baseband or modem chip and in other implementations, the processor 1404 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410 and an antenna array 1420, and an interface between the bus 1402 and an interface 1430. The transceiver 1410 provides a communication interface or means for communicating with various other apparatus over a wireless transmission medium. In some examples, the UE may include two or more transceivers 1410, each configured to communicate with a respective network type (e.g., terrestrial or non-terrestrial). The interface 1430 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1430 may include a user interface (e.g., keypad, display, speaker, microphone, joystick). Of course, such a user interface is optional, and may be omitted in some examples, such as an IoT device.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software. For example, the memory 1405 may store random access information 1415 (e.g., offsets, RA-RNTIs, etc.) used by the processor 1404 in cooperation with the transceiver 1410 for the random access operations described herein. As another example, the memory 1405 may store the frequency-offset 1418 value(s) and other parameters associated with PDCCH repetition processing.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406.

The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1400 may be configured to perform any one or more of the operations described herein (e.g., as described above in conjunction with FIGS. 1-13 and as described below in conjunction with FIGS. 15-18). In some aspects of the disclosure, the processor 1404, as utilized in the UE 1400, may include circuitry configured for various functions.

The processor 1404 may include communication and processing circuitry 1441. The communication and processing circuitry 1441 may be configured to communicate with a base station, such as a gNB, a network core (e.g., a 5G core network), other scheduling entities, other user equipment (UEs) or any other entity, such as, for example, local infrastructure or an entity communicating with the UE 900 via the Internet, such as a network provider. The communication and processing circuitry 1441 may include one or more hardware components that provide the physical structure that performs various processes related to wireless communication (e.g., signal reception and/or signal transmission) as described herein. The communication and processing circuitry 1441 may further include one or more hardware components that provide the physical structure that performs various processes related to signal processing (e.g., processing a received signal and/or processing a signal for transmission) as described herein. In some examples, the communication and processing circuitry 1441 may include two or more transmit/receive chains, each configured to process signals in a different RAT (or RAN) type. In addition, the communication and processing circuitry 1441 may be configured to receive a physical downlink control channel (PDCCH) in a first set of resources in a first slot and at least one repetition of the PDCCH in at least a second set of resources in a second slot, wherein the second set of resources is frequency-offset from the first set of resources. The communication and processing circuitry 1441 may further be configured to execute communication and processing software 1451 included on the computer-readable medium 1406 to implement one or more functions described herein.

In some examples, the communication and processing circuitry 1441 may be configured to receive and process downlink beamformed signals at a mmWave frequency or a sub-6 GHz frequency via the transceiver 1410 and an antenna array 1420. For example, the communication and processing circuitry 1441 may be configured to receive a respective reference signal (e.g., SSB or CSI-RS) on each of a plurality of downlink beams from the base station during a downlink beam sweep via at least one first antenna panel of the antenna array 1420. The communication and processing circuitry 1441 may further be configured to transmit a beam measurement report to the base station.

In some examples, the communication and processing circuitry 1441 may further be configured to generate and transmit uplink beamformed signals at a mmWave frequency or a sub-6 GHz frequency via the transceiver 1410 and the antenna array 1420. For example, the communication and processing circuitry 1441 may be configured to transmit a respective reference signal (e.g., SRS or DMRS)

on each of a plurality of uplink beams to the base station during an uplink beam sweep via at least one second antenna panel of the antenna array 1420.

The communication and processing circuitry 1441 may further be configured to control the antenna array 1420 and the transceiver 1410 to search for and identify a plurality of downlink transmit beams during a downlink beam sweep. The communication and processing circuitry 1441 may further be configured to obtain a plurality of beam measurements on each of a plurality of downlink receive beams via the antenna array 1420 for each of the identified downlink transmit beams. The communication and processing circuitry 1441 may further be configured to generate a beam measurement report for transmission to the base station using the communication and processing circuitry 1441.

The communication and processing circuitry 1441 may further be configured to identify one or more selected uplink beam(s) based on the beam measurements obtained from the downlink beam reference signals. In some examples, the communication and processing circuitry 1441 may be configured to compare the respective RSRP (or other beam measurement) measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 1441 may be configured to generate one or more uplink transmit beams for transmission in an uplink beam sweep. Each uplink transmit beam may carry an uplink reference signal (e.g., an SRS) for measurement by the base station. The communication and processing circuitry 1441 may further be configured to identify the selected uplink transmit beam(s) selected by the base station based on the uplink beam measurements. For example, the communication and processing circuitry 1441 may be configured to receive an indication of the selected uplink transmit beam(s) from the base station.

In some examples, the communication and processing circuitry 1441 may be configured to generate and transmit a scheduling request (e.g., via UCI in a PUCCH) to the base station to receive an uplink grant for the PUSCH. The communication and processing circuitry 1441 may further be configured to generate an uplink signal and interact with the transceiver 1410 to transmit the uplink signal. The uplink signal may include, for example, a PUCCH, a PUSCH, an SRS, a DMRS, or a PRACH. The communication and processing circuitry 1441 may further be configured to interact with the transceiver 1410 to monitor for a downlink signal and decode a downlink signal. The downlink signal may include, for example, a PDCCH, a PDSCH, a CSI-RS, or a DMRS.

In some implementations where the communication involves receiving information, the communication and processing circuitry 1441 may obtain information from a component of the UE 1400 (e.g., from the transceiver 1410 that receives the information via radio frequency signaling or some other type of signaling suitable for the applicable communication medium), process (e.g., decode) the information, and output the processed information. For example, the communication and processing circuitry 1441 may output the information to another component of the processor 1404, to the memory 1405, or to the bus interface 1408. In some examples, the communication and processing circuitry 1441 may receive one or more of signals, messages, other information, or any combination thereof. In some examples, the communication and processing circuitry 1441 may receive information via one or more channels. In some examples, the communication and processing circuitry 1441 may include functionality for a means for receiving.

In some implementations where the communication involves sending (e.g., transmitting) information, the communication and processing circuitry 1441 may obtain information (e.g., from another component of the processor 1404, the memory 1405, or the bus interface 1408), process (e.g., encode) the information, and output the processed information. For example, the communication and processing circuitry 1441 may output the information to the transceiver 1410 (e.g., that transmits the information via radio frequency signaling or some other type of signaling suitable for the applicable communication medium). In some examples, the communication and processing circuitry 1441 may send one or more of signals, messages, other information, or any combination thereof. In some examples, the communication and processing circuitry 1441 may send information via one or more channels. In some examples, the communication and processing circuitry 1441 may include functionality for a means for sending (e.g., means for transmitting).

The processor 1404 may include random access configuration circuitry 1442 configured to perform random access configuration configuration-related operations as discussed herein. The random access configuration circuitry 1442 may be configured to execute random access configuration software 1452 included on the computer-readable medium 1406 to implement one or more functions described herein.

The random access configuration circuitry 1442 be configured to provide the functionality for a means for receiving a random access time offset value. For example, the random access configuration circuitry 1442 together with the communication and processing circuitry 1441 and the transceiver 1410 may monitor a PDSCH channel for MIB1 to decode RMSI information that includes the random access time offset value.

The processor 1404 may include random access processing circuitry 1443 configured to perform random access processing-related operations as discussed herein. The random access processing circuitry 1443 may be configured to execute random access processing software 1453 included on the computer-readable medium 1406 to implement one or more functions described herein.

The random access processing circuitry 1443 be configured to provide the functionality for a means for receiving a RAR PDCCH message (e.g., an instance of a RAR PDCCH message). For example, the random access configuration circuitry 1442 together with the communication and processing circuitry 1441 and the transceiver 1410 may monitor a random access search space (e.g., at specified monitoring occasions) to decode a Msg2 PDCCH that includes a DCI.

The random access processing circuitry 1443 be configured to provide the functionality for a means for decoding at least one RAR PDCCH message. For example, the random access configuration circuitry 1442 may perform soft combining on multiples instances of a Msg2 PDCCH.

In some aspects of the disclosure, the processor 1404 may include combining circuitry 1444 configured for various functions, including, for example, combining respective payloads of the PDCCH and the at least one repetition of the PDCCH to obtain one combined PDCCH payload. In some examples, the combining circuitry 1444 may include one or more hardware components that provide the physical structure that performs processes related to performing the combining of respective payloads of the PDCCH and the at least one repetition of the PDCCH to obtain one combined PDCCH payload. The combining circuitry 1444 may further be configured to execute combining software 1454 stored on the computer-readable medium 1406 to implement one or more functions described herein.

In some aspects of the disclosure, the processor 1404 may include demasking circuitry 1445 configured for various functions, including, for example, demasking and verifying cyclic redundancy checks (CRCs) of a PDCCH and the at least one repetition of the PDCCH using an identifier of the UE to confirm an association between the PDCCH, the at least one repetition of the PDCCH, and the UE. In some examples, the demasking circuitry 1445 may include one or more hardware components that provide the physical structure that performs processes related to performing demasking and verifying cyclic redundancy checks (CRCs) of a PDCCH and the at least one repetition of the PDCCH using an identifier of the UE to confirm an association between the PDCCH, the at least one repetition of the PDCCH, and the UE. The demasking circuitry 1445 may further be configured to execute demasking software 1455 stored on the computer-readable medium 1406 to implement one or more functions described herein.

In some aspects of the disclosure, the processor 1404 may include decoding circuitry 1446 configured for various functions, including, for example, decoding PDCCH payloads to obtain control information related to a random access procedure from the one combined PDCCH payload and performing blind decoding on a combined PDCCH payload to obtain control information related to the random access procedure. In some examples, the decoding circuitry 1446 may include one or more hardware components that provide the physical structure that performs processes related to performing obtaining control information related to a random access procedure from the one combined PDCCH payload and performing blind decoding on a combined PDCCH payload to obtain control information related to the random access procedure. The decoding circuitry 1446 may further be configured to execute decoding software 1456 stored on the computer-readable medium 1406 to implement one or more functions described herein.

Figure 15:
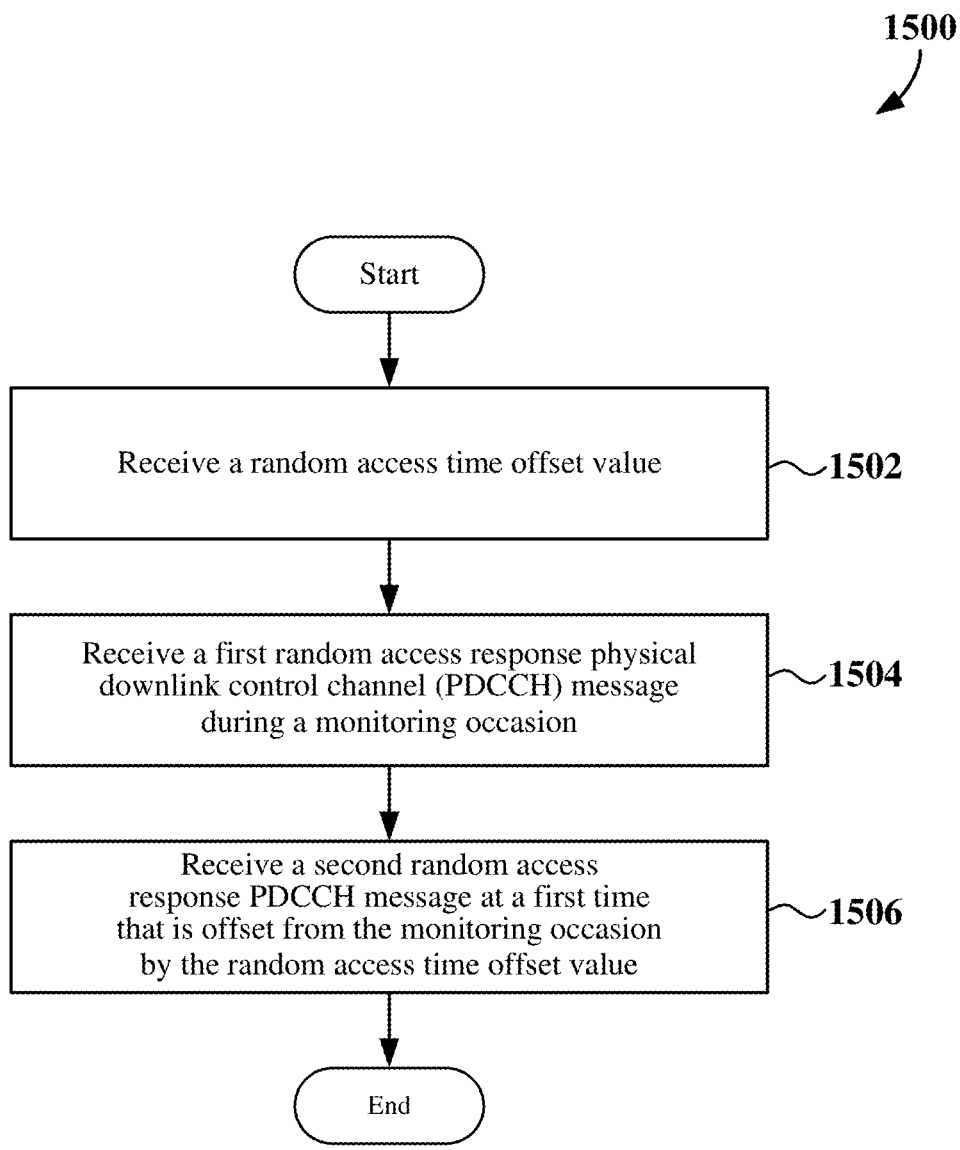
FIG. 15 is a flow chart of an example random access reception method employing an offset according to some aspects.

FIG. 15 is a flow chart illustrating an example method 1500 for a wireless communication system in accordance with some aspects of the present disclosure. As described below, some or all illustrated features may be omitted in a particular implementation within the scope of the present disclosure, and some illustrated features may not be required for implementation of all examples. In some examples, the method 1500 may be carried out by the UE 1400 illustrated in FIG. 14. In some examples, the method 1500 may be carried out by any suitable apparatus or means for carrying out the functions or algorithm described below.

At block 1502, a user equipment may receive a random access time offset value. For example, the random access configuration circuitry 1442 together with the communication and processing circuitry 1441 and the transceiver 1410, shown and described above in connection with FIG. 14, may provide a means to receive a random access time offset value.

In some examples, the user equipment may receive remaining minimum system information that includes the random access time offset value. In some examples, the random access time offset value indicates how many orthogonal frequency division multiplexing (OFDM) symbols separate the first random access response PDCCH message and the second random access response PDCCH message.

At block 1504, the user equipment may receive a first random access response physical downlink control channel (PDCCH) message (e.g., a first instance of a RAR PDCCH message) during a monitoring occasion. For example, the random access configuration circuitry 1442 together with the communication and processing circuitry 1441 and the transceiver 1410, shown and described above in connection with FIG. 14, may provide a means to receive a first random access response physical downlink control channel (PDCCH) message during a monitoring occasion.

In some examples, the first random access response PDCCH message is for a random access channel (RACH) procedure. In some examples, the first random access response PDCCH message is control channel portion of a message 2 of the RACH procedure.

At block 1506, the user equipment may receive a second random access response PDCCH message (e.g., a second instance of a RAR PDCCH message) at a first time that is offset from the monitoring occasion by the random access time offset value. For example, the random access configuration circuitry 1442 together with the communication and processing circuitry 1441 and the transceiver 1410, shown and described above in connection with FIG. 14, may provide a means to receive a second random access response PDCCH message at a first time that is offset from the monitoring occasion by the random access time offset value. In some examples, the second random access response PDCCH message (or the content thereof) is a copy of (e.g., is identical to) the first random access response PDCCH message (or the content thereof).

In some examples, the second random access response PDCCH message is for a random access channel (RACH) procedure. In some examples, the second random access response PDCCH message is control channel portion of a message 2 of the RACH procedure.

In some examples, the second random access response PDCCH message precedes the first random access response PDCCH message by the random access time offset value. In some examples, the second random access response PDCCH message follows the first random access response PDCCH message by the random access time offset value. In some examples, the first random access response PDCCH message is in a first slot, and the second random access response PDCCH message is in a second slot. In some examples, the first slot immediately follows the second slot. In some examples, there is at least one intervening slot between the first slot and the second slot.

In some examples, the user equipment may receive a third random access response PDCCH message at a second time that is offset from the monitoring occasion by the random access time offset value. In this case, the user equipment may jointly decode the first random access response PDCCH message, the second random access response PDCCH message, and the third random access response PDCCH message. In some examples, the second random access response PDCCH message precedes the first random access response PDCCH message by the random access time offset value, and the third random access response PDCCH message follows the first random access response PDCCH message by the random access time offset value. In some examples, the third random access response PDCCH message (or the content thereof) is a copy of (e.g., is identical to) the first random access response PDCCH message (or the content thereof).

In some examples, the first random access response PDCCH message and the third random access response PDCCH message are in a first slot, and the second random access response PDCCH message is in a second slot that precedes the first slot. In some examples, the second slot immediately precedes the first slot. In some examples, the first random access response PDCCH message is in a first slot, the second random access response PDCCH message is in a second slot, and the third random access response PDCCH message is in a third slot.

In some examples, the user equipment may determine timing of a physical downlink shared channel from a time of the monitoring occasion and a k0 offset. In some examples, the user equipment may receive a physical downlink control channel from a base station.

In some examples, the user equipment may soft combine the first random access response PDCCH message and the second random access response PDCCH message. In some examples, the user equipment may determine that decoding of a random access response message failed, transmit a first indication that the decoding of the random access response message failed, and receive a second indication from a base station after transmitting the first indication. In this case, the second indication may specify that the random access time offset value is to be used for receiving random access response PDCCH messages from the base station.

Figure 16:
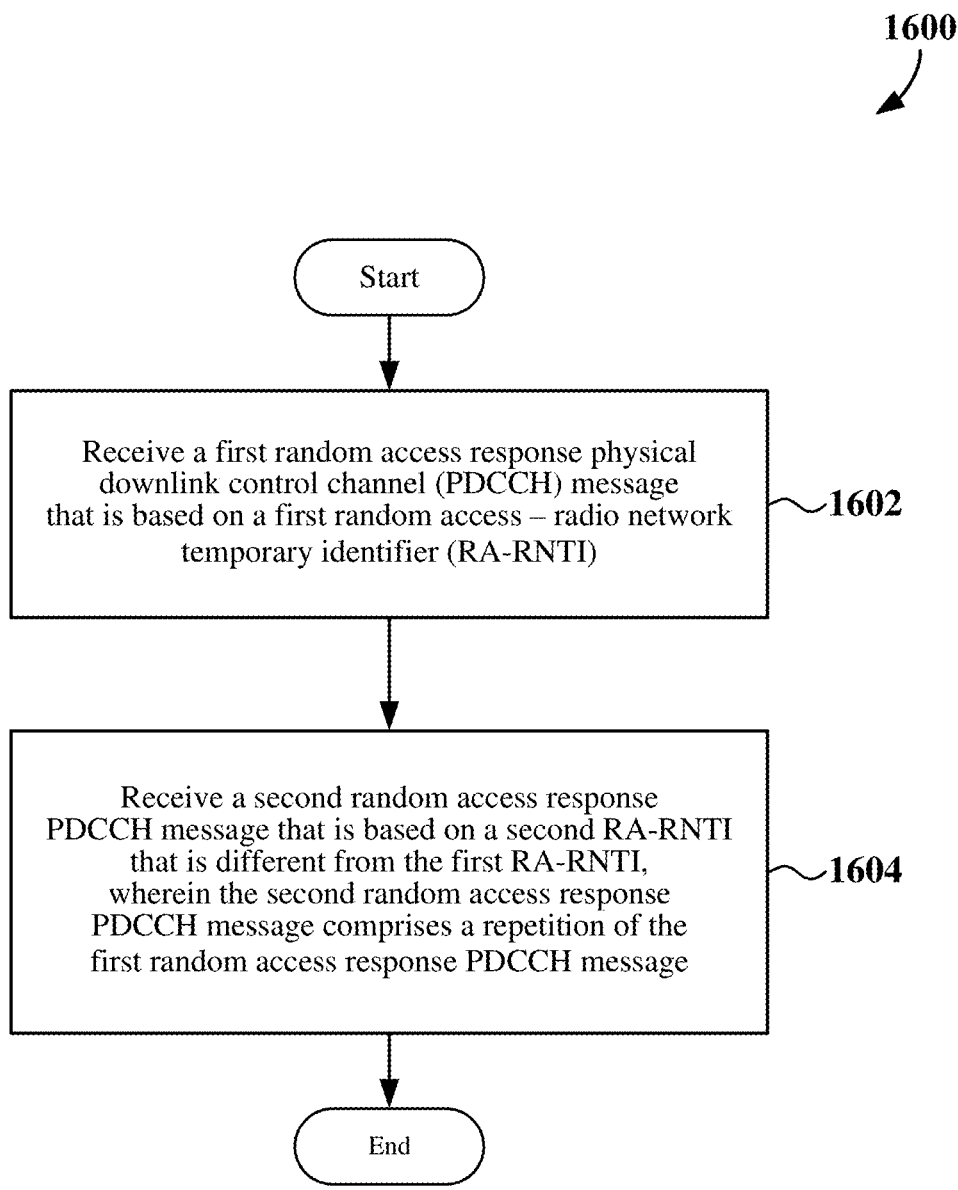
FIG. 16 is a flow chart of an example random access reception method employing a radio network temporary identifier (RNTI) according to some aspects.

FIG. 16 is a flow chart illustrating an example method 1600 for a wireless communication system in accordance with some aspects of the present disclosure. As described below, some or all illustrated features may be omitted in a particular implementation within the scope of the present disclosure, and some illustrated features may not be required for implementation of all examples. In some examples, the method 1600 may be carried out by the UE 1400 illustrated in FIG. 14. In some examples, the method 1600 may be carried out by any suitable apparatus or means for carrying out the functions or algorithm described below.

At block 1602, a user equipment may receive a first random access response physical downlink control channel (PDCCH) message that is based on a first random access-radio network temporary identifier (RA-RNTI). For example, the random access configuration circuitry 1442 together with the communication and processing circuitry 1441 and the transceiver 1410, shown and described above in connection with FIG. 14, may provide a means to receive a first random access response physical downlink control channel (PDCCH) message that is based on a first random access-radio network temporary identifier (RA-RNTI).

In some examples, the first random access response PDCCH message is for a random access channel (RACH) procedure. In some examples, the first random access response PDCCH message is control channel portion of a message 2 of the RACH procedure.

At block 1604, the user equipment may receive a second random access response PDCCH message that is based on a second RA-RNTI that is different from the first RA-RNTI, wherein the second random access response PDCCH message may include a repetition of the first random access response PDCCH message. For example, the random access configuration circuitry 1442 together with the communication and processing circuitry 1441 and the transceiver 1410, shown and described above in connection with FIG. 14, may provide a means to receive a second random access response PDCCH message that is based on a second RA-RNTI that is different from the first RA-RNTI, wherein the second random access response PDCCH message may include a repetition of the first random access response PDCCH message. In some examples, the second random access response PDCCH message (or the content thereof) is a copy of (e.g., is identical to) the first random access response PDCCH message (or the content thereof).

In some examples, the second random access response PDCCH message is for a random access channel (RACH) procedure. In some examples, the second random access response PDCCH message is control channel portion of a message 2 of the RACH procedure.

In some examples, the user equipment may receive the second random access response PDCCH message in at least one of monitoring occasions that are used to receive the first random access response PDCCH message, or control resources that are used for the first random access response PDCCH message.

In some examples, the user equipment may receive the first random access response PDCCH message in a first portion of a random access response window, and receive the second random access response PDCCH message in a second portion of the random access response window. In some examples, the user equipment may transmit a physical random access channel (PRACH) transmission, and monitor for the second random access response PDCCH message in the second portion of the random access response window depending on at least one of a format or a transmission mode of the PRACH transmission.

In some examples, the user equipment may soft combine the first random access response PDCCH message and the second random access response PDCCH message.

In some examples, at least one of a hashing function or a cyclic redundancy check (CRC) associated with the second random access response PDCCH message is based on the second RA-RNTI. In some examples, all repetitions of the first random access response PDCCH message are based on the second RA-RNTI. In some examples, at least one repetition of the first random access response PDCCH message is based on the first RA-RNTI.

In some examples, the user equipment may calculate the second RA-RNTI from the first RA-RNTI. In some examples, the user equipment may calculate the second RA-RNTI from the first RA-RNTI based on at least one of a rule or a network configured parameter.

In some examples, the user equipment may determine timing of a physical downlink shared channel (PDSCH) based on a scheduling parameter included in the second random access response PDCCH message.

Figure 17:
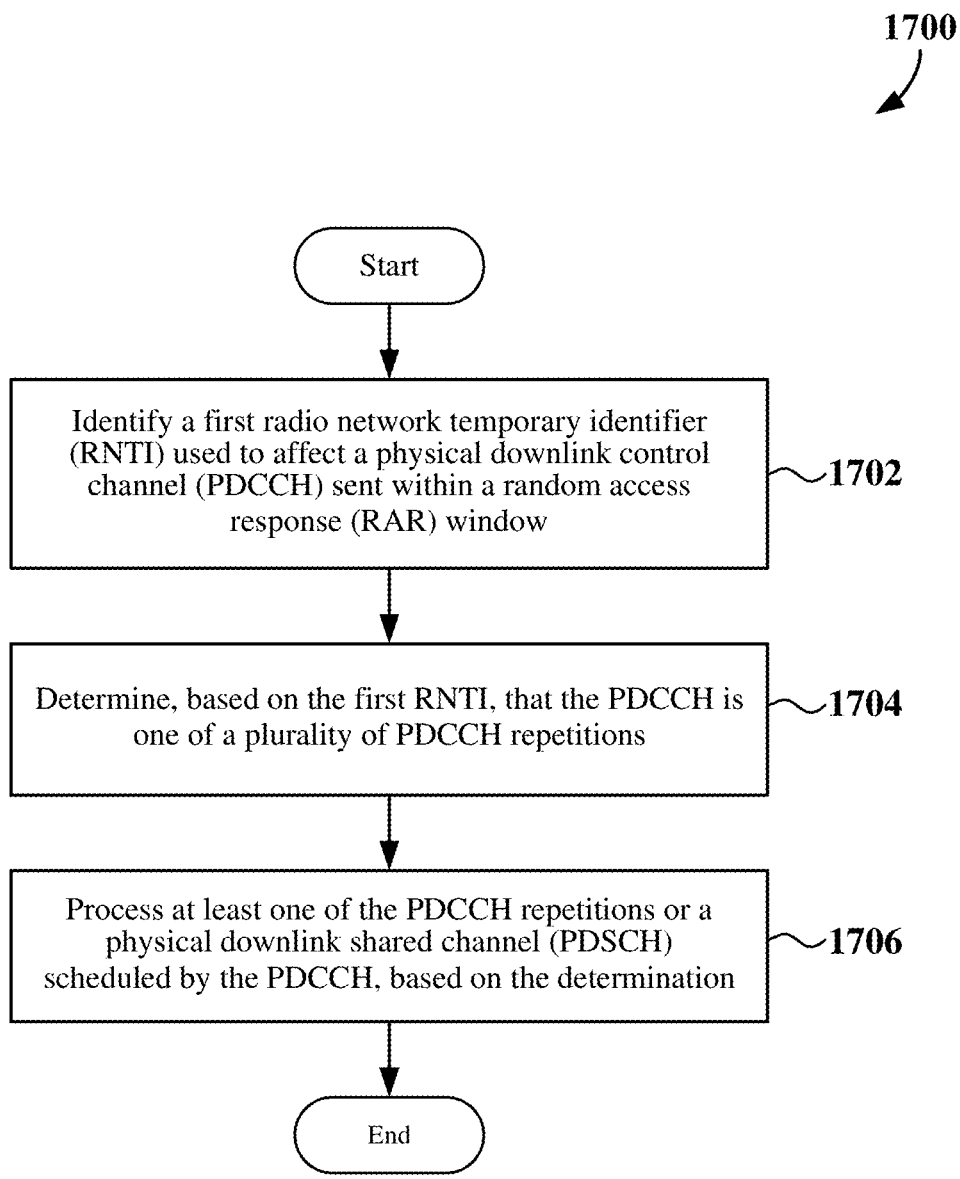
FIG. 17 is a flow chart of another example random access reception method employing an RNTI according to some aspects.

FIG. 17 is a flow chart illustrating an example method 1700 for a wireless communication system in accordance with some aspects of the present disclosure. As described below, some or all illustrated features may be omitted in a particular implementation within the scope of the present disclosure, and some illustrated features may not be required for implementation of all examples. In some examples, the method 1700 may be carried out by the UE 1400 illustrated in FIG. 14. In some examples, the method 1700 may be carried out by any suitable apparatus or means for carrying out the functions or algorithm described below.

At block 1702, a user equipment may identify a first radio network temporary identifier (RNTI) used to affect a physical downlink control channel (PDCCH) sent within a random access response (RAR) window. For example, the random access configuration circuitry 1442 together with the communication and processing circuitry 1441 and the transceiver 1410, shown and described above in connection with FIG. 14, may provide a means to identify a first radio network temporary identifier (RNTI) used to affect a physical downlink control channel (PDCCH) sent within a random access response (RAR) window.

In some examples, the first RNTI is used to affect at least one of a hashing function or a cyclic redundancy check (CRC) generated for the PDCCH.

At block 1704, the user equipment may determine, based on the first RNTI, that the PDCCH is one of a plurality of PDCCH repetitions. For example, the random access configuration circuitry 1442 together with the communication and processing circuitry 1441 and the transceiver 1410, shown and described above in connection with FIG. 14, may provide a means to determine, based on the first RNTI, that the PDCCH is one of a plurality of PDCCH repetitions.

In some examples, the user equipment receives the PDCCH repetitions in at least one of monitoring occasions also used for PDCCH sent without repetition, or control resources also used for PDCCH sent without repetition. In some examples, the user equipment receives PDCCH repetitions associated with the first RNTI in a first portion of the RAR window. In some examples, a second portion of the RAR window is used for PDCCHs without repetition.

At block 1706, the user equipment may process at least one of the PDCCH repetitions or a physical downlink shared channel (PDSCH) scheduled by the PDCCH, based on the determination. For example, the random access configuration circuitry 1442 together with the communication and processing circuitry 1441 and the transceiver 1410, shown and described above in connection with FIG. 14, may provide a means to process at least one of the PDCCH repetitions or a physical downlink shared channel (PDSCH) scheduled by the PDCCH, based on the determination.

In some examples, the user equipment may perform soft combining of multiple of the PDCCH repetitions.

In some examples, the user equipment may determine timing of the PDSCH based on a scheduling parameter provided in at least one of the PDCCH repetitions. In some examples, the first RNTI is used to affect all of the PDCCH repetitions. In some examples, a second RNTI is used to affect at least one of the PDCCH repetitions. In some examples, the user equipment may determine the timing of the PDSCH based on a scheduling parameter provided in the PDCCH repetition affected by the second RNTI.

In some examples, the user equipment may calculate the first RNTI from a second RNTI. In some examples, the calculation is based on at least one of a rule or a network configured parameter.

In some examples, the user equipment may send a physical random access channel (PRACH) transmission, and monitor for a PDCCH affected by the first RNTI only if the PRACH transmission is of a certain format or sent with a certain transmission mode. In some examples, the UE sends the PRACH transmission of the certain format or transmission mode, depending on one or more parameters related to synchronization signal block (SSB) reception. In some examples, the one or more parameters related to SSB reception may include an SSB reference signal received power (RSRP) threshold.

Figure 18:
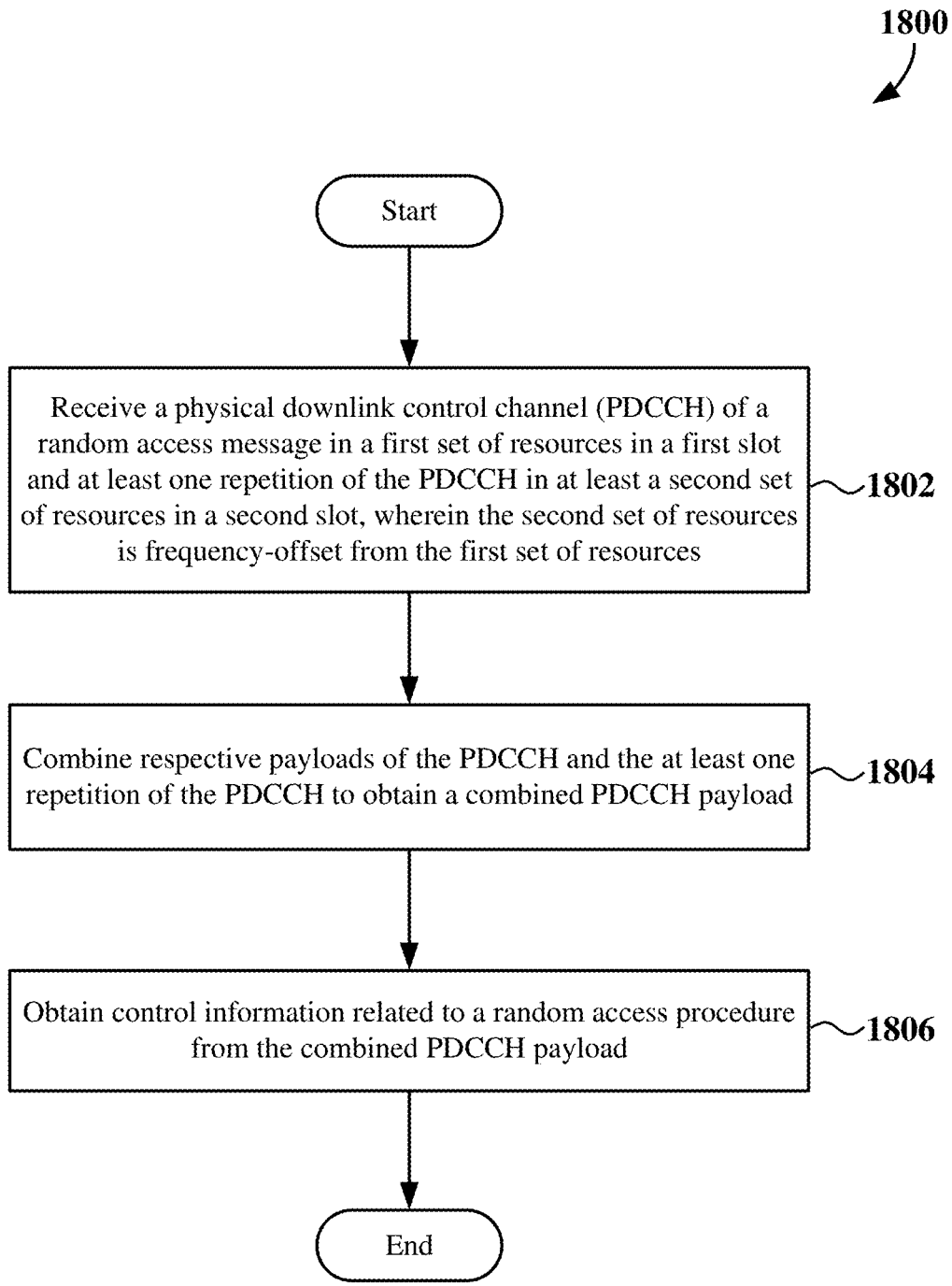
FIG. 18 is a flow chart of an example process for performing PDCCH repetition according to some aspects.

FIG. 18 is a flow chart illustrating an example method 1800 for a wireless communication system in accordance with some aspects of the present disclosure. As described below, some or all illustrated features may be omitted in a particular implementation within the scope of the present disclosure, and some illustrated features may not be required for implementation of all examples. In some examples, the method 1800 may be carried out by the UE 1400 illustrated in FIG. 14. In some examples, the method 1800 may be carried out by any suitable apparatus or means for carrying out the functions or algorithm described below.

At block 1802, the UE may receive a physical downlink control channel (PDCCH) of a random access message in a first set of resources (e.g., time-frequency resources) in a first slot and at least one repetition of the PDCCH in at least a second set of resources in a second slot, where the second set of resources may be frequency-offset from the first set of resources. For example, the communication and processing circuitry 1441 and the transceiver 1410, shown and described above in connection with FIG. 14, may provide a means to receive a physical downlink control channel (PDCCH) in a first set of resources (e.g., time-frequency resources) in a first slot and at least one repetition of the PDCCH in at least a second set of resources in a second slot.

At block 1804, the UE may combine respective payloads of the PDCCH and the at least one repetition of the PDCCH to obtain a (e.g., one) combined PDCCH payload. For example, the combining circuitry 1444, shown and described above in connection with FIG. 14, may provide a means to combine respective payloads of the PDCCH and the at least one repetition of the PDCCH to obtain one combined PDCCH payload.

At block 1806, the UE may obtain control information related to a random access procedure from the combined PDCCH payload. For example, the decoding circuitry 1446, shown and described above in connection with FIG. 14, may provide a means to obtain control information related to a random access procedure from the one combined PDCCH payload.

In some examples, the control information related to the random access procedure may be a downlink control information (DCI) carried on a Message 2 physical downlink control channel (Msg2(PDCCH)). The DCI carried on the Msg2(PDCCH) may schedule a Message 2 physical downlink shared channel (Msg2(PDSCH)).

In one aspect, the first set of resources and the at least the second set of resources may start at a same time (e.g., in a same OFDM symbol) in the time domain.

In another aspect, the user equipment may verify cyclic redundancy checks (CRCs) of the PDCCH and the at least one repetition of the PDCCH using an identifier of the UE to confirm an association between the PDCCH, the at least one repetition of the PDCCH, and the UE. The user equipment may perform blind decoding on the combined PDCCH payload to obtain the control information related to the random access procedure.

According to some aspects, the first parameters of the first set of resources may define a first control resource set (CORESET) in the first slot, the second parameters of the second set of resources may define a second CORESET in the second slot, and at least the second parameters of the second set of resources may be indicated to the UE in a remaining minimum system information (RMSI). The PDCCH and the at least one repetition of the PDCCH may be duplicates of a Msg2(PDCCH) and may each be received during a random access response (RAR) window from a base station.

In some examples, the user equipment may obtain a value of the frequency-offset from at least one of a preconfigured frequency-hopping parameter, or a frequency-offset parameter indicated to the UE in signaling from a base station. The frequency-offset parameter may be indicated in a remaining minimum system information (RMSI). A value of the frequency-offset parameter may be expressed as at least one of a first number corresponding to a first quantity of resource blocks, or a second number corresponding to a second quantity of multiples of six resource blocks. In one example, the frequency-offset parameter may be a function of at least one of a location (in the frequency domain, of a bandwidth part (BWP) including the first set of resources and the at least the second set of resources), a frequency span of the BWP, a sub-carrier spacing of subcarriers within the BWP, or a sum of bandwidths of the first set of resources and the at least the second set of resources.

In one aspect, receiving the PDCCH and the at least one repetition of the PDCCH may further include monitoring search spaces within the first set of resources and the at least the second set of resources. In another aspect, receiving the PDCCH and the at least one repetition of the PDCCH may further include demasking a first cyclic redundancy check (CRC) received with respective payloads of the PDCCH and the at least one repetition of the PDCCH using an identifier of the UE, and determining that the respective payloads of the PDCCH are associated with the UE upon an occurrence of a valid demasked first CRC. The identifier may be a radio network temporary identifier (RNTI) of the UE. In one example, determining the occurrence of the valid demasked first CRC may also include calculating a second CRC of each of the respective payloads of the PDCCH and the at least one repetition of the PDCCH, comparing the second CRC with the demasked first CRC, and determining that the demasked first CRC and the second CRC are equal.

In another example, a first duration in symbols of the first set of resources is different from a second duration in symbols of the at least the second set of resources. For example, the first set of resources may be one OFDM symbol in duration while the second set of resources may be two or three symbols in duration, or vice versa.

In one configuration, the user equipment 1400 includes means for receiving a random access time offset value from a base station, means for receiving a first random access response physical downlink control channel (PDCCH) message from the base station during a monitoring occasion, and means for receiving a second random access response PDCCH message from the base station at a first time that is offset from the monitoring occasion by the random access time offset value. In one configuration, the user equipment 1400 includes means for receiving a first random access response physical downlink control channel (PDCCH) message that is based on a first random access-radio network temporary identifier (RA-RNTI), and means for receiving a second random access response PDCCH message that is based on a second RA-RNTI that is different from the first RA-RNTI, wherein the second random access response PDCCH message may include a repetition of the first random access response PDCCH message. In one configuration, the user equipment 1400 includes means for receiving a physical downlink control channel (PDCCH) in a first set of resources in a first slot and at least one repetition of the PDCCH in at least a second set of resources in a second slot, wherein the second set of resources is frequency-offset from the first set of resources, means for combining respective payloads of the PDCCH and the at least one repetition of the PDCCH to obtain one combined PDCCH payload, and means for obtaining control information related to a random access procedure from the one combined PDCCH payload. In one aspect, the aforementioned means may be the processor 1404 shown in FIG. 14 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable medium 1406, or any other suitable apparatus or means described in any one or more of FIGS. 1, 2, 6, 7, 8, 12, 13, and 14, and utilizing, for example, the methods and/or algorithms described herein in relation to FIGS. 15-18.

Figure 19:
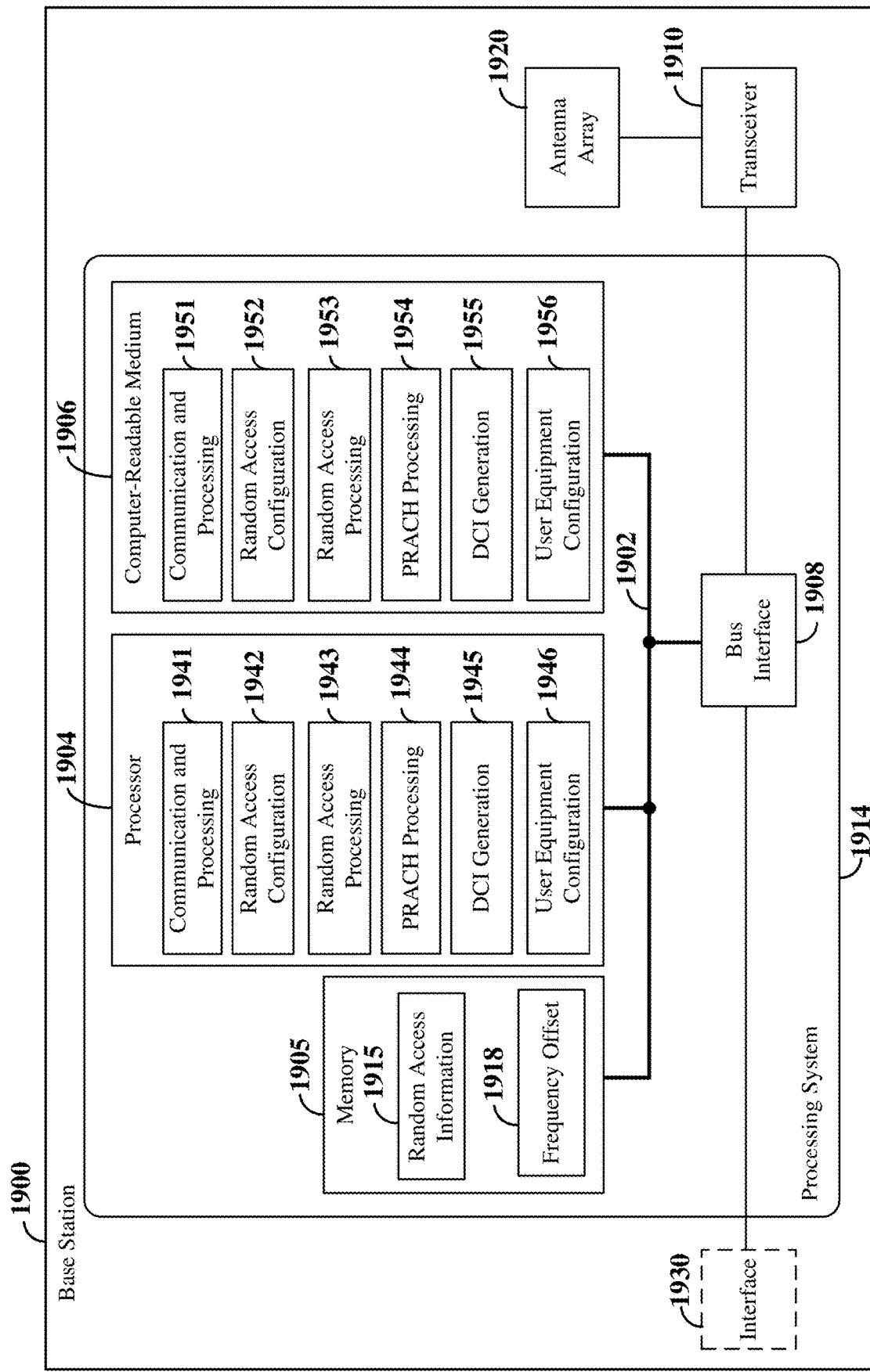
FIG. 19 is a block diagram illustrating an example of a hardware implementation for a base station employing a processing system according to some aspects.

FIG. 19 is a conceptual diagram illustrating an example of a hardware implementation for base station (BS) 1900 employing a processing system 1914. In some implementations, the BS 1900 may correspond to any of the BSs (e.g., gNBs,) or scheduling entities shown in any of FIGS. 1, 2, 6, 7, 8, 12, and 13.

In accordance with various aspects of the disclosure, an element, or any portion of an element, or any combination of elements may be implemented with the processing system 1914. The processing system may include one or more processors 1904. The processing system 1914 may be substantially the same as the processing system 1414 illustrated in FIG. 14, including a bus interface 1908, a bus 1902, memory 1905, a processor 1904, and a computer-readable medium 1906. The memory 1905 may store random access information 1915 (e.g., offsets, RA-RNTIs, etc.) used by the processor 1904 in cooperation with the transceiver 1910 for the random access operations described herein. The memory 1905 may store the frequency-offset 1918 value(s) and other parameters associated with PDCCH repetition processing. Furthermore, the BS 1900 may include an interface 1930 (e.g., a network interface) that provides a means for communicating with at least one other apparatus within a core network and with at least one radio access network.

The BS 1900 may be configured to perform any one or more of the operations described herein (e.g., as described above in conjunction with FIGS. 1-13 and as described below in conjunction with FIGS. 20-24). In some aspects of the disclosure, the processor 1904, as utilized in the BS 1900, may include circuitry configured for various functions.

The processor 1904 may be configured to generate, schedule, and modify a resource assignment or grant of time-frequency resources (e.g., a set of one or more resource elements). For example, the processor 1904 may schedule time-frequency resources within a plurality of time division duplex (TDD) and/or frequency division duplex (FDD) subframes, slots, and/or mini-slots to carry user data traffic and/or control information to and/or from multiple UEs.

The processor 1904 may be configured to schedule resources for the transmission of a downlink signal. The downlink signal may include, for example, a PDCCH, a PDSCH, a CSI-RS, or a DMRS. The processor 1904 may further be configured to schedule resources that may be utilized by a UE to transmit an uplink signal. The uplink signal may include, for example, a PUCCH, a PUSCH, an SRS, a DMRS, or a PRACH. The processor 1904 may further be configured to schedule resources that may be utilized by a UE to transmit and/or receive a sidelink signal.

In some aspects of the disclosure, the processor 1904 may include communication and processing circuitry 1941. The communication and processing circuitry 1941 may be configured to communicate with a network core (e.g., a 5G core network), other base stations, user equipment (UEs), scheduled entities, or any other entity, such as, for example, an entity communicating with the base station 1900 via the Internet, such as a network provider. The communication and processing circuitry 1941 may include one or more hardware components that provide the physical structure that performs various processes related to communication (e.g., signal reception and/or signal transmission) as described herein. The communication and processing circuitry 1941 may further include one or more hardware components that provide the physical structure that performs various processes related to signal processing (e.g., processing a received signal and/or processing a signal for transmission) as described herein. In addition, the communication and processing circuitry 1941 may be configured to receive and process downlink traffic and downlink control (e.g., similar to downlink traffic 112 and downlink control 114 of FIG. 1) and process and transmit uplink traffic and uplink control (e.g., similar to uplink traffic 116 and uplink control 118). The communication and processing circuitry 1941 may further be configured to execute communication and processing software 1951 included on the computer-readable medium 1906 to implement one or more functions described herein. The communication and processing circuitry 1941 may further be configured to interact with the transceiver 1910 to encode and transmit a downlink signal. The communication and processing circuitry 1941 may further be configured to interact with the transceiver 1910 to monitor for and decode an uplink signal.

In some examples, the communication and processing circuitry 1941 may be configured to receive and process uplink beamformed signals at a mmWave frequency or a sub-6 GHz frequency via the transceiver 1910 and an antenna array 1920. For example, the communication and processing circuitry 1941 may be configured to receive a respective reference signal (e.g., SRS or DMRS) on each of a plurality of uplink beams from the UE during an uplink beam sweep.

In some examples, the communication and processing circuitry 1941 may further be configured to generate and transmit downlink beamformed signals at a mmWave frequency or a sub-6 GHz frequency via the transceiver 1910 and the antenna array 1920. For example, the communication and processing circuitry 1941 may be configured to transmit a respective downlink reference signal (e.g., SSB or CSI-RS) on each of a plurality of downlink beams to the UE during a downlink beam sweep via at least one first antenna panel of the antenna array 1920. The communication and processing circuitry 1941 may further be configured to receive a beam measurement report from the UE.

The communication and processing circuitry 1941 may further be configured to receive an uplink signal on one or more uplink receive beams via one or more uplink transmit beams applied to the uplink signal. For example, the communication and processing circuitry 1941 may be configured to receive the uplink signal on one or more uplink receive beams via at least one second antenna panel of the antenna array 1920. The uplink signal may include, for example, a PUCCH, PUSCH, SRS, DMRS, or PRACH.

The communication and processing circuitry 1941 may further be configured to control the antenna array 1920 and transceiver 1910 to generate a plurality of downlink transmit beams during a downlink beam sweep. The communication and processing circuitry 1941 may further be configured to receive a beam measurement report from the UE using the communication and processing circuitry 1941. The communication and processing circuitry 1941 may further be configured to identify one or more selected uplink beam(s) based on the beam measurements. In some examples, the communication and processing circuitry 1941 may be configured to compare the respective RSRP (or other beam measurement) measured on each of the downlink receive beams for each of the serving downlink transmit beams to identify the serving downlink receive beams and to further identify the serving downlink receive beams as the selected uplink transmit beams. Each serving downlink receive beam may have the highest measured RSRP (or other beam measurement) for one of the downlink transmit beams.

The communication and processing circuitry 1941 may be configured to receive one or more uplink transmit beams in an uplink beam sweep. Each uplink transmit beam may carry an uplink reference signal (e.g., an SRS) for measurement by the communication and processing circuitry 1941. The communication and processing circuitry 1941 may further be configured to obtain a plurality of beam measurements on each of a plurality of uplink receive beams of the antenna array 1920 for each of the uplink transmit beams. The communication and processing circuitry 1941 may further be configured to select the selected uplink transmit beam(s) and corresponding uplink receive beams forming respective uplink BPLs based on the uplink beam measurements.

In some implementations where the communication involves receiving information, the communication and processing circuitry 1941 may obtain information from a component of the BS 1900 (e.g., from the transceiver 1910 that receives the information via radio frequency signaling or some other type of signaling suitable for the applicable communication medium), process (e.g., decode) the information, and output the processed information. For example, the communication and processing circuitry 1941 may output the information to another component of the processor 1904, to the memory 1905, or to the bus interface 1908. In some examples, the communication and processing circuitry 1941 may receive one or more of signals, messages, other information, or any combination thereof. In some examples, the communication and processing circuitry 1941 may receive information via one or more channels. In some examples, the communication and processing circuitry 1941 may include functionality for a means for receiving.

In some implementations where the communication involves sending (e.g., transmitting) information, the communication and processing circuitry 1941 may obtain information (e.g., from another component of the processor 1904, the memory 1905, or the bus interface 1908), process (e.g., encode) the information, and output the processed information. For example, the communication and processing circuitry 1941 may output the information to the transceiver 1910 (e.g., that transmits the information via radio frequency signaling or some other type of signaling suitable for the applicable communication medium). In some examples, the communication and processing circuitry 1941 may send one or more of signals, messages, other information, or any combination thereof. In some examples, the communication and processing circuitry 1941 may send information via one or more channels. In some examples, the communication and processing circuitry 1941 may include functionality for a means for sending (e.g., means for transmitting).

The processor 1904 may include random access configuration circuitry 1942 configured to perform random access configuration-related operations as discussed herein. The random access configuration circuitry 1942 may be configured to execute random access configuration software 1952 included on the computer-readable medium 1906 to implement one or more functions described herein.

The random access configuration circuitry 1942 be configured to provide the functionality for a means for transmitting a random access time offset value. For example, the random access configuration circuitry 1942 together with the communication and processing circuitry 1941 and the transceiver 1910 may transmit a MIB1 that includes RMSI on a PDSCH, where the RMSI includes the random access time offset value.

The processor 1904 may include random access processing circuitry 1943 configured to perform random access processing-related operations as discussed herein. The random access processing circuitry 1943 may be configured to execute random access processing software 1953 included on the computer-readable medium 1906 to implement one or more functions described herein.

The random access processing circuitry 1943 may be configured to provide the functionality for a means for receiving a random access message (e.g., a PRACH preamble). For example, the random access processing circuitry 1943 together with the communication and processing circuitry 1941 and the transceiver 1910 may monitor a random access search space (e.g., at specified monitoring occasions) to decode a PRACH preamble sent by a UE.

The random access processing circuitry 1943 may be configured to provide the functionality for a means for generating a RAR PDCCH message. For example, the random access processing circuitry 1943 may generate a DCI that schedules a PDSCH for a Msg3 of a random access procedure.

The random access processing circuitry 1943 may be configured to provide the functionality for a means for transmitting a RAR PDCCH message. For example, the random access processing circuitry 1943 together with the communication and processing circuitry 1941 and the transceiver 1910 may transmit a Msg2 PDCCH (that includes a DCI) on a random access search space (e.g., at multiple monitoring occasions).

In some aspects of the disclosure, the processor 1904 may include physical random access channel (PRACH) processing circuitry 1944 configured for various functions, including, for example, operations related to responding to a UE Msg1 with a Msg2(PDCCH) and Msg2(PDSCH), obtaining control information related to a random access procedure associated with the UE, and conveying the control information related to the random access procedure to the UE on a physical downlink control channel (PDCCH) in a first set of resources in a first slot and in at least one repetition of the PDCCH in at least a second set of resources in a second slot, where the second set of resources may be frequency-offset from the first set of resources.

In some examples, the PRACH processing circuitry 1944 may include one or more hardware components that provide the physical structure that performs processes related to responding to the UE Msg1 with a Msg2(PDCCH) and Msg2(PDSCH), obtaining control information related to a random access procedure associated with the UE, and conveying the control information related to the random access procedure to the UE on a physical downlink control channel (PDCCH) in a first set of resources in a first slot and in at least one repetition of the PDCCH in at least a second set of resources in a second slot, where the second set of resources may be frequency-offset from the first set of resources. The PRACH processing circuitry 1944 may further be configured to execute PRACH processing software 1954 stored on the computer-readable medium 1906 to implement one or more functions described herein.

In some aspects of the disclosure, the processor 1904 may include DCI generation circuitry 1945 configured for various functions, including, for example, obtaining control information related to the random access procedure in a form of a downlink control information (DCI) that may be carried on a Message 2 physical downlink control channel (Msg2(PDCCH)), which schedules a Message 2 physical downlink shared channel (Msg2(PDSCH)). In some examples, the DCI generation circuitry 1945 may include one or more hardware components that provide the physical structure that performs processes related to obtaining control information related to the random access procedure in a form of a downlink control information (DCI) that may be carried on a Message 2 physical downlink control channel (Msg2(PDCCH)), which schedules a Message 2 physical downlink shared channel (Msg2(PDSCH)). The DCI generation circuitry 1945 may further be configured to execute DCI generation software 1955 stored on the computer-readable medium 1906 to implement one or more functions described herein.

In some aspects of the disclosure, the processor 1904 may include user equipment configuration circuitry 1946 configured for various functions, including, for example, establishing first parameters of the first set of resources that define a first control resource set (CORESET) in a first slot, second parameters of the second set of resources that define a second CORESET in a second slot, and indicating at least the second parameters of the second set of resources to the UE in a remaining minimum system information (RMSI) message. In some examples, the user equipment configuration circuitry 1946 may include one or more hardware components that provide the physical structure that performs processes related to performing the establishment of first parameters of the first set of resources that define a first control resource set (CORESET) in a first slot, second parameters of the second set of resources that define a second CORESET in a second slot, and indicating at least the second parameters of the second set of resources to the UE in a remaining minimum system information (RMSI) message. The user equipment configuration circuitry 1946 may further be configured to execute user equipment configuration software 1956 stored on the computer-readable medium 1906 to implement one or more functions described herein.

Figure 20:
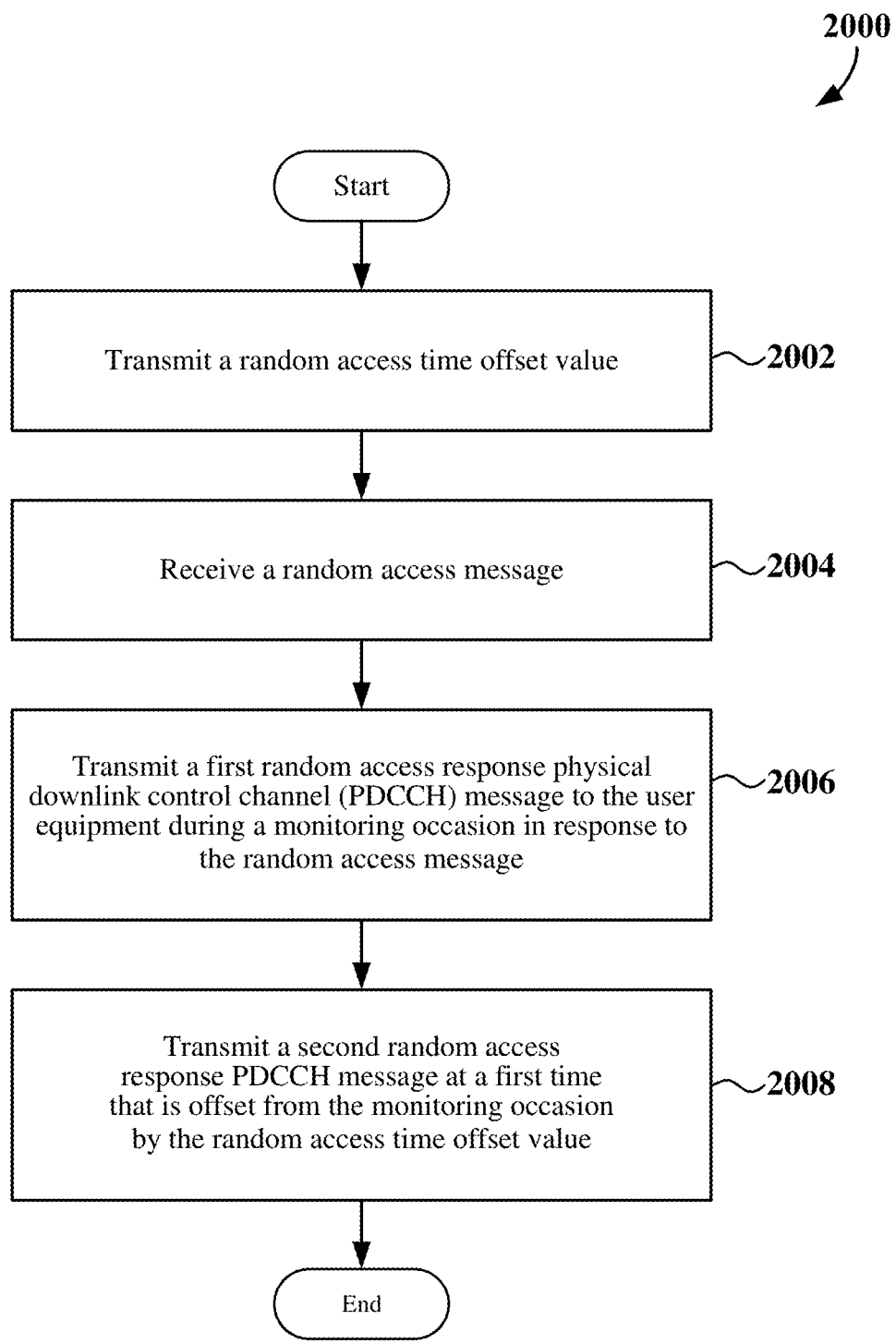
FIG. 20 is a flow chart of an example random access transmission method employing an offset according to some aspects.

FIG. 20 is a flow chart illustrating an example method 2000 for wireless communication in accordance with some aspects of the present disclosure. As described below, some or all illustrated features may be omitted in a particular implementation within the scope of the present disclosure, and some illustrated features may not be required for implementation of all examples. In some examples, the method 2000 may be carried out by the BS 1900 illustrated in FIG. 19. In some examples, the method 2000 may be carried out by any suitable apparatus or means for carrying out the functions or algorithm described below.

At block 2002, a base station may transmit a random access time offset value. For example, the random access configuration circuitry 1942 together with the communication and processing circuitry 1941 and the transceiver 1910, shown and described above in connection with FIG. 19, may provide a means to transmit a random access time offset value.

In some examples, the base station may transmit remaining minimum system information that includes the random access time offset value. In some examples, the random access time offset value indicates how many orthogonal frequency division multiplexing (OFDM) symbols separate the first random access response PDCCH message and the second random access response PDCCH message.

At block 2004, the base station may receive a random access message. For example, the random access processing circuitry 1943 together with the communication and processing circuitry 1941 and the transceiver 1910, shown and described above in connection with FIG. 19, may provide a means to receive a random access message.

At block 2006, the base station may transmit a first random access response physical downlink control channel (PDCCH) message to the user equipment during a monitoring occasion in response to the random access message. For example, the random access processing circuitry 1943 together with the communication and processing circuitry 1941 and the transceiver 1910, shown and described above in connection with FIG. 19, may provide a means to transmit a first random access response physical downlink control channel (PDCCH) message to the user equipment during a monitoring occasion.

In some examples, the random access response PDCCH message is for a random access channel (RACH) procedure. In some examples, the random access response PDCCH message is control channel portion of a message 2 of the RACH procedure.

At block 2008, the base station may transmit a second random access response PDCCH message (e.g., a second instance of a RAR PDCCH message) at a first time that is offset from the monitoring occasion by the random access time offset value. In some examples, the second random access response PDCCH message (or the content thereof) is a copy of (e.g., is identical to) the first random access response PDCCH message (or the content thereof). For example, the random access processing circuitry 1943 together with the communication and processing circuitry 1941 and the transceiver 1910, shown and described above in connection with FIG. 19, may provide a means to transmit a second random access response PDCCH message at a first time that is offset from the monitoring occasion by the random access time offset value.

In some examples, the second random access response PDCCH message precedes the first random access response PDCCH message by the random access time offset value. In some examples, the second random access response PDCCH message follows the first random access response PDCCH message by the random access time offset value. In some examples, the first random access response PDCCH message is in a first slot, and the second random access response PDCCH message is in a second slot. In some examples, the first slot immediately follows the second slot. In some examples, there is at least one intervening slot between the first slot and the second slot.

In some examples, the base station may transmit a third random access response PDCCH message at a second time that is offset from the monitoring occasion by the random access time offset value. In some examples, the second random access response PDCCH message precedes the first random access response PDCCH message by the random access time offset value, and the third random access response PDCCH message follows the first random access response PDCCH message by the random access time offset value. In some examples, the third random access response PDCCH message (or the content thereof) is a copy of (e.g., is identical to) the first random access response PDCCH message (or the content thereof).

In some examples, the first random access response PDCCH message and the third random access response PDCCH message are in a first slot, and the second random access response PDCCH message is in a second slot that precedes the first slot. In some examples, the second slot immediately precedes the first slot. In some examples, the first random access response PDCCH message is in a first slot, the second random access response PDCCH message is in a second slot, and the third random access response PDCCH message is in a third slot.

In some examples the base station may transmit a physical downlink control channel to a user equipment. In some examples, the base station may receive a first indication that decoding of a random access response message failed, and transmit a second indication after receiving the first indication. In this case, the second indication may specify that the random access time offset value is to be used for receiving random access response PDCCH messages from the base station.

Figure 21:
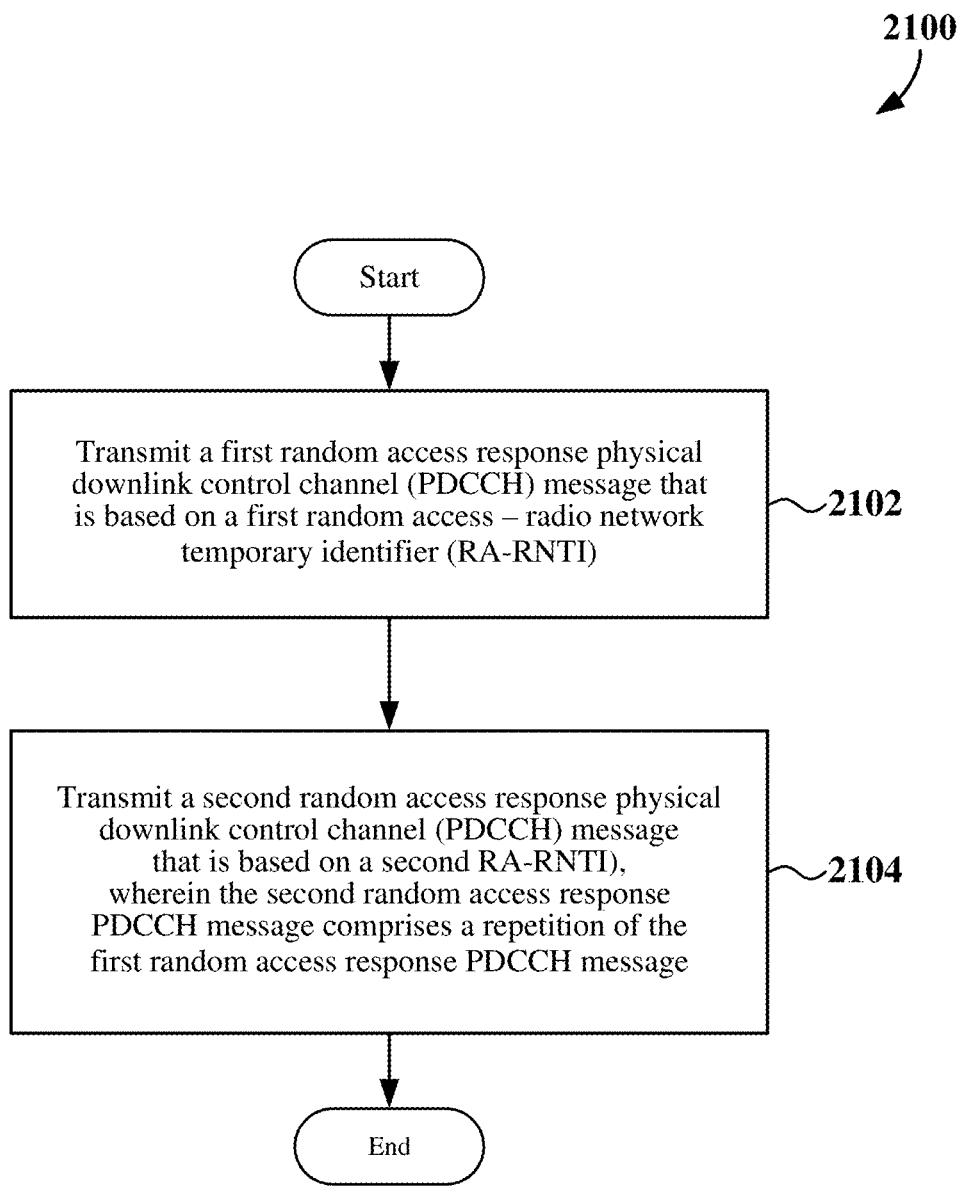
FIG. 21 is a flow chart of an example random access transmission method employing an RNTI according to some aspects.

FIG. 21 is a flow chart illustrating an example method 2100 for wireless communication in accordance with some aspects of the present disclosure. As described below, some or all illustrated features may be omitted in a particular implementation within the scope of the present disclosure, and some illustrated features may not be required for implementation of all examples. In some examples, the method 2100 may be carried out by the BS 1900 illustrated in FIG. 19. In some examples, the method 2100 may be carried out by any suitable apparatus or means for carrying out the functions or algorithm described below.

At block 2102, a base station may transmit a first random access response physical downlink control channel (PDCCH) message that is based on a first random access-radio network temporary identifier (RA-RNTI). For example, the random access processing circuitry 1943 together with the communication and processing circuitry 1941 and the transceiver 1910, shown and described above in connection with FIG. 19, may provide a means to transmit a first random access response physical downlink control channel (PDCCH) message that is based on a first random access-radio network temporary identifier (RA-RNTI).

In some examples, the first random access response PDCCH message is for a random access channel (RACH) procedure. In some examples, the first random access response PDCCH message is control channel portion of a message 2 of the RACH procedure.

At block 2104, the base station may transmit a second random access response physical downlink control channel (PDCCH) message that is based on a second RA-RNTI), wherein the second random access response PDCCH message may include a repetition of the first random access response PDCCH message. For example, the random access processing circuitry 1943 together with the communication and processing circuitry 1941 and the transceiver 1910, shown and described above in connection with FIG. 19, may provide a means to transmit a second random access response physical downlink control channel (PDCCH) message that is based on a second RA-RNTI), wherein the second random access response PDCCH message may include a repetition of the first random access response PDCCH message. In some examples, the second random access response PDCCH message (or the content thereof) is a copy of (e.g., is identical to) the first random access response PDCCH message (or the content thereof).

In some examples, the second random access response PDCCH message is for a random access channel (RACH) procedure. In some examples, the second random access response PDCCH message is control channel portion of a message 2 of the RACH procedure.

In some examples, the base station may generate at least one of a hashing function or a cyclic redundancy check (CRC) associated with the second random access response PDCCH message based on the second RA-RNTI.

In some examples, the base station may transmit a physical downlink shared channel (PDSCH) at a time based on a scheduling parameter included in the second random access response PDCCH message.

In some examples, the base station may generate all repetitions of the first random access response PDCCH message based on the second RA-RNTI. In some examples, the base station may generate at least one repetition of the first random access response PDCCH message based on the first RA-RNTI.

In some examples, the base station may calculate the second RA-RNTI from the first RA-RNTI. In some examples, the base station may calculate the second RA-RNTI from the first RA-RNTI based on at least one of a rule or a network configured parameter.

In some examples, the base station may transmit the second random access response PDCCH message in at least one of monitoring occasions that are used to transmit the first random access response PDCCH message, or control resources that are used for the first random access response PDCCH message.

In some examples, the base station may transmit the first random access response PDCCH message in a first portion of a random access response window, and transmit the second random access response PDCCH message in a second portion of the random access response window. In some examples, the base station may receive a physical random access channel (PRACH) transmission from a user equipment, and transmit the second random access response PDCCH message in the second portion of the random access response window depending on at least one of a format or a transmission mode of the PRACH transmission.

Figure 22:
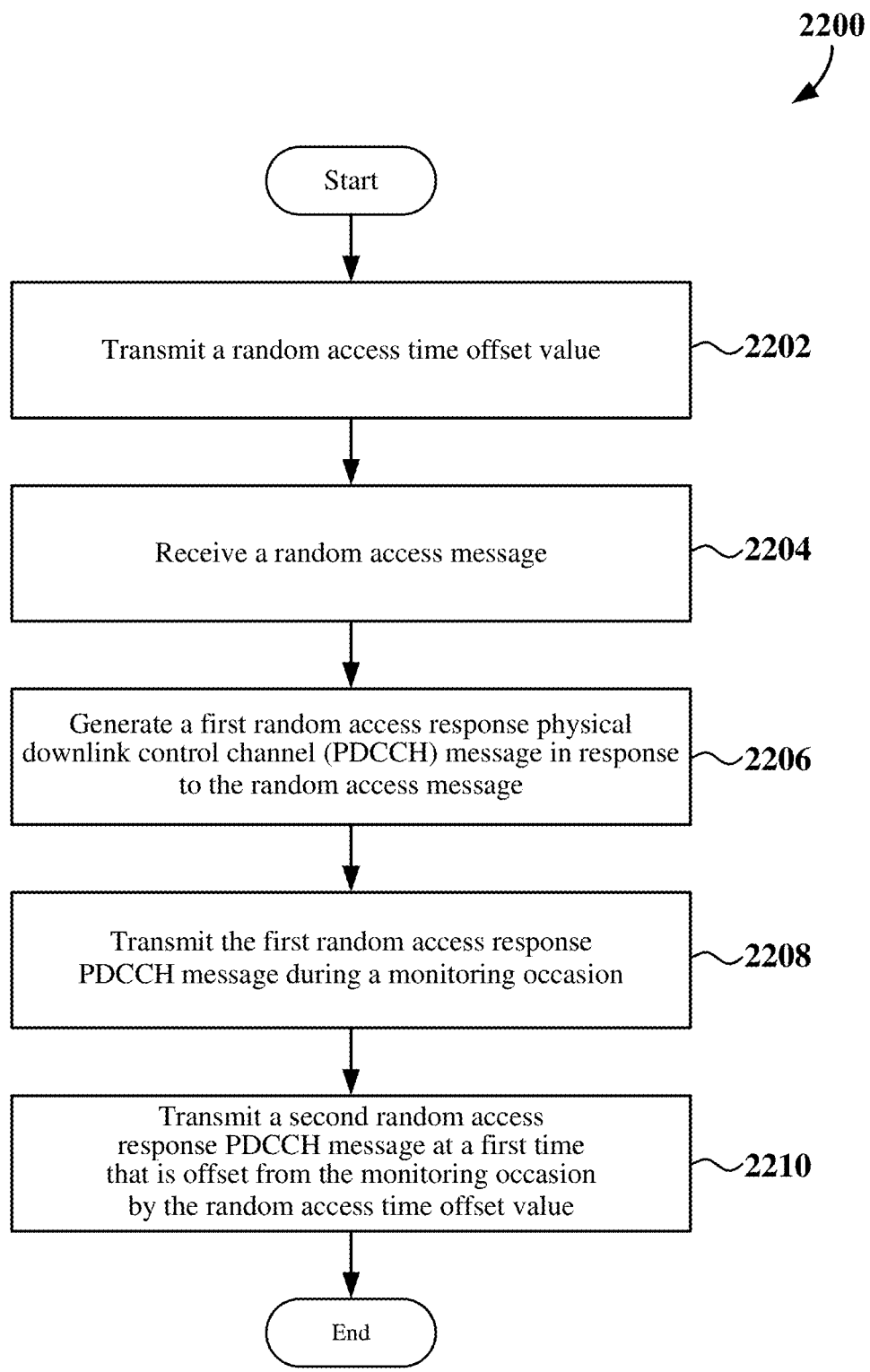
FIG. 22 is a flow chart of another example random access transmission method employing an offset according to some aspects.

FIG. 22 is a flow chart illustrating an example method 2200 for wireless communication in accordance with some aspects of the present disclosure. As described below, some or all illustrated features may be omitted in a particular implementation within the scope of the present disclosure, and some illustrated features may not be required for implementation of all examples. In some examples, the method 2200 may be carried out by the BS 1900 illustrated in FIG. 19. In some examples, the method 2200 may be carried out by any suitable apparatus or means for carrying out the functions or algorithm described below.

At block 2202, a base station may transmit a random access time offset value. For example, the random access configuration circuitry 1942 together with the communication and processing circuitry 1941 and the transceiver 1910, shown and described above in connection with FIG. 19, may provide a means to transmit a random access time offset value.

In some examples, the base station may transmit remaining minimum system information that includes the random access time offset value. In some examples, the random access time offset value indicates how many orthogonal frequency division multiplexing (OFDM) symbols separate the first random access response PDCCH message and the second random access response PDCCH message.

At block 2204, the base station may receive a random access message. For example, the random access processing circuitry 1943 together with the communication and processing circuitry 1941 and the transceiver 1910, shown and described above in connection with FIG. 19, may provide a means to receive a random access message.

At block 2206, the base station may generate a first random access response physical downlink control channel (PDCCH) message in response to the random access message. For example, the random access processing circuitry 1943 together with the communication and processing circuitry 1941 and the transceiver 1910, shown and described above in connection with FIG. 19, may provide a means to generate a first random access response physical downlink control channel (PDCCH) message in response to the random access message.

In some examples, the random access response PDCCH message is for a random access channel (RACH) procedure. In some examples, the random access response PDCCH message is control channel portion of a message 2 of the RACH procedure.

At block 2208, the base station may transmit the first random access response PDCCH message (e.g., a first instance of a RAR PDCCH message) during a monitoring occasion. For example, the random access processing circuitry 1943 together with the communication and processing circuitry 1941 and the transceiver 1910, shown and described above in connection with FIG. 19, may provide a means to transmit the first random access response PDCCH message during a monitoring occasion.

At block 2210, the base station may transmit a second random access response PDCCH message (e.g., a second instance of a RAR PDCCH message) at a first time that is offset from the monitoring occasion by the random access time offset value. In some examples, the second random access response PDCCH message (or the content thereof) is a copy of (e.g., is identical to) the first random access response PDCCH message (or the content thereof). For example, the random access processing circuitry 1943 together with the communication and processing circuitry 1941 and the transceiver 1910, shown and described above in connection with FIG. 19, may provide a means to transmit a second random access response PDCCH message at a first time that is offset from the monitoring occasion by the random access time offset value.

In some examples, the second random access response PDCCH message precedes the first random access response PDCCH message by the random access time offset value. In some examples, the second random access response PDCCH message follows the first random access response PDCCH message by the random access time offset value. In some examples, the first random access response PDCCH message is in a first slot, and the second random access response PDCCH message is in a second slot. In some examples, the first slot immediately follows the second slot. In some examples, there is at least one intervening slot between the first slot and the second slot.

In some examples, the base station may transmit a third random access response PDCCH message at a second time that is offset from the monitoring occasion by the random access time offset value. In some examples, the second random access response PDCCH message precedes the first random access response PDCCH message by the random access time offset value, and the third random access response PDCCH message follows the first random access response PDCCH message by the random access time offset value. In some examples, the third random access response PDCCH message (or the content thereof) is a copy of (e.g., is identical to) the first random access response PDCCH message (or the content thereof).

In some examples, the first random access response PDCCH message and the third random access response PDCCH message are in a first slot, and the second random access response PDCCH message is in a second slot that precedes the first slot. In some examples, the second slot immediately precedes the first slot. In some examples, the first random access response PDCCH message is in a first slot, the second random access response PDCCH message is in a second slot, and the third random access response PDCCH message is in a third slot.

In some examples, the base station may transmit a physical downlink control channel to a user equipment. In some examples, the base station may receive a first indication that decoding of a random access response message failed, and transmit a second indication after receiving the first indication. In this case, the second indication may specify that the random access time offset value is to be used for receiving random access response PDCCH messages from the base station.

Figure 23:
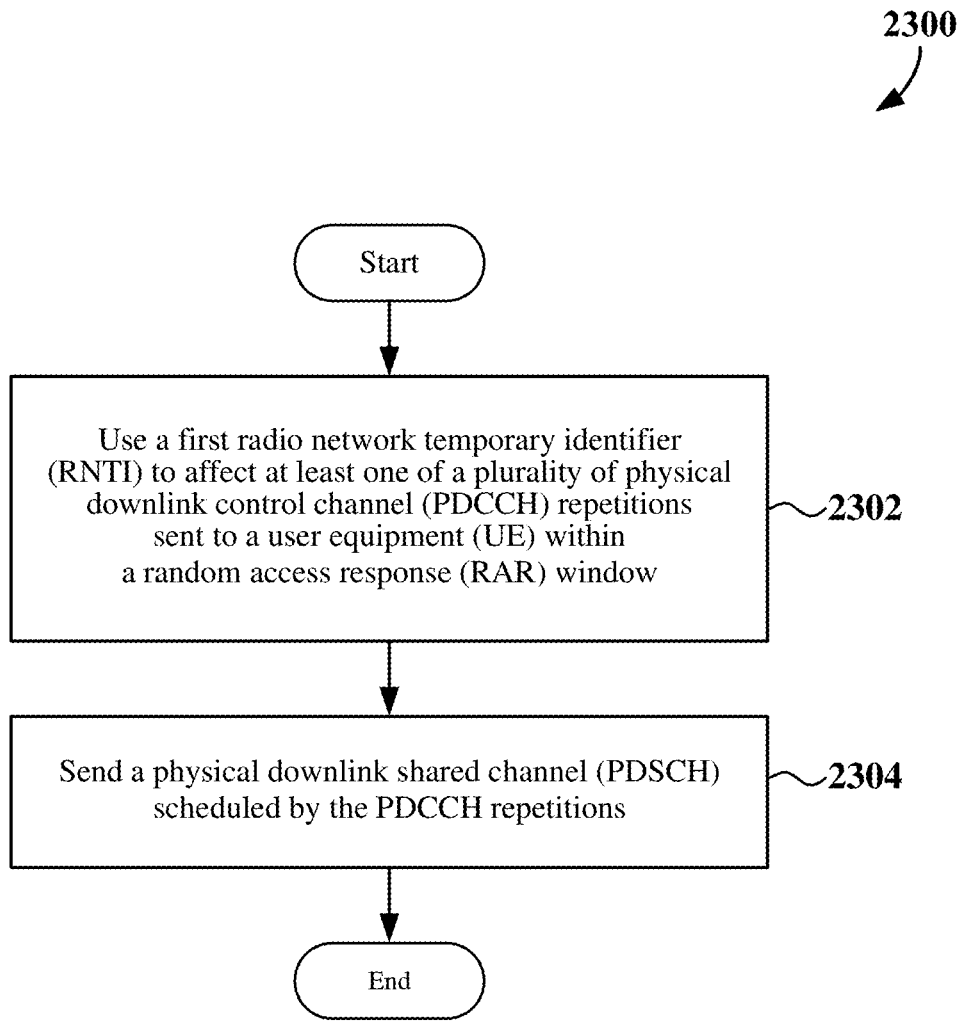
FIG. 23 is a flow chart of another example random access transmission method employing an RNTI according to some aspects.

FIG. 23 is a flow chart illustrating an example method 2300 for wireless communication in accordance with some aspects of the present disclosure. As described below, some or all illustrated features may be omitted in a particular implementation within the scope of the present disclosure, and some illustrated features may not be required for implementation of all examples. In some examples, the method 2300 may be carried out by the BS 1900 illustrated in FIG. 19. In some examples, the method 2300 may be carried out by any suitable apparatus or means for carrying out the functions or algorithm described below.

At block 2302, a base station may use a first radio network temporary identifier (RNTI) to affect at least one of a plurality of physical downlink control channel (PDCCH) repetitions sent to a user equipment (UE) within a random access response (RAR) window. For example, the random access configuration circuitry 1942 together with the communication and processing circuitry 1941 and the transceiver 1910, shown and described above in connection with FIG. 19, may provide a means to use a first radio network temporary identifier (RNTI) to affect at least one of a plurality of physical downlink control channel (PDCCH) repetitions sent to a user equipment (UE) within a random access response (RAR) window.

In some examples, the first RNTI is used to affect at least one of a hashing function or a cyclic redundancy check (CRC) generated for the PDCCH. In some examples, the base station may calculate the first RNTI from a second RNTI. In some examples, the calculation is based on at least one of a rule or a network configured parameter.

In some examples, the PDCCH repetitions are sent in at least one of monitoring occasions also used for PDCCH sent without repetition, or control resources also used for PDCCH sent without repetition. In some examples, PDCCH repetitions associated with the first RNTI are sent in a first portion of the RAR window. In some examples, a second portion of the RAR window is used for PDCCHs without repetition.

At block 2304, the base station may send a physical downlink shared channel (PDSCH) scheduled by the PDCCH repetitions. For example, the random access processing circuitry 1943 together with the communication and processing circuitry 1941 and the transceiver 1910, shown and described above in connection with FIG. 19, may provide a means to send a physical downlink shared channel (PDSCH) scheduled by the PDCCH repetitions.

In some examples, the PDSCH is sent with timing based on a scheduling parameter provided in at least one of the PDCCH repetitions. In some examples, the first RNTI is used to affect all of the PDCCH repetitions. In some examples, a second RNTI is used to affect at least one of the PDCCH repetitions. In some examples, the base station may determine the timing of the PDSCH based on a scheduling parameter provided in the PDCCH repetition affected by the second RNTI.

In some examples, the base station may receive, from the UE, a physical random access channel (PRACH) transmission, and send the PDCCH affected by the first RNTI only if the PRACH transmission is of a certain format or sent with a certain transmission mode.

Figure 24:
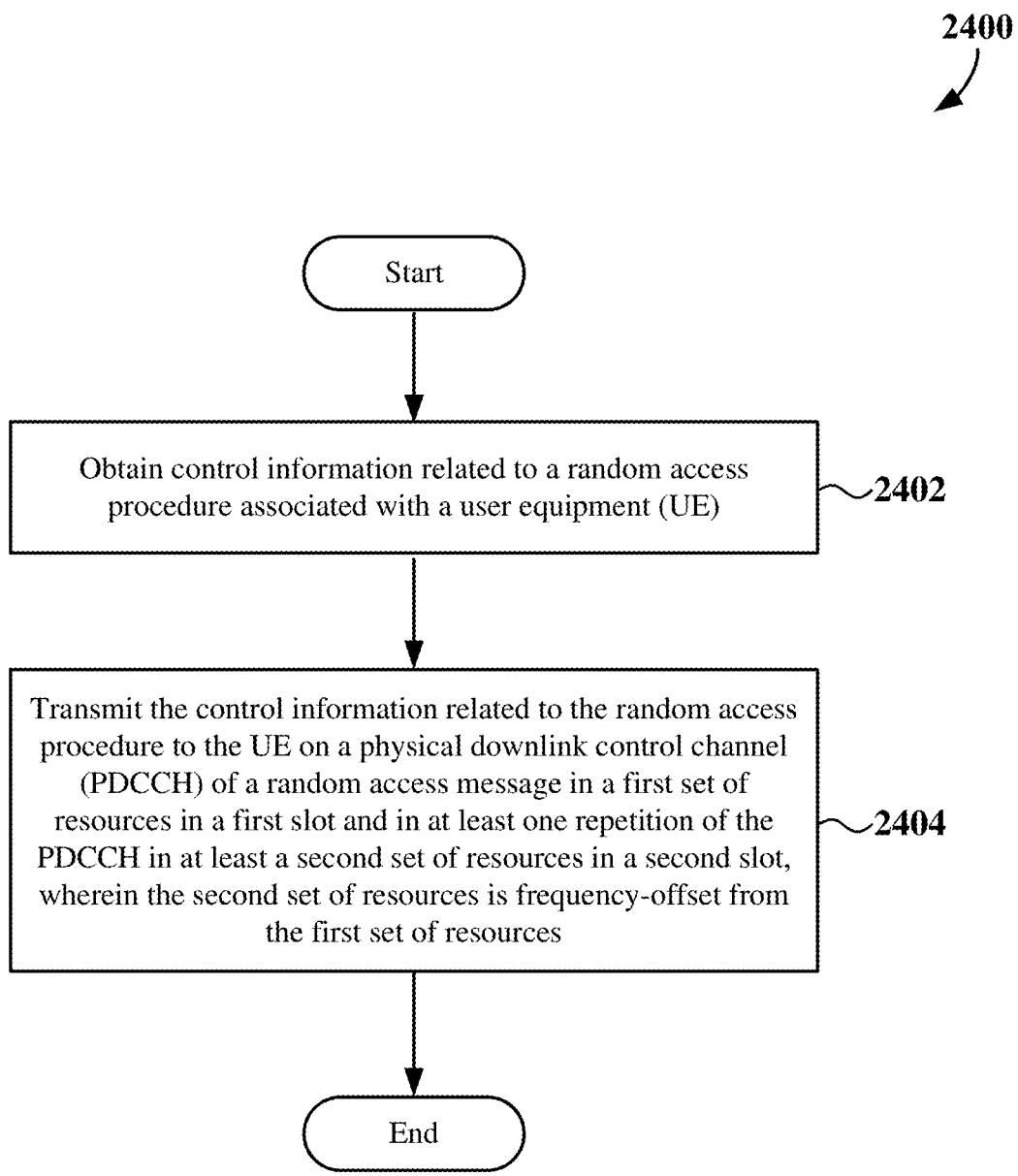
FIG. 24 is a flow chart of an example PDCCH repetition process according to some aspects of the disclosure.

FIG. 24 is a flow chart illustrating an example method 2400 for wireless communication in accordance with some aspects of the present disclosure. As described below, some or all illustrated features may be omitted in a particular implementation within the scope of the present disclosure, and some illustrated features may not be required for implementation of all examples. In some examples, the method 2400 may be carried out by the BS 1900 illustrated in FIG. 19. In some examples, the method 2400 may be carried out by any suitable apparatus or means for carrying out the functions or algorithm described below.

At block 2402, the base station may obtain control information related to a random access procedure associated with a user equipment (UE). For example, the DCI generation circuitry 1945 together with the communication and processing circuitry 1941 and the transceiver 1910, shown and described above in connection with FIG. 19, may provide a means to obtain control information related to a random access procedure associated with a user equipment (UE).

At block 2404, the base station may transmit the control information related to the random access procedure to the UE on a physical downlink control channel (PDCCH) of a random access message in a first set of resources in a first slot and in at least one repetition of the PDCCH in at least a second set of resources in a second slot, where the second set of resources is frequency-offset from the first set of resources. For example, the PRACH processing circuitry 1944 together with the communication and processing circuitry 1941 and the transceiver 1910, shown and described above in connection with FIG. 19, may provide a means to transmit the control information related to the random access procedure to the UE on a physical downlink control channel (PDCCH) of a random access message in a first set of resources in a first slot and in at least one repetition of the PDCCH in at least a second set of resources in a second slot.

In some aspects, the control information related to the random access procedure is a downlink control information (DCI) that may be carried on a Message 2 physical downlink control channel (Msg2(PDCCH)), which schedules a Message 2 physical downlink shared channel (Msg2(PDSCH)).

In one example, the first set of resources and the at least the second set of resources may start at a same time (e.g., in the same OFDM symbol) in the time domain.

In one aspect, the first parameters of the first set of resources may define a first control resource set (CORESET) in the first slot, the second parameters of the second set of resources may define a second CORESET in the second slot, and at least the second parameters of the second set of resources are indicated to the UE in a remaining minimum system information (RMSI).

In various examples, the PDCCH and the at least one repetition of the PDCCH are duplicates of a Message 2 physical downlink control channel (Msg2(PDCCH)) and they may each be transmitted to the UE during a random access response (RAR) window.

According to some aspects, a value of the frequency-offset may be expressed as at least one of a preconfigured frequency-hopping parameter, or a frequency-offset parameter indicated to the UE in signaling from the base station. The frequency-offset parameter may be indicated to the UE in a remaining minimum system information (RMSI) message. The value of the frequency-offset parameter may be expressed as at least one of a first number corresponding to a first quantity of resource blocks, or a second number corresponding to a second quantity of multiples of six resource blocks. In some examples, the frequency-offset parameter may be a function of at least one of a location, in the frequency domain, of a bandwidth part (BWP) including the first set of resources and the at least the second set of resources, a frequency span of the BWP, a sub-carrier spacing of subcarriers within the BWP, or a sum of bandwidths of the first set of resources and the at least the second set of resources.

According to one aspect, the base station may indicate search spaces within the first set of resources and the at least the second set of resources to the UE.

In other aspects, the base station may mask a cyclic redundancy check (CRC) of each of the PDCCH and the at least one repetition of the PDCCH using an identifier of the UE, and transmitting the masked CRC with the PDCCH and the at least one repetition of the PDCCH to the UE. The identifier may be a radio network temporary identifier (RNTI) of the UE.

In one example, a first duration in symbols of the first set of resources may be different from a second duration in symbols of the at least the second set of resources. For example, the first set of resources may be one OFDM symbol in duration while the second set of resources may be two or three symbols in duration, or vice versa.

In one configuration, the base station 1900 includes means for transmitting a random access time offset value to a user equipment, means for receiving a random access message from the user equipment, means for transmitting a first random access response physical downlink control channel (PDCCH) message to the user equipment during a monitoring occasion in response to the random access message, and means for transmitting a second random access response PDCCH message to the user equipment at a first time that is offset from the monitoring occasion by the random access time offset value. In one configuration, the base station 1900 includes means for transmitting a first random access response physical downlink control channel (PDCCH) message that is based on a first random access-radio network temporary identifier (RA-RNTI), and means for transmitting a second random access response physical downlink control channel (PDCCH) message that is based on a second RA-RNTI), wherein the second random access response PDCCH message may include a repetition of the first random access response PDCCH message. In one configuration, the base station 1900 includes means for obtaining control information related to a random access procedure associated with a user equipment (UE), and means for transmitting the control information related to the random access procedure to the UE on a physical downlink control channel (PDCCH) in a first set of resources in a first slot and in at least one repetition of the PDCCH in at least a second set of resources in a second slot, where the second set of resources is frequency-offset from the first set of resources. In one aspect, the aforementioned means may be the processor 1904 shown in FIG. 19 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1904 is merely provided as an example, and other means for carrying out the described functions may be included within various aspects of the present disclosure, including but not limited to the instructions stored in the computer-readable medium 1906, or any other suitable apparatus or means described in any one or more of FIGS. 1, 2, 6, 7, 8, 12, 13, and 19, and utilizing, for example, the methods and/or algorithms described herein in relation to FIGS. 20-24.

The methods shown in FIGS. 15-18 and 20-24 may include additional aspects, such as any single aspect or any combination of aspects described below and/or in connection with one or more other processes described elsewhere herein. The following provides an overview of several aspects of the present disclosure.

Aspect A1: A method for wireless communication at a user equipment, the method comprising: receiving a random access time offset value from a base station; receiving a first random access response physical downlink control channel (PDCCH) message from the base station during a monitoring occasion; and receiving a second random access response PDCCH message from the base station at a first time that is offset from the monitoring occasion by the random access time offset value.

Aspect A2: The method of aspect A1, further comprising: soft combining the first random access response PDCCH message and the second random access response PDCCH message.

Aspect A3: The method of aspect A1 or A2, wherein each of the first random access response PDCCH message and the second random access response PDCCH message is control channel portion of a message 2 of a random access channel (RACH) procedure.

Aspect A4: The method of any of aspects A1 through A3, wherein the second random access response PDCCH message precedes the first random access response PDCCH message by the random access time offset value.

Aspect A5: The method of any of aspects A1 through A3, wherein the second random access response PDCCH message follows the first random access response PDCCH message by the random access time offset value.

Aspect A6: The method of any of aspects A1 through A3, wherein: the first random access response PDCCH message is in a first slot; and the second random access response PDCCH message is in a second slot.

Aspect A7: The method of aspect A6, wherein the first slot immediately follows the second slot.

Aspect A8: The method of aspect A6, wherein there is at least one intervening slot between the first slot and the second slot.

Aspect A9: The method of any of aspects A1 through A8, further comprising: receiving a third random access response PDCCH message at a second time that is offset from the monitoring occasion by the random access time offset value; and jointly decoding the first random access response PDCCH message, the second random access response PDCCH message, and the third random access response PDCCH message.

Aspect A10: The method of aspect A9, wherein: the second random access response PDCCH message precedes the first random access response PDCCH message by the random access time offset value; and the third random access response PDCCH message follows the first random access response PDCCH message by the random access time offset value.

Aspect A11: The method of aspect A9, wherein: the first random access response PDCCH message and the third random access response PDCCH message are in a first slot; and the second random access response PDCCH message is in a second slot that precedes the first slot.

Aspect A12: The method of aspect A11, wherein the second slot immediately precedes the first slot.

Aspect A13: The method of aspect A9, wherein: the first random access response PDCCH message is in a first slot; the second random access response PDCCH message is in a second slot; and the third random access response PDCCH message is in a third slot.

Aspect A14: The method of any of aspects A1 through A13, further comprising: receiving remaining minimum system information that includes the random access time offset value.

Aspect A15: The method of any of aspects A1 through A14, wherein the random access time offset value indicates how many orthogonal frequency division multiplexing (OFDM) symbols separate the first random access response PDCCH message and the second random access response PDCCH message.

Aspect A16: The method of any of aspects A1 through A17, further comprising: determining timing of a physical downlink shared channel from a time of the monitoring occasion and an offset parameter indicated by downlink control information received from the base station.

Aspect A17: The method of any of aspects A1 through A17, further comprising: determining that decoding of a random access response message failed; transmitting a first indication that the decoding of the random access response message failed to the base station; and receiving a second indication from the base station after transmitting the first indication, wherein the second indication specifies that the random access time offset value is to be used for receiving random access response PDCCH messages from the base station.

Aspect A19: A method for wireless communication at a user equipment, the method comprising: receiving a first random access response physical downlink control channel (PDCCH) message that is based on a first random access-radio network temporary identifier (RA-RNTI); and receiving a second random access response PDCCH message that is based on a second RA-RNTI that is different from the first RA-RNTI, wherein the second random access response PDCCH message comprises a repetition of the first random access response PDCCH message.

Aspect A20: The method of aspect A19, further comprising: soft combining the first random access response PDCCH message and the second random access response PDCCH message.

Aspect A21: The method of any of aspects A19 through A20, wherein each of the first random access response PDCCH message and the second random access response PDCCH message is control channel portion of a message 2 of a random access channel (RACH) procedure.

Aspect A22: The method of any of aspects A19 through A21, wherein at least one of a hashing function or a cyclic redundancy check (CRC) associated with the second random access response PDCCH message is based on the second RA-RNTI.

Aspect A23: The method of any of aspects A19 through A22, further comprising: determining timing of a physical downlink shared channel (PDSCH) based on a scheduling parameter included in the second random access response PDCCH message.

Aspect A24: The method of any of aspects A19 through A23, wherein: all repetitions of the first random access response PDCCH message are based on the second RA-RNTI; or at least one repetition of the first random access response PDCCH message is based on the first RA-RNTI.

Aspect A25: The method of any of aspects A19 through A24, further comprising: calculating the second RA-RNTI from the first RA-RNTI.

Aspect A26: The method of any of aspects A19 through A24, further comprising: calculating the second RA-RNTI from the first RA-RNTI based on at least one of a rule or a network configured parameter.

Aspect A27: The method of any of aspects A19 through A26, further comprising: receiving the second random access response PDCCH message in at least one of: monitoring occasions that are used to receive the first random access response PDCCH message; or control resources that are used for the first random access response PDCCH message.

Aspect A28: The method of any of aspects A19 through A27, further comprising: receiving the first random access response PDCCH message in a first portion of a random access response window; and receiving the second random access response PDCCH message in a second portion of the random access response window.

Aspect A29: The method of aspect A28, further comprising: transmitting a physical random access channel (PRACH) transmission; and monitoring for the second random access response PDCCH message in the second portion of the random access response window depending on at least one of a format or a transmission mode of the PRACH transmission.

Aspect A30: A user equipment comprising: a transceiver configured to communicate with a radio access network, a memory, and a processor communicatively coupled to the transceiver and the memory, wherein the processor and the memory are configured to perform any one of aspects A1 through A17.

Aspect A31: An apparatus configured for wireless communication comprising at least one means for performing any one of aspects A1 through A17.

Aspect A32: A non-transitory computer-readable medium storing computer-executable code, comprising code for causing an apparatus to perform any one of aspects A1 through A17.

Aspect A33: A user equipment comprising: a transceiver, a memory, and a processor communicatively coupled to the transceiver and the memory, wherein the processor and the memory are configured to perform any one of aspects A19 through A29.

Aspect A34: An apparatus configured for wireless communication comprising at least one means for performing any one of aspects A19 through A29.

Aspect A35: A non-transitory computer-readable medium storing computer-executable code, comprising code for causing an apparatus to perform any one of aspects A19 through A29.

Aspect B1: A method for wireless communication at a user equipment, the method comprising: identifying a first radio network temporary identifier (RNTI) used to affect a physical downlink control channel (PDCCH) sent within a random access response (RAR) window; determining, based on the first RNTI, that the PDCCH is one of a plurality of PDCCH repetitions; and processing at least one of the PDCCH repetitions or a physical downlink shared channel (PDSCH) scheduled by the PDCCH, based on the determination.

Aspect B2: The method of aspect B1, wherein the processing comprises performing soft combining of multiple of the PDCCH repetitions.

Aspect B3: The method of aspect B1 or B2, wherein the first RNTI is used to affect at least one of a hashing function or a cyclic redundancy check (CRC) generated for the PDCCH.

Aspect B4: The method of any of aspects B1 through B3, wherein the processing comprises determining timing of the PDSCH based on a scheduling parameter provided in at least one of the PDCCH repetitions.

Aspect B5: The method of aspect B4, wherein the first RNTI is used to affect all of the PDCCH repetitions.

Aspect B6: The method of aspect B4, wherein: a second RNTI is used to affect at least one of the PDCCH repetitions; and the processing comprises determining the timing of the PDSCH based on a scheduling parameter provided in the PDCCH repetition affected by the second RNTI.

Aspect B7: The method of any of aspects B1 through B6, further comprising calculating the first RNTI from a second RNTI.

Aspect B8: The method of aspect B7, wherein the calculation is based on at least one of a rule or a network configured parameter.

Aspect B9: The method of any of aspects B1 through B8, wherein the PDCCH repetitions are sent in at least one of: monitoring occasions also used for PDCCH sent without repetition; or control resources also used for PDCCH sent without repetition.

Aspect B10: The method of any of aspects B1 through B9, wherein PDCCH repetitions associated with the first RNTI are sent in a first portion of the RAR window.

Aspect B11: The method of aspect B10, wherein a second portion of the RAR window is used for PDCCHs without repetition.

Aspect B12: The method of any of aspects B1 through B11, further comprising: sending a physical random access channel (PRACH) transmission; and monitoring for a PDCCH affected by the first RNTI only if the PRACH transmission is of a certain format or sent with a certain transmission mode.

Aspect B13: The method of aspect B12, wherein the UE sends the PRACH transmission of the certain format or transmission mode, depending on one or more parameters related to synchronization signal block (SSB) reception.

Aspect B14: The method of aspect B13, wherein the one or more parameters related to SSB reception comprise an SSB reference signal received power (RSRP) threshold.

Aspect B15: A method for wireless communication at a base station, the method comprising: using a first radio network temporary identifier (RNTI) to affect at least one of a plurality of physical downlink control channel (PDCCH) repetitions sent to a user equipment (UE) within a random access response (RAR) window; and sending a physical downlink shared channel (PDSCH) scheduled by the PDCCH repetitions.

Aspect B16: The method of aspect B15, wherein the first RNTI is used to affect at least one of a hashing function or a cyclic redundancy check (CRC) generated for the PDCCH.

Aspect B17: The method of any of aspects B15 through B16, wherein the PDSCH is sent with timing based on a scheduling parameter provided in at least one of the PDCCH repetitions.

Aspect B18: The method of aspect B17, wherein the first RNTI is used to affect all of the PDCCH repetitions.

Aspect B19: The method of aspect B17, wherein: a second RNTI is used to affect at least one of the PDCCH repetitions; and the processing comprises determining the timing of the PDSCH based on a scheduling parameter provided in the PDCCH repetition affected by the second RNTI.

Aspect B20: The method of any of aspects B15 through B19, further comprising calculating the first RNTI from a second RNTI.

Aspect B21: The method of aspect B20, wherein the calculation is based on at least one of a rule or a network configured parameter.

Aspect B22: The method of any of aspects B15 through B21, wherein the PDCCH repetitions are sent in at least one of: monitoring occasions also used for PDCCH sent without repetition; or control resources also used for PDCCH sent without repetition.

Aspect B23: The method of any of aspects B15 through B22, wherein PDCCH repetitions associated with the first RNTI are sent in a first portion of the RAR window.

Aspect B24: The method of aspect B23, wherein a second portion of the RAR window is used for PDCCHs without repetition.

Aspect B25: The method of any of aspects B15 through B24, further comprising: receiving, from the UE, a physical random access channel (PRACH) transmission; and sending the PDCCH affected by the first RNTI only if the PRACH transmission is of a certain format or sent with a certain transmission mode.

Aspect B26: A user equipment comprising: a transceiver configured to communicate with a radio access network, a memory, and a processor communicatively coupled to the transceiver and the memory, wherein the processor and the memory are configured to perform any one of aspects B1 through B15.

Aspect B27: An apparatus configured for wireless communication comprising at least one means for performing any one of aspects B1 through B15.

Aspect B28: A non-transitory computer-readable medium storing computer-executable code, comprising code for causing an apparatus to perform any one of aspects B1 through B15.

Aspect B29: A base station comprising: a transceiver, a memory, and a processor communicatively coupled to the transceiver and the memory, wherein the processor and the memory are configured to perform any one of aspects B15 through B25.

Aspect B30: An apparatus configured for wireless communication comprising at least one means for performing any one of aspects B15 through B25.

Aspect B31: A non-transitory computer-readable medium storing computer-executable code, comprising code for causing an apparatus to perform any one of aspects B15 through B25.

Aspect C1: A method for wireless communication at a user equipment, the method comprising: receiving a physical downlink control channel (PDCCH) of a random access message in a first set of resources in a first slot and at least one repetition of the PDCCH in at least a second set of resources in a second slot, wherein the second set of resources is frequency-offset from the first set of resources; combining respective payloads of the PDCCH and the at least one repetition of the PDCCH to obtain a combined PDCCH payload; and obtaining control information related to a random access procedure from the combined PDCCH payload.

Aspect C2: The method of aspect C1, wherein the control information related to the random access procedure is a downlink control information (DCI) carried on a Message 2 physical downlink control channel (Msg2(PDCCH)) that schedules a Message 2 physical downlink shared channel (Msg2(PDSCH)).

Aspect C3: The method of aspect C1 or C2, wherein the first set of resources and the at least the second set of resources start at a same time in a time domain.

Aspect C4: The method of any of aspects C1 through C3, further comprising: verifying cyclic redundancy checks (CRCs) of the PDCCH and the at least one repetition of the PDCCH using an identifier of the UE to confirm an association between the PDCCH, the at least one repetition of the PDCCH, and the UE; and performing blind decoding on the combined PDCCH payload to obtain the control information related to the random access procedure.

Aspect C5: The method of any of aspects C1 through C4, wherein: first parameters of the first set of resources define a first control resource set (CORESET) in the first slot; second parameters of the second set of resources define a second CORESET in the second slot; and at least the second parameters of the second set of resources are indicated to the UE in a remaining minimum system information (RMSI).

Aspect C6: The method of any of aspects C1 through C5, wherein the PDCCH and the at least one repetition of the PDCCH are duplicates of a Message 2 physical downlink control channel (Msg2(PDCCH)) and are each received during a random access response (RAR) window.

Aspect C7: The method of any of aspects C1 through C6, further comprising: obtaining a value of the frequency-offset from at least one of: a preconfigured frequency-hopping parameter, or a frequency-offset parameter indicated to the UE in signaling from a base station.

Aspect C8: The method of aspect C7, wherein the frequency-offset parameter is indicated in a remaining minimum system information (RMSI).

Aspect C9: The method of any of aspects C7 through C8, wherein a value of the frequency-offset parameter is expressed as at least one of: a first number corresponding to a first quantity of resource blocks, or a second number corresponding to a second quantity of multiples of six resource blocks.

Aspect C10: The method of any of aspects C7 through C9, wherein the frequency-offset parameter is a function of at least one of: a location, in a frequency domain, of a bandwidth part (BWP) comprising the first set of resources and the at least the second set of resources, a frequency span of the BWP, a sub-carrier spacing of subcarriers within the BWP, or a sum of bandwidths of the first set of resources and the at least the second set of resources.

Aspect C11: The method of any of aspects C1 through C10, wherein the receiving the PDCCH and the at least one repetition of the PDCCH further comprises: monitoring search spaces within the first set of resources and the at least the second set of resources.

Aspect C12: The method of any of aspects C1 through C11, wherein the receiving the PDCCH and the at least one repetition of the PDCCH further comprises: demasking a first cyclic redundancy check (CRC) received with respective payloads of the PDCCH and the at least one repetition of the PDCCH using an identifier of the UE; and determining that the respective payloads of the PDCCH are associated with the UE upon an occurrence of a valid demasked first CRC.

Aspect C13: The method of aspect C12, wherein the identifier is a radio network temporary identifier (RNTI) of the UE.

Aspect C14: The method of any of aspects C12 through C13, wherein the determining the occurrence of the valid demasked first CRC further comprises: calculating a second CRC of each of the respective payloads of the PDCCH and the at least one repetition of the PDCCH; comparing the second CRC with the demasked first CRC; and determining that the demasked first CRC and the second CRC are equal.

Aspect C15: The method of any of aspects C1 through C14, wherein a first duration in symbols of the first set of resources is different from a second duration in symbols of the at least the second set of resources.

Aspect C19: A method for wireless communication at a base station, the method comprising: obtaining control information related to a random access procedure associated with a user equipment (UE); and transmitting the control information related to the random access procedure to the UE on a physical downlink control channel (PDCCH) of a random access message in a first set of resources in a first slot and in at least one repetition of the PDCCH in at least a second set of resources in a second slot, wherein the second set of resources is frequency-offset from the first set of resources.

Aspect C20: The method of aspect C19, wherein the control information related to the random access procedure is a downlink control information (DCI) carried on a Message 2 physical downlink control channel (Msg2(PDCCH)), which schedules a Message 2 physical downlink shared channel (Msg2(PDSCH)).

Aspect C21: The method of any of aspects C19 through C20, wherein the first set of resources and the at least the second set of resources start at a same time in a time domain.

Aspect C22: The method of any of aspects C19 through C21, wherein: first parameters of the first set of resources define a first control resource set (CORESET) in the first slot; second parameters of the second set of resources define a second CORESET in the second slot; and at least the second parameters of the second set of resources are indicated to the UE in a remaining minimum system information (RMSI).

Aspect C23: The method of any of aspects C19 through C22, wherein the PDCCH and the at least one repetition of the PDCCH are duplicates of a Message 2 physical downlink control channel (Msg2(PDCCH) and are each transmitted to the UE during a random access response (RAR) window.

Aspect C24: The method of any of aspects C19 through C23, wherein a value of the frequency-offset is expressed as at least one of: a preconfigured frequency-hopping parameter, or a frequency-offset parameter indicated to the UE in signaling from the base station.

Aspect C25: The method of aspect C24, wherein the frequency-offset parameter is indicated in a remaining minimum system information (RMSI).

Aspect C26: The method of any of aspects C24 through C25, wherein a value of the frequency-offset parameter is expressed as at least one of: a first number corresponding to a first quantity of resource blocks, or a second number corresponding to a second quantity of multiples of six resource blocks.

Aspect C27: The method of any of aspects C24 through C26, wherein the frequency-offset parameter is a function of at least one of: a location, in a frequency domain, of a bandwidth part (BWP) comprising the first set of resources and the at least the second set of resources, a frequency span of the BWP, a sub-carrier spacing of subcarriers within the BWP, or a sum of bandwidths of the first set of resources and the at least the second set of resources.

Aspect C28: The method of any of aspects C19 through C27, further comprising: indicating search spaces within the first set of resources and the at least the second set of resources to the UE.

Aspect C29: The method of any of aspects C19 through C28, further comprising: masking a cyclic redundancy check (CRC) of each of the PDCCH and the at least one repetition of the PDCCH using an identifier of the UE; and transmitting the masked CRC with the PDCCH and the at least one repetition of the PDCCH to the UE.

Aspect C30: The method of aspect C29, wherein the identifier is a radio network temporary identifier (RNTI) of the UE.

Aspect C31: The method of any of aspects C19 through C30, wherein a first duration in symbols of the first set of resources is different from a second duration in symbols of the at least the second set of resources.

Aspect C32: A user equipment comprising: a transceiver configured to communicate with a radio access network, a memory, and a processor communicatively coupled to the transceiver and the memory, wherein the processor and the memory are configured to perform any one of aspects C1 through C15.

Aspect C33: An apparatus configured for wireless communication comprising at least one means for performing any one of aspects C1 through C15.

Aspect C34: A non-transitory computer-readable medium storing computer-executable code, comprising code for causing an apparatus to perform any one of aspects C1 through C15.

Aspect C35: A base station comprising: a transceiver, a memory, and a processor communicatively coupled to the transceiver and the memory, wherein the processor and the memory are configured to perform any one of aspects C19 through C31.

Aspect C36: An apparatus configured for wireless communication comprising at least one means for performing any one of aspects C19 through C31.

Aspect C37: A non-transitory computer-readable medium storing computer-executable code, comprising code for causing an apparatus to perform any one of aspects C19 through C31.

Aspect D1: A method for wireless communication at a user equipment, the method comprising: receiving a random access time offset value; receiving a first random access response physical downlink control channel (PDCCH) message during a monitoring occasion; receiving a second random access response PDCCH message at a first time that is offset from the monitoring occasion by the random access time offset value; and decoding the first random access response PDCCH message and the second random access response PDCCH message.

Aspect D2: The method of aspect D1, wherein the random access response PDCCH message is for a physical random access channel (PRACH) procedure.

Aspect D3: The method of aspect D2, wherein the random access response PDCCH message is control channel portion of a message 2 of the PRACH procedure.

Aspect D4: The method of any of aspects D1 through D3, wherein the second random access response PDCCH message precedes the first random access response PDCCH message by the random access time offset value.

Aspect D5: The method of any of aspects D1 through D3, wherein the second random access response PDCCH message follows the first random access response PDCCH message by the random access time offset value.

Aspect D6: The method of any of aspects D1 through D4, wherein: the first random access response PDCCH message is in a first slot; and the second random access response PDCCH message is in a second slot.

Aspect D7: The method of aspect D6, wherein the first slot immediately follows the second slot.

Aspect D8: The method of aspect D6, wherein there is at least one intervening slot between the first slot and the second slot.

Aspect D9: The method of any of aspects D1 through D8, further comprising: receiving a third random access response PDCCH message at a second time that is offset from the monitoring occasion by the random access time offset value; wherein decoding the first random access response PDCCH message and the second random access response PDCCH message comprises decoding the first random access response PDCCH message, the second random access response PDCCH message, and the third random access response PDCCH message.

Aspect D10: The method of aspect D9, wherein: the second random access response PDCCH message precedes the first random access response PDCCH message by the random access time offset value; and the third random access response PDCCH message follows the first random access response PDCCH message by the random access time offset value.

Aspect D11: The method of aspect D9, wherein: the first random access response PDCCH message and the third random access response PDCCH message are in a first slot; and the second random access response PDCCH message is in a second slot that precedes the first slot.

Aspect D12: The method of aspect D11, wherein the second slot immediately precedes the first slot.

Aspect D13: The method of aspect D9, wherein: the first random access response PDCCH message is in a first slot; the second random access response PDCCH message is in a second slot; and the third random access response PDCCH message is in a third slot.

Aspect D14: The method of any of aspects D1 through D13, wherein receiving the random access time offset value comprises: receiving remaining minimum system information that includes the random access time offset value.

Aspect D15: The method of any of aspects D1 through D14, wherein the random access time offset value indicates how many orthogonal frequency division multiplexing (OFDM) symbols separate the first random access response PDCCH message and the second random access response PDCCH message.

Aspect D16: The method of any of aspects D1 through D15, further comprising: determining timing of a physical downlink shared channel from a time of the monitoring occasion and a k0 offset.

Aspect D17: The method of any of aspects D1 through D16, wherein receiving the first random access response PDCCH message comprises: receiving a physical downlink control channel from a base station.

Aspect D18: The method of any of aspects D1 through D17, further comprising: determining that decoding of a random access response message failed; transmitting a first indication that the decoding of the random access response message failed; and receiving a second indication from a base station after transmitting the first indication, wherein the second indication specifies that the random access time offset value is to be used for receiving random access response PDCCH messages from the base station.

Aspect D19: The method of any of aspects D16 through D18, wherein decoding the first random access response PDCCH message and the second random access response PDCCH message comprises: soft combining the first random access response PDCCH message and the second random access response PDCCH message.

Aspect D41: A method for wireless communication at a base station, the method comprising: transmitting a random access time offset value; receiving a random access message; generating a first random access response physical downlink control channel (PDCCH) message in response to the random access message; transmitting the first random access response PDCCH message during a monitoring occasion; and transmitting a second random access response PDCCH message at a first time that is offset from the monitoring occasion by the random access time offset value.

Aspect D42: The method of aspect D41, wherein the random access response PDCCH message is for a physical random access channel (PRACH) procedure.

Aspect D43: The method of aspect D42, wherein the random access response PDCCH message is control channel portion of a message 2 of the PRACH procedure.

Aspect D44: The method of any of aspects D41 through D43, wherein the second random access response PDCCH message precedes the first random access response PDCCH message by the random access time offset value.

Aspect D45: The method of any of aspects D41 through D43, wherein the second random access response PDCCH message follows the first random access response PDCCH message by the random access time offset value.

Aspect D46: The method of any of aspects D41 through D44, wherein: the first random access response PDCCH message is in a first slot; and the second random access response PDCCH message is in a second slot.

Aspect D47: The method of aspect D46, wherein the first slot immediately follows the second slot.

Aspect D48: The method of aspect D46, wherein there is at least one intervening slot between the first slot and the second slot.

Aspect D49: The method of any of aspects D41 through D48, further comprising: transmitting a third random access response PDCCH message at a second time that is offset from the monitoring occasion by the random access time offset value.

Aspect D50: The method of aspect D49, wherein: the second random access response PDCCH message precedes the first random access response PDCCH message by the random access time offset value; and the third random access response PDCCH message follows the first random access response PDCCH message by the random access time offset value.

Aspect D51: The method of aspect D49, wherein: the first random access response PDCCH message and the third random access response PDCCH message are in a first slot; and the second random access response PDCCH message is in a second slot that precedes the first slot.

Aspect D52: The method of aspect D51, wherein the second slot immediately precedes the first slot.

Aspect D53: The method of aspect D49, wherein: the first random access response PDCCH message is in a first slot; the second random access response PDCCH message is in a second slot; and the third random access response PDCCH message is in a third slot.

Aspect D54: The method of any of aspects D41 through D53, wherein transmitting the random access time offset value comprises: transmitting remaining minimum system information that includes the random access time offset value.

Aspect D55: The method of any of aspects D41 through D54, wherein the random access time offset value indicates how many orthogonal frequency division multiplexing (OFDM) symbols separate the first random access response PDCCH message and the second random access response PDCCH message.

Aspect D56: The method of any of aspects D41 through D55, wherein transmitting the first random access response PDCCH message comprises: transmitting a physical downlink control channel to a user equipment.

Aspect D57: The method of any of aspects D41 through D56, further comprising: receiving a first indication that decoding of a random access response message failed; and transmitting a second indication after receiving the first indication, wherein the second indication specifies that the random access time offset value is to be used for receiving random access response PDCCH messages from the base station.

Aspect D58: A user equipment comprising: a transceiver configured to communicate with a radio access network, a memory, and a processor communicatively coupled to the transceiver and the memory, wherein the processor and the memory are configured to perform any one of aspects D1 through D19.

Aspect D59: An apparatus configured for wireless communication comprising at least one means for performing any one of aspects D1 through D19.

Aspect D60: A non-transitory computer-readable medium storing computer-executable code, comprising code for causing an apparatus to perform any one of aspects D1 through D19.

Aspect D61: A base station comprising: a transceiver, a memory, and a processor communicatively coupled to the transceiver and the memory, wherein the processor and the memory are configured to perform any one of aspects D41 through D57.

Aspect D62: An apparatus configured for wireless communication comprising at least one means for performing any one of aspects D41 through D57.

Aspect D63: A non-transitory computer-readable medium storing computer-executable code, comprising code for causing an apparatus to perform any one of aspects D41 through D57.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-24 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 5, 8, 11, 12, 13, 14, and 19 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment, comprising:
a transceiver;
one or more memories storing processor-executable code; and
one or more processors configured to execute the processor-executable code to cause the user equipment to:
receive a first random access time offset value and a second random access time offset value from a base station via the transceiver;
receive a first random access response physical downlink control channel (PDCCH) message from the base station via the transceiver during a monitoring occasion;
receive a second random access response PDCCH message from the base station via the transceiver at a first time that is offset from the monitoring occasion by the first random access time offset value; and
receive a third random access response PDCCH message from the base station via the transceiver at a second time that is offset from the monitoring occasion by the second random access time offset value.

2. The user equipment of claim 1, wherein the one or more processors are further configured to execute the processor-executable code to cause the user equipment to:
soft combine the first random access response PDCCH message, the second random access response PDCCH message, and the third random access response PDCCH message.

3. The user equipment of claim 1, wherein each of the first random access response PDCCH message, the second random access response PDCCH message, and the third random access response PDCCH message is a control channel portion of a message 2 of a random access channel (RACH) procedure.

4. The user equipment of claim 1, wherein the second random access response PDCCH message precedes the first random access response PDCCH message by the first random access time offset value.

5. The user equipment of claim 1, wherein the second random access response PDCCH message follows the first random access response PDCCH message by the first random access time offset value.

6. The user equipment of claim 1, wherein:
the first random access response PDCCH message is in a first slot; and
the second random access response PDCCH message is in a second slot.

7. The user equipment of claim 6, wherein the first slot immediately follows the second slot.

8. The user equipment of claim 6, wherein there is at least one intervening slot between the first slot and the second slot.

9. The user equipment of claim 1, wherein the one or more processors are further configured to execute the processor-executable code to cause the user equipment to:
jointly decode the first random access response PDCCH message, the second random access response PDCCH message, and the third random access response PDCCH message.

10. The user equipment of claim 9, wherein:
the second random access response PDCCH message precedes the first random access response PDCCH message by the first random access time offset value; and
the third random access response PDCCH message follows the first random access response PDCCH message by the second random access time offset value.

11. The user equipment of claim 9, wherein:
the first random access response PDCCH message and the third random access response PDCCH message are in a first slot; and
the second random access response PDCCH message is in a second slot that precedes the first slot.

12. The user equipment of claim 11, wherein the second slot immediately precedes the first slot.

13. The user equipment of claim 9, wherein:
the first random access response PDCCH message is in a first slot;
the second random access response PDCCH message is in a second slot; and
the third random access response PDCCH message is in a third slot.

14. The user equipment of claim 1, wherein the one or more processors are further configured to execute the processor-executable code to cause the user equipment to:
receive remaining minimum system information that includes the first random access time offset value and the second random access time offset value.

15. The user equipment of claim 1, wherein the first random access time offset value indicates how many orthogonal frequency division multiplexing (OFDM) symbols separate the first random access response PDCCH message and the second random access response PDCCH message.

16. The user equipment of claim 1, wherein the one or more processors are further configured to execute the processor-executable code to cause the user equipment to:
determine timing of a physical downlink shared channel from a time of the monitoring occasion and an offset parameter indicated by downlink control information received from the base station.

17. The user equipment of claim 1, wherein the one or more processors are further configured to execute the processor-executable code to cause the user equipment to:
determine that decoding of a random access response message failed;
transmit a first indication that the decoding of the random access response message failed to the base station; and
receive a second indication from the base station after transmitting the first indication, wherein the second indication specifies that the random access time offset value and the second random access time offset value are to be used for receiving random access response PDCCH messages from the base station.

18. A method for wireless communication at a user equipment, the method comprising:
receiving a first random access time offset value and a second random access time offset value from a base station;
receiving a first random access response physical downlink control channel (PDCCH) message from the base station during a monitoring occasion;
receiving a second random access response PDCCH message from the base station at a first time that is offset from the monitoring occasion by the first random access time offset value; and
receive a third random access response PDCCH message from the base station at a second time that is offset from the monitoring occasion by the second random access time offset value.

19. The method of claim 18, further comprising:
soft combining the first random access response PDCCH message, the second random access response PDCCH message, and the third random access response PDCCH message.

20. The method of claim 18, wherein each of the first random access response PDCCH message, the second random access response PDCCH message, and the third random access response PDCCH message is a control channel portion of a message 2 of a random access channel (RACH) procedure.

21. The method of claim 18, wherein the second random access response PDCCH message precedes the first random access response PDCCH message by the first random access time offset value.

22. The method of claim 18, wherein the second random access response PDCCH message follows the first random access response PDCCH message by the first random access time offset value.

23. The method of claim 18, wherein:
the first random access response PDCCH message is in a first slot; and
the second random access response PDCCH message is in a second slot.

24. The method of claim 23, wherein the first slot immediately follows the second slot.

25. The method of claim 23, wherein there is at least one intervening slot between the first slot and the second slot.

26. The method of claim 18, further comprising:
jointly decoding the first random access response PDCCH message, the second random access response PDCCH message, and the third random access response PDCCH message.

27. The method of claim 26, wherein:
the second random access response PDCCH message precedes the first random access response PDCCH message by the first random access time offset value; and
the third random access response PDCCH message follows the first random access response PDCCH message by the second random access time offset value.

28. The method of claim 26, wherein:
the first random access response PDCCH message and the third random access response PDCCH message are in a first slot; and
the second random access response PDCCH message is in a second slot that precedes the first slot.

29. The method of claim 28, wherein the second slot immediately precedes the first slot.

30. A user equipment, comprising:
means for a first random access time offset value and a second random access time offset value from a base station;
means for receiving a first random access response physical downlink control channel (PDCCH) message from the base station during a monitoring occasion;
means for receiving a second random access response PDCCH message from the base station at a first time that is offset from the monitoring occasion by the first random access time offset value; and
means for receive a third random access response PDCCH message from the base station at a second time that is offset from the monitoring occasion by the second random access time offset value.

* * * * *